(12) United States Patent
Jones et al.

(10) Patent No.: US 12,193,611 B2
(45) Date of Patent: Jan. 14, 2025

(54) FOOD PREPARATION DEVICES, SYSTEMS AND ACCESSORIES USED THEREIN

(71) Applicant: Breville Pty Limited, Alexandria (AU)

(72) Inventors: Richard Llewelyn Jones, Alexandria (AU); Mark Anthony Thomas, Alexandria (AU); Margaret Antkowiak, Alexandria (AU)

(73) Assignee: Breville Pty Limited, Alexandria (AU)

( * ) Notice: Subject to any disclaimer, the term of this patent is extended or adjusted under 35 U.S.C. 154(b) by 301 days.

(21) Appl. No.: 17/773,442

(22) PCT Filed: Oct. 30, 2020

(86) PCT No.: PCT/AU2020/051185
§ 371 (c)(1),
(2) Date: Apr. 29, 2022

(87) PCT Pub. No.: WO2021/081600
PCT Pub. Date: May 6, 2021

(65) Prior Publication Data
US 2022/0378249 A1 Dec. 1, 2022

(30) Foreign Application Priority Data

Oct. 31, 2019 (AU) .............................. 2019904110
Apr. 22, 2020 (AU) .............................. 2020901267

(51) Int. Cl.
*A47J 43/08* (2006.01)
*A47J 43/046* (2006.01)
*A47J 43/06* (2006.01)
*A47J 43/07* (2006.01)
*A47J 43/25* (2006.01)
*B26D 3/18* (2006.01)
(Continued)

(52) U.S. Cl.
CPC ........... *A47J 43/085* (2013.01); *A47J 43/046* (2013.01); *A47J 43/06* (2013.01)

(58) Field of Classification Search
CPC ..... A47J 43/085; A47J 43/046; A47J 43/0716
See application file for complete search history.

(56) References Cited

U.S. PATENT DOCUMENTS

| 8,677,895 B2 | 3/2014 | Beber et al. |
| 9,999,321 B2 | 6/2018 | Chung et al. |
| 2003/0226923 A1 | 12/2003 | Starr et al. |

FOREIGN PATENT DOCUMENTS

| CN | 203077359 U | 7/2013 |
| CN | 205358065 U | 7/2016 |

(Continued)

OTHER PUBLICATIONS

English translate (EP0057151A1), retrieved date Apr. 15, 2024.*
International Search Report for application No. PCT/AU2020/051185, dated Dec. 23, 2020.

*Primary Examiner* — Mohammed S. Alawadi
(74) *Attorney, Agent, or Firm* — Tarolli, Sundheim, Covell & Tummino LLP

(57) ABSTRACT

A food processor (100) with a food preparation vessel (102), a base (104) housing a drive motor (111) and a spindle assembly (140) for detachable engagement with an accessory (109) for rotation in the preparation vessel (102). The spindle assembly (140) has a gear assembly such that the accessory (109) is driven at a speed that differs from that of the drive motor (111).

11 Claims, 48 Drawing Sheets

(51) Int. Cl.
*B26D 3/22* (2006.01)
*F16H 1/46* (2006.01)

(56) References Cited

FOREIGN PATENT DOCUMENTS

| EP | 0057151 A1 * | 8/1982 |
| EP | 0100755 A2 * | 2/1984 |
| EP | 3324803 A1 | 5/2018 |

* cited by examiner

FOOD PREPARATION DEVICES, SYSTEMS AND ACCESSORIES USED THEREIN

FIELD

The present invention relates to food preparation devices and accessories used therein. In particular, the invention relates to various accessories within the preparation vessel of a food processor and the spindle assemblies used to rotate accessories in the preparation vessel.

BACKGROUND

Food processors perform a variety of food preparation operations such as chopping, slicing, dicing and julienning as well as mixing, stirring or liquefying food stuffs within a preparation vessel such as a bowl. The different functions are normally performed by particular accessories mounted in the preparation bowl. A central hub or spindle in the bowl engages the accessory to drive one or more accessory parts during the processing operation.

Some operations such as blending or liquefying require the accessory (typically blades) to rotate at a relative high speed. In contrast, food processing operations such as slicing or dicing can be performed at lower speeds while mixing requires even lower speeds again. To address this, some food processors have drive motors with a range of operating speeds. However an electric drive motor with multiple speed settings is more expensive and typically less efficient than a single speed motor. Also, slicing or dicing food at speeds that are higher than optimal can generate excessive forces on the slicing disc or other spinning accessory in the processor bowl. These excessive forces are not evenly or symmetrically balanced on the cutting disc and can cause excessive wobbling and vibration.

Food processor accessories such as a cutting disc can be drawn upwards on the drive spindle by forces acting on the cutting blade. A thin layer of food tends to accumulate between the cutting disc and the spindle which slightly displaces the disc from its normal position within the bowl. Incorrect positioning of the disc in the bowl may cause wear against the internal surfaces, or even force open the lid which is potentially harmful to the user.

Another problem relates to the engagement between the drive spindle and the motor in the drive base. In existing food processors, the drive spindle slides through a central aperture in the bottom of the food preparation bowl to mate with the output socket of the motor on top of the drive base. With excessive forces acting on the rotating accessory, the drive spindle can be disengaged from the drive coupling. The problem can be exacerbated by attaching accessories to the spindle that are inappropriate for processing operations on particular food stuffs in the bowl.

Conversely, while a number of different accessories may be configured for engagement with the same spindle, known food processors will use spindles that are incompatible with every other make and model of food processor.

With the above issues in mind, the Applicant's ice cream maker described in CN205358065U connects the drive motor to the spindle through a drive coupling with a gear assembly. This geared drive coupling reduces the spindle speed relative to the drive motor, and increases the torque on the accessory. The slower spindle speeds and higher torque on the stirring paddles are better suited to the ice cream making process. Accommodating the drive coupling and gear system requires the central aperture in the bowl to be larger than normal and internal bowl volume is lost.

Other food processors such as that shown in U.S. Pat. No. 9,999,321 B2 use a spindle that directly engages the output socket of the drive motor and a dicing disc, but the dicing disc itself has a gear system for reducing the operating speed and increasing the torque on the dicing blades. The gear system is housed in a relatively wide central hub around the drive aperture for receiving spindle. The hub diameter reduces the area of the disc available for dicing blades and significantly increases the production cost of the accessory. In turn, users are less inclined to replace a more expensive accessory once the blades become blunt. Furthermore, the dicing disc is able to dice at the same speed as the motor even if the particular food stuff was suitable for dicing at a higher speed without the problems discussed above.

Food processors for domestic kitchens typically have accessories with various discs for dicing, julienning, and slicing vegetables, as well as rotating blades for mixing, chopping and liquefying. Another popular processing operation is to cut dense vegetables such as sweet potatoes and potatoes into thick strips to form chips. This may be achieved using a rotating cutting blade above a disc with parallel fixed cutting blades. The rotating blade cuts a slice of potato which is then forced through the parallel blades by a downwardly inclined surface at the trailing side of the blade. For dicing operations, a similar arrangement is used however the disc has an array of fixed cutting blades intersecting at right angles to form a grid.

The intersecting blades of a dicing grid mutually reinforce each other. However, the parallel blades used for making chips include several blades close to the centre of the disc that are significantly longer than the blades towards the periphery of the disc. These longer blades are more easily deflected by the load applied from the vegetable being sliced. These blade deflections result in non-uniform spacing between each of the parallel blades and the resulting chips have inconsistent thickness or width. Furthermore, these deflections eventually reduce the longevity of the blades and therefore the disc as a whole.

Making the parallel blades deeper in the feed direction of the food may not be an effective solution as the food is prone to jamming between deeper blades which then forms an obstruction.

More generally, having numerous accessories to perform different food processing operations creates a need to store all the accessories when not in use. In U.S. Pat. No. 8,677,895 B2 (US'895), a dual-purpose food processing disc is described. As best shown in FIG. 3 of US'895, the dicing accessory has two different dicing elements 66 and 68 having different blade configurations for differently sized dices. While US'895 describes the openings 74 defined by the dicing grids 66 and 68 are any desired shape there is no discussion as to how parallel blades for making chips might address the problem of blade deflection and inconsistent food sizing as discussed above.

OBJECT

It is an object of the present invention to substantially overcome, or at least ameliorate, the above disadvantages, or at least provide a useful alternative.

SUMMARY OF INVENTION

Geared Spindle Assembly

With the above issues in mind, there is disclosed herein a food processor including:
a food preparation vessel;

a base housing a drive motor; and, a spindle assembly for detachable engagement with an accessory to rotate the accessory within the preparation vessel, the spindle assembly having a gear assembly such that the accessory is driven at a speed that differs from that of the drive motor.

Preferably, the base is configured for detachable engagement with the food preparation vessel.

Preferably, the food processor further includes a drive coupling to couple the drive motor and the spindle assembly for rotating the accessory in the preparation vessel.

Preferably, the spindle assembly and the accessory detachably engage via abutting faces including at least one inclined face configured to urge the accessory into engagement with the spindle accessory when rotating in a driven direction. In a further preferred form, the abutting faces are configured to disengage the accessory and the spindle assembly when rotating the accessory relative to the spindle assembly in a direction opposite to the driven direction.

Preferably, the spindle assembly and the food preparation vessel are configured for detachable engagement, such that torsion from driving the accessory biases the spindle assembly into engagement with the food preparation vessel. Preferably, the detachable engagement between the spindle assembly and the food preparation vessel is a bayonet connection configured for relative rotation of the spindle assembly and the food preparation vessel.

Preferably, the gear assembly is a reduction gear assembly such that the accessory rotates at a speed less than that of the drive motor. Preferably, the reduction gear assembly provides a reduction ratio of more than three to one such that the spindle speed is less than one third the motor speed. In a particularly preferred form, the reduction ratio is approximately six to one such that the spindle speed is approximately one sixth the motor speed.

Spindle Assembly and Accessory Biased into Engagement Under Load

Also disclosed herein is a food processor including:
a food preparation vessel;
a base housing a drive motor; and,
a spindle assembly for detachable engagement with an accessory to rotate the accessory within the preparation vessel; wherein,
the spindle assembly and the accessory detachably engage via abutting faces including at least one inclined face configured to urge the accessory into engagement with the spindle accessory when rotating in a driven direction.

Spindle Assembly and Bowl Biased into Engagement Under Load

Also disclosed herein is a food processor including:
a food preparation vessel;
a spindle assembly for engaging an accessory for rotation in the food preparation vessel; wherein,
the spindle assembly and the food preparation vessel are configured for detachable engagement, such that torsion from driving the accessory biases the spindle assembly into engagement with the food preparation vessel.

Preferably, the spindle assembly has a spindle configured for engaging the accessory, and a spindle housing for detachable engagement with the food preparation vessel, such that the spindle is rotatable relative to the spindle housing. In a further preferred form, the spindle assembly has a thrust bearing within the spindle housing for rotatably mounting the spindle.

Preferably, the detachable engagement between the spindle assembly and the food preparation vessel is a bayonet connection configured for relative rotation of the spindle assembly and the food preparation vessel. In a further preferred form, the base is configured for detachable engagement with the food preparation vessel.

Preferably, the food processor further includes a base for detachable engagement with the food preparation vessel, the base housing a drive motor for rotating the spindle.

Preferably, the food processor further includes a drive coupling for coupling the drive motor and the spindle assembly. In a further preferred form, the spindle assembly has a gear assembly such that the accessory is driven at a speed that differs from that of the drive motor.

Preferably, the spindle and the accessory detachably engage via abutting faces including at least one inclined face configured to urge the accessory into engagement with the spindle accessory when rotating in a driven direction.

Spindle Assembly Only Engages Suitable Accessories

Also disclosed herein is a food processor including:
a food preparation vessel;
a base for detachable engagement with the food preparation vessel, the base housing a drive motor; and,
a spindle assembly for engaging an accessory for rotation in the food preparation vessel,
the spindle assembly has a gear assembly such that the accessory is driven at an adjusted speed that differs from that of the drive motor, the accessory being selected from a range of accessories having different food preparation functions; wherein,
the spindle assembly is configured to prevent engagement with at least one incompatible accessory included in the range of accessories, the incompatible accessory being configured to rotate in the food preparation vessel at a speed that differs from the adjusted speed, via a coupling to the drive motor.

Preferably, the gear assembly has reduction gearing such that the adjusted speed is less than the drive motor speed.

Preferably, the accessories that are compatible with the spindle assembly include one or more of:
a dicing assembly, and
a cheese grater/shredder.

Preferably, the reduction gear assembly provides a reduction ratio of more than three to one such that the spindle speed is less than one third the motor speed. In a particularly preferred form, the reduction ratio is approximately six to one such that the spindle speed is approximately one sixth the motor speed.

Spindle Assembly Compatible with Multiple Appliances

Also disclosed herein is a food preparation system including:
a plurality of food preparation devices, each food preparation device having different functions or capabilities to others of the plurality of food preparation devices; and,
a spindle assembly configured for detachable engagement with the plurality of food preparation devices to support a rotating accessory used for food preparation.

Preferably, at least some of the food preparation devices have a base with a drive motor for driving the spindle assembly. Preferably, the spindle assembly and each of the plurality of food preparation devices detachably engage via a bayonet coupling allowing relative rotation of the spindle assembly and the food preparation device.

Preferably, at least one of the plurality of food preparation devices is a food processor having a preparation vessel for holding foodstuffs being processed, the food preparation vessel being configured for detachable engagement with the spindle assembly.

Preferably, the food processor further includes a drive coupling for operatively connecting the drive motor and the spindle assembly. In a further preferred form, the spindle assembly has a gear system such that the rotatable accessory is driven at a speed that differs from that of the drive motor.

Preferably, the spindle assembly and the accessory detachably engage via abutting faces including at least one inclined face configured to urge the accessory into engagement with the spindle accessory when rotating in a driven direction.

Disc with Movable Catcher

Also disclosed herein is an accessory for a food processing device, the food processing device having a food preparation vessel and a spindle to rotatably drive the accessory within the food preparation vessel, the accessory comprising:
 a disc with formations to process foodstuffs during rotation within the food preparation vessel, and a central hub for detachably engaging the spindle; and
 a first ring and a second ring secured together such that a peripheral edge of the disc is sandwiched between the first and second rings.

Preferably, the first ring has formations to engage a first portion of the peripheral edge and the second ring has formations to engage a second portion of the peripheral edge such that the first portion and the second portion are each divided into segments with the first portions and the second portion segments being interleaved with each other about the circumference of the peripheral edge.

Preferably, the disc is a dicing disc with having a grid of metal dicing blades such that the ends of the dicing blades form the peripheral edge of the disc encapsulated between the first and second rings.

Preferably, the grid has a central aperture with the hub over moulded within the aperture to encase any exposed ends of the metal blades at the central aperture.

Chipping or Dicing Discs

Disclosed herein is an accessory for use in a food processor, the accessory comprising:
 an array of parallel blades for slicing food moving in a feed direction, each of the parallel blades having a depth dimension extending in the feed direction, wherein
 the parallel blades are mutually spaced by a distance greater than or equal to the depth dimension.

Preferably, the depth dimension is uniform for each of the parallel blades.

Preferably, the accessory further comprises an array of intersecting blades for cutting food into shapes with a predetermined cross-section.

Preferably, the food processor has a food preparation vessel and the accessory has orientation features for engagement with complementary features in the preparation vessel such that the accessory can selectively have at least two different orientations relative to the preparation vessel.

Preferably, the accessory is configured to engage the preparation vessel in a first orientation in which the array of intersecting blades is used to process food, and a second orientation in which the array of parallel blades is used to process food.

Preferably, the orientation features are positioned such that the accessory is rotated 180° between the first orientation and the second orientation.

Preferably, the array of parallel blades has at least one bridge extending between a pair of adjacent blades.

Preferably, each of the parallel blades have a length extending transverse to the feed direction, and at least some parallel blades are longer than others, such that the at least one bridge extends between intermediate positions on the longest of the parallel blades.

In some embodiments, the accessory further comprises a plurality of blade structure modules, one of the blade structure modules having the array of parallel blades, and at least one of the blade structure modules having a different blade structure; wherein,
 each of the blade modules are individually detachable and replaceable.

Preferably, the accessory further comprises a frame for mounting in the food processor; wherein,
 the blade structure modules are each detachably engageable with the frame.

Preferably, the food processor has a preparation vessel configured to engage the accessory in a plurality of orientations, each one of the orientations positioning a corresponding one of the blade structure modules in the preparation vessel for processing food fed into the food processor.

Preferably, the frame is a peripheral frame for surrounding the blade structure modules when mounted in the preparation vessel.

Preferably, one of the blade structure modules has an array of intersecting blades for dicing food.

Preferably, two of the blade structure modules are detachably engageable within the peripheral frame such that each of the blade structure modules are generally semi-circular in shape.

Also disclosed herein is an accessory for use in a food processor, the accessory comprising:
 a peripheral frame;
 parallel blades extending within the peripheral frame for cutting food into slices; and
 at least one bridge extending between intermediate positions along at least two of the parallel blades.

Preferably, the food processor feeds the food through the parallel blades in a feed direction, wherein the parallel blades have a uniform depth in the feed direction and are mutually spaced from each other by a distance greater than or equal to the uniform depth.

Preferably, the bridge has a depth in the feed direction equal to that of the parallel blades.

Preferably, the accessory further comprises an array of intersecting blades for cutting food into shapes with a predetermined cross-section.

Preferably, the food processor has a food preparation vessel and the accessory has orientation features for engagement with complementary features in the preparation vessel such that the accessory can selectively have at least two different orientations relative to the preparation vessel.

Preferably, the accessory is configured to engage the preparation vessel in a first orientation in which the array of intersecting blades is used to process food, and a second orientation in which the array of parallel blades is used to process food. Preferably the orientation features are positioned such that the accessory is rotated 180° between the first orientation and the second orientation.

Preferably, the accessory further comprises a catcher movable to a first position to retain food from the parallel blades from falling into the preparation vessel, and a second position to retain food from the intersecting blades from falling into the preparation vessel, the accessory being configured such that the catcher is in the first position for the accessory to engage the preparation vessel in the second orientation, and the second position for the accessory to engage the preparation vessel in the first orientation.

Also disclosed herein is an accessory for use in a food processor, the food processor having a receptacle to receive food feed through an inlet in a feed direction, the accessory comprising:
- a first structure for performing a first processing operation,
- a second structure for performing a second processing operation,
- the first structure and the second structure being respectively positionable to process food fed through the inlet;
- a catcher movable to a first position to retain food falling through the first structure into the receptacle while the second structure processes food fed through the inlet; and
- the catcher is movable to a second position to retain food falling through the second structure into the receptacle while the first structure processes food fed through the inlet.

Preferably, the catcher has an array of apertures allowing liquid to drain into the receptacle. Preferably, the catcher is configured to rotate about a hinge axis between the first position and the second position. Preferably, the array of apertures are symmetrical about an axis of symmetry extending normal to the hinge axis.

Cleaning Tool

Also disclosed herein is a cleaning tool for cleaning an accessory for a food processor with a receptacle for processed food, the accessory having a first structure and a second structure and a catcher to selectively move between the first structure and the second structure to retain food from the first structure or the second structure respectively:
- the catcher having an array of apertures allowing liquid to drain into the receptacle, the cleaning tool comprising:
  - an array of protrusions positioned in registration with the array of apertures, the protrusions being sized to extend through the apertures to clean away any residual food; wherein
  - the array of protrusions has at least one axis of symmetry such that the protrusions are selectively inserted into the apertures from either side of the catcher.

Preferably, the protrusions are dimensioned for a slight interference fit in the apertures to releasably retain the cleaning tool on the accessory.

Preferably, the protrusions extend into voids within the first structure when extending through the apertures from a first side of the catcher, and extend into voids in the second structure when extending through the apertures from a second side of the catcher.

Preferably, the first structure and the second structure are a first array of blades and a second array of blades respectively, such that the protrusions contact the first array of blades when extending through the apertures from the first side of the catcher, and contact the second array of blades when extending through the apertures from the second side of the catcher.

Also disclosed is a system for processing food, the system comprising:
- a food processor with a preparation vessel to receive processed food; and,
- an accessory according to those described above for position in the preparation vessel.

BRIEF DESCRIPTION OF DRAWINGS

The invention will now be described by way of example only with reference to the preferred embodiments illustrated in the accompanying drawings, in which:

FIGS. 9A, 9B and 9C show the dicing disc and the dicing grid of the dicing assembly, while

DESCRIPTION OF EMBODIMENTS

Figure 1A:
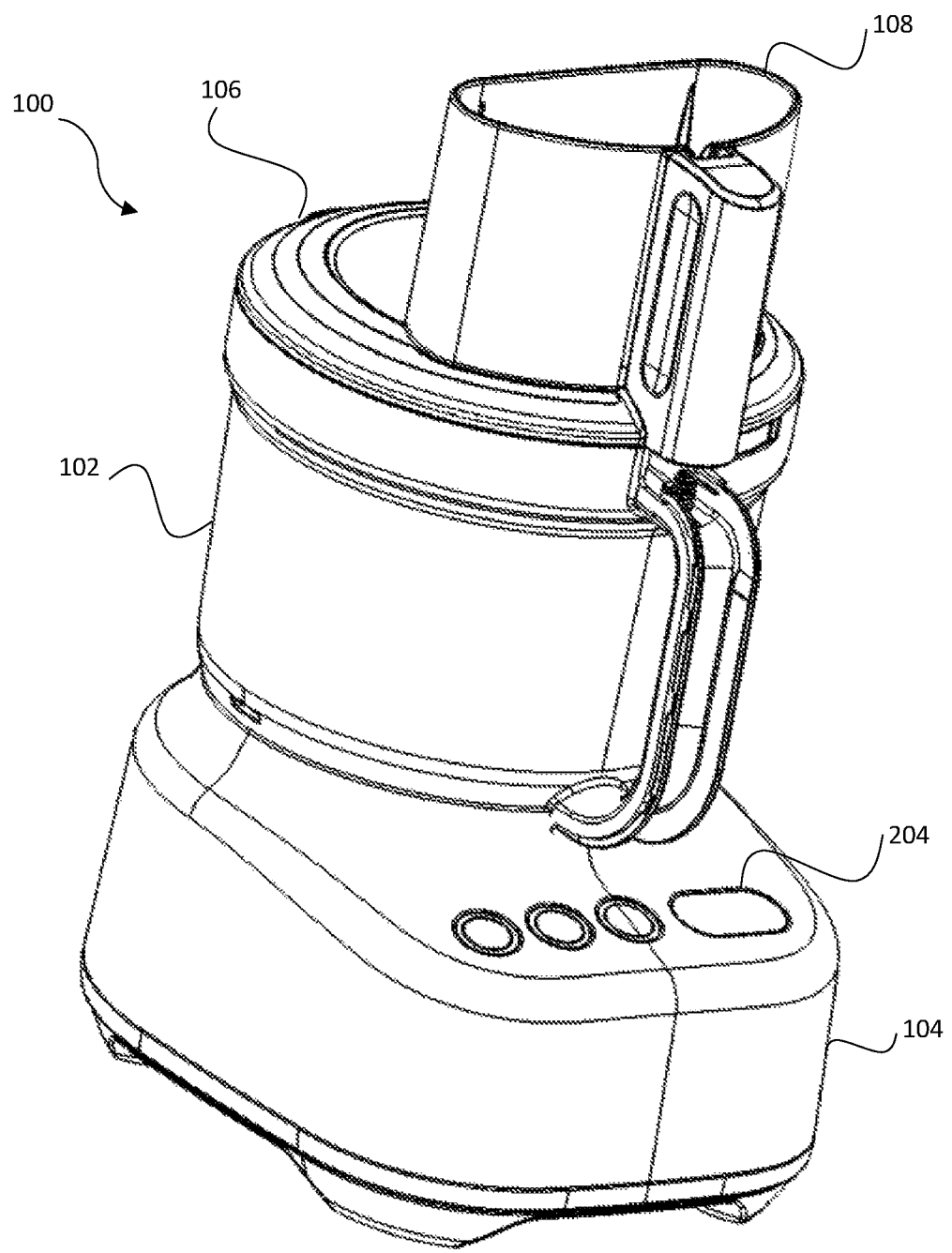
FIG. 1A is a perspective of a food processor for use with accessories according to the present invention.

FIG. 1A shows a food processor 100 having a food preparation vessel in the form of a bowl 102 engaged with a base 104 housing a drive motor. User controls 204 on the base 104 control the operation of the motor. The top of the preparation bowl 102 is closed with a lid 106 including a food chute 108 for safely inserting food stuffs into the bowl 102 to be processed.

Figure 1B:
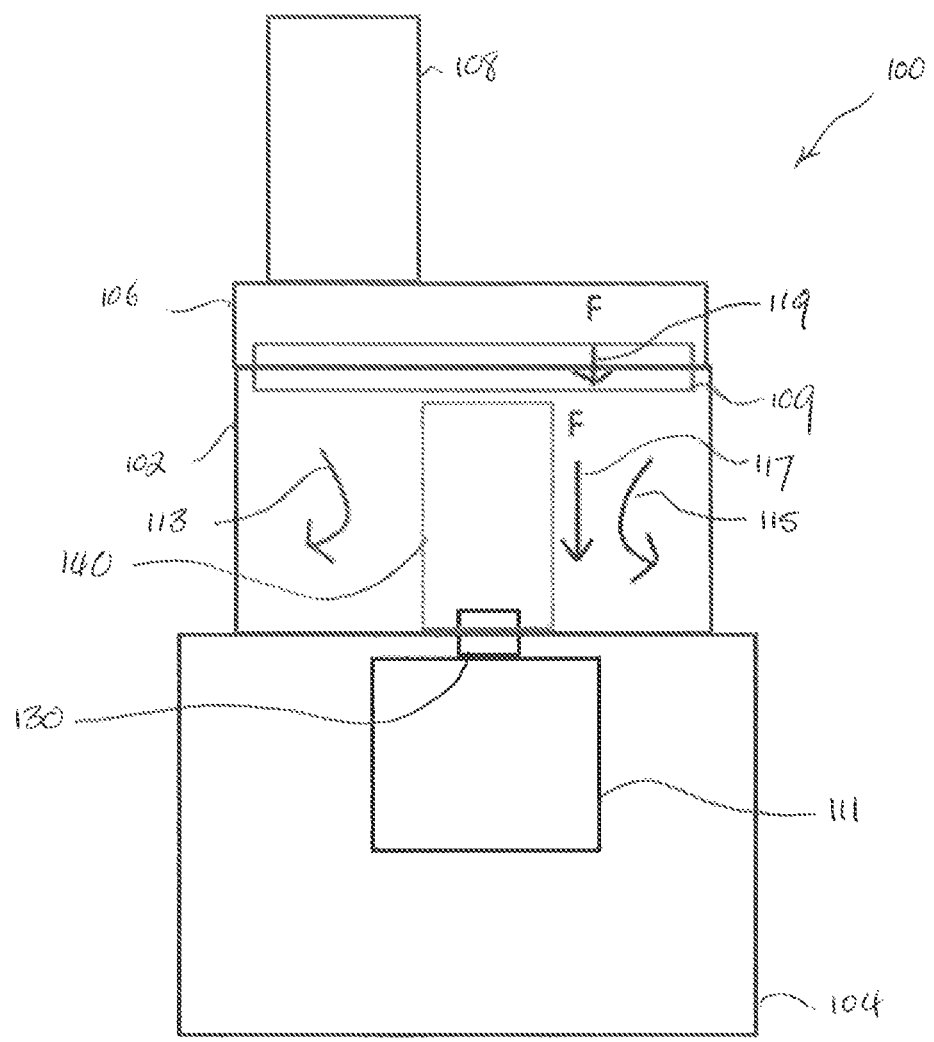
FIG. 1B is a schematic elevation of the food processor of FIG. 1A showing the forces acting on the spindle assembly and the accessory during operation.

FIG. 1B provides a schematic overview of the forces acting within the food processor of FIG. 1A when under load and when under no load conditions. In the drive base 104 the motor 111 drives the spindle assembly 140 via the coupling 130. The spindle assembly 140 is detachably connected to the base of the food preparation vessel 102 as discussed in greater detail later in the specification. The connection between the spindle assembly 140 and the food preparation vessel 102 is such that when the spindle is driven in the anticlockwise direction indicated by arrow 115, the torsion generated acts to bias the spindle assembly further into engagement with the food preparation vessel 102. This force is indicated by arrow 117. Furthermore an accessory disc 109 is attached to the spindle assembly 140 and driven in anticlockwise direction 115. This also creates a reactive torsion between the spindle assembly 140 and the accessory disc 109. The drive faces used to transmit torque to the accessory disc, bias the accessory disc downwardly into engagement with the spindle assembly as indicated by arrow 119. This keeps the position of the accessory disc 109 stable within the lid 106 to more uniformly process the food.

In the no load condition, any torsion or rotation of the accessory disc and/or the spindle assembly 140 in the clockwise direction indicated by arrow 113, will bias toward disengagement of the disc 109 and the spindle assembly 140. The spindle assembly 140 is likewise biased towards disconnection with the base of the food preparation vessel 102. This is convenient for the user when disassembling the components of the food processor 100 after a food preparation operation and in readiness for cleaning.

Figure 2A:
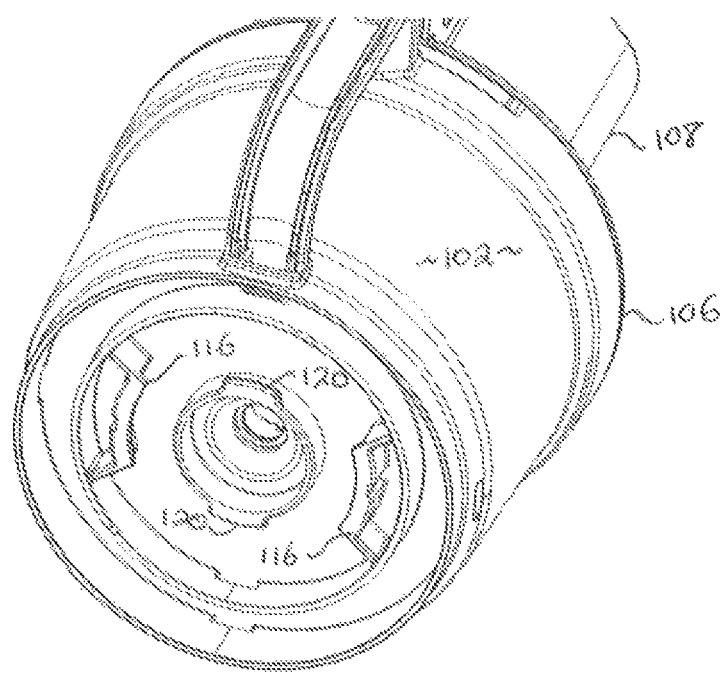
FIG. 2A is a bottom perspective of the food preparation bowl shown in FIG. 1A.
Figure 2B:
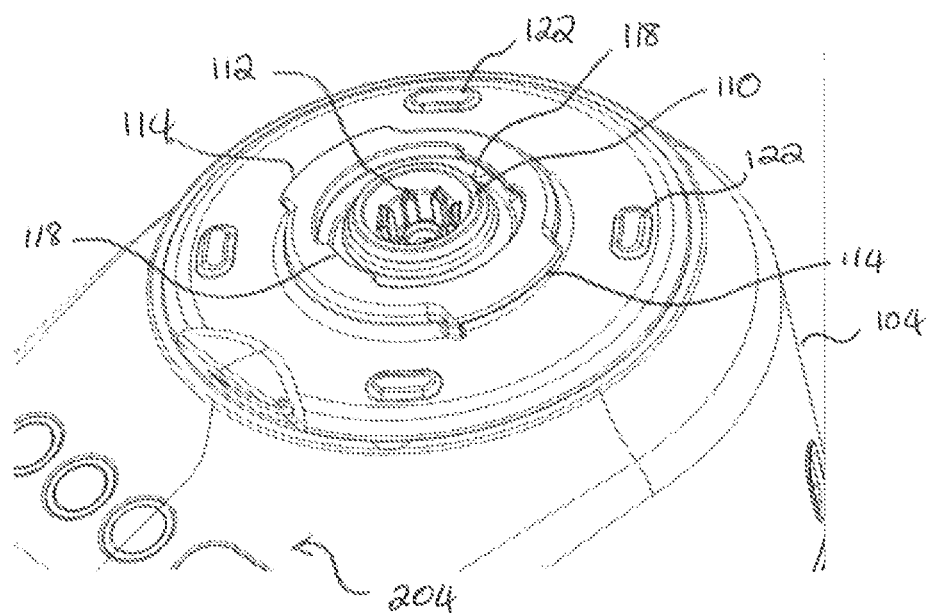
FIG. 2B is a top perspective of the food processor base shown in FIG. 1A with the food preparation bowl removed.

Referring to FIGS. 2A and 2B, the food preparation bowl 102 is shown separated from the base 104. The connection between the bowl 102 and the base 104 is provided by two separate bayonet connections. As shown in FIG. 2A, the bottom of the bowl 102 has outer bowl bayonet features 116 and inner bowl bayonet features 120 for simultaneous engagement with the outer base bayonet features 114 and the inner base bayonet features 118 shown in FIG. 2B. When both bayonet connections are engaged, the bowl 102 is pressed onto the soft pads 122 of the base 104 to damp vibration and noise during operation.

As best shown in FIG. 2B, the drive motor output 110 is conveniently provided in the form of a spline drive socket 112. The spline drive socket 112 receives the lower spline drive 126 of the drive coupling 130 (see FIGS. 3 and 4). The drive coupling 130 extends through the base aperture 124 in the bottom of the bowl 102 to transfer power from the drive motor to the spindle assembly 140 (see FIG. 4).

Figure 3:
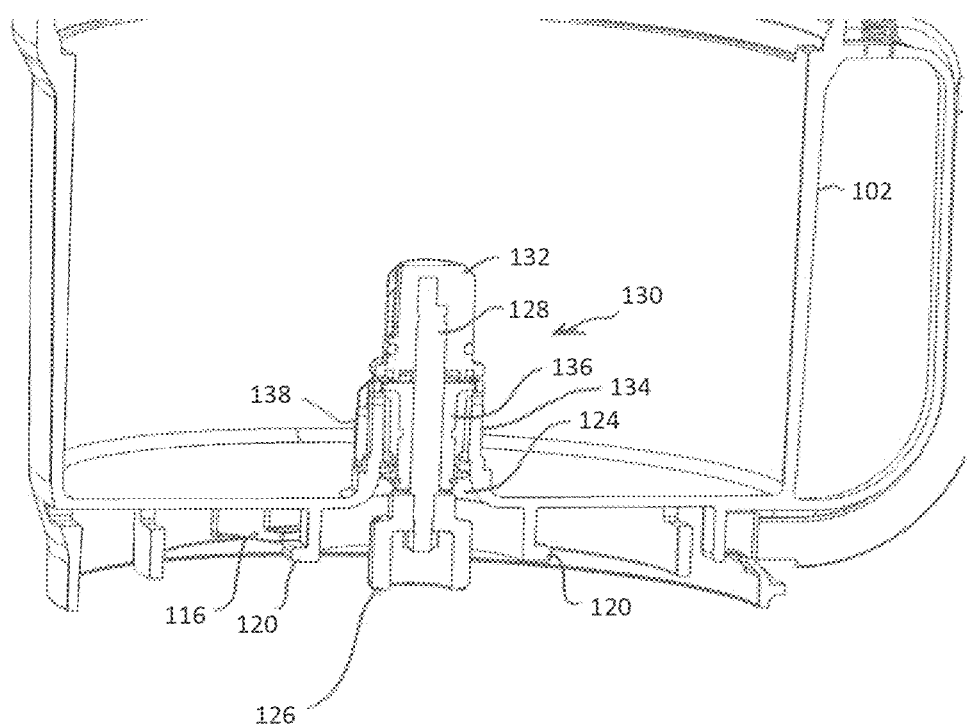
FIG. 3 is a section view through the food preparation bowl and the drive coupling, with the spindle assembly and lid removed for clarity.

The section view of the bowl 102 shown in FIG. 3 shows the drive coupling 130 inserted into the bowl 102. The spindle assembly 140 has been omitted in the interests of clarity. The bottom of the preparation bowl 102 has an integrally formed coupling sleeve 134 defining the base aperture 124 for holding the drive coupling 130. The drive coupling 130 is held in the sleeve 134 by a fixed bush 136. A drive axle 128 extends through the bore of the fixed bush 136 to freely rotate therein. At the lower end of the drive axle 128 is the lower spline drive 126 with exterior splines for engagement with the spline drive socket 112 described above. The upper end of the drive axle 128 is keyed to the spindle spline drive 132 such that during use, the spline drive 132 rotates at the same speed as the drive motor output 110.

Figure 4:
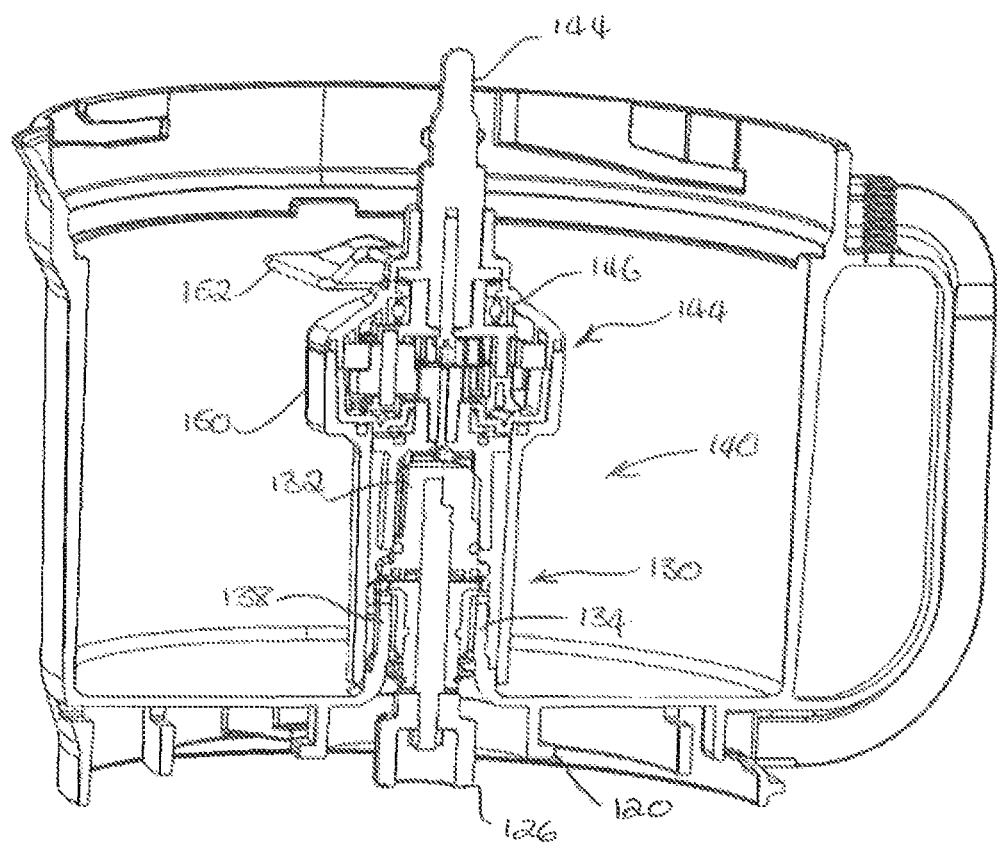
FIG. 4 is a section view of the food preparation bowl together with the drive coupling and the spindle assembly, with the lid of the bowl removed for clarity.

Referring to FIGS. 3 and 4, the exterior of the coupling sleeve 134 has integrally formed internal bayonet features 138 for engagement with the spindle assembly 140. In FIG. 4, the spindle assembly 140 is shown engaged with the coupling sleeve 134 via the internal 11 23483172 bayonet features 138. This detachable coupling is described in greater detail below with reference to FIGS. 5, 6 and 7. FIG. 4 also shows the spindle spline drive 132 of the drive coupling 130 engaged with the spindle input socket 148. In turn, this provides the input power to the reduction gear assembly 144 such that the spindle 142 is driven at a slower speed than the drive motor output 110 (see FIG. 2B). The reduction gear assembly 144 is described in greater detail below with reference to the exploded perspective shown in FIG. 8C.

The spindle assembly 140 includes a food leveler 152 that rotates together with the accessory spindle 142 on the thrust bearing 146. Skilled workers will understand that processed food stuffs do not fill the preparation bowl 102 uniformly and the sweeping action of the food leveler 152 moves food away from the exit of the feed chute 108 (see FIG. 1) so as not to obstruct incoming food.

Figure 5:
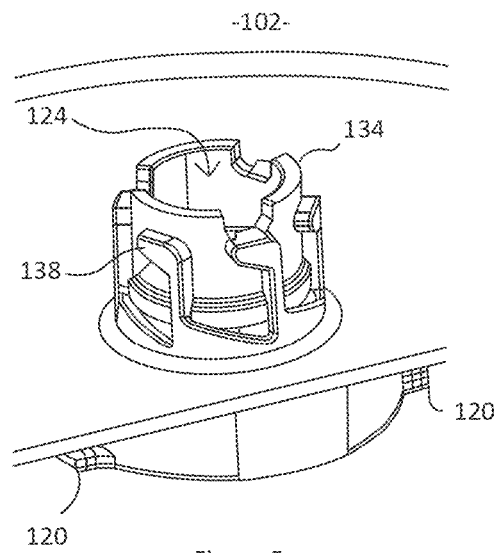
FIG. 5 is an enlarged partial perspective of the drive coupling sleeve formed in the base of the food preparation bowl shown in isolation.
Figure 6:
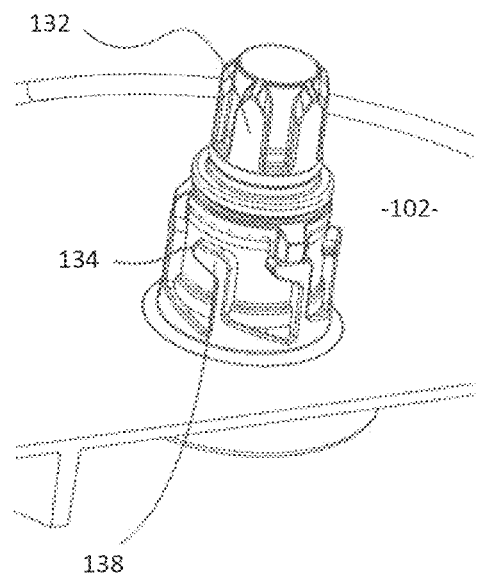
FIG. 6 is the enlarged sectioned perspective of the drive coupling sleeve shown in FIG. 5 together with the drive coupling.
Figure 7:
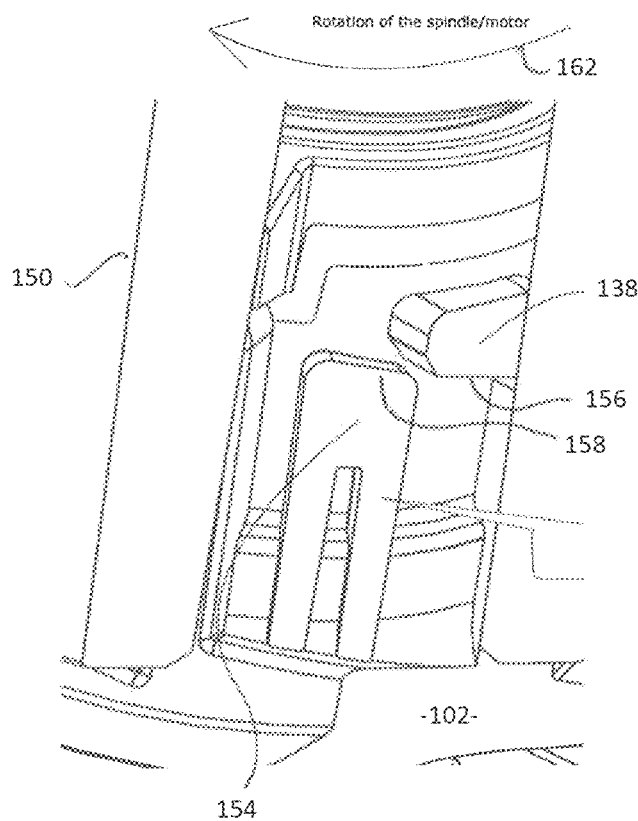
FIG. 7 is a further enlarged sectioned perspective showing the bayonet connection formations integrally formed on the exterior of the drive coupling sleeve.

Referring to FIGS. 5, 6 and 7, the bayonet connection between the spindle assembly 140 and the coupling sleeve 134 of the preparation bowl 102 is shown in greater detail. Bayonet features 138 are integrally formed on the exterior of the coupling sleeve 134 (which in turn is integral with the bowl 102). As best shown in FIG. 7, the spindle housing 150 has a series of vertical rib features 154 integrally formed about the interior surface of the lower end of the spindle assembly 140 (see FIGS. 4 and 8B). The internal bayonet features 138 have inclined surfaces 156 positioned to engage and slide over the complementary surfaces 158 on top of each of the bayonet ribs 154. As the food processing accessory (for example a dicer) engages with the food, there is a reactive torque that transfers through to the spindle housing 150 acting in a direction 162 opposite to the rotation of the spindle/motor. This torsion on the spindle housing 150 urges the rib features 154 further into engagement along the inclined surface 156 of the bayonet feature 138.

Figure 8A:
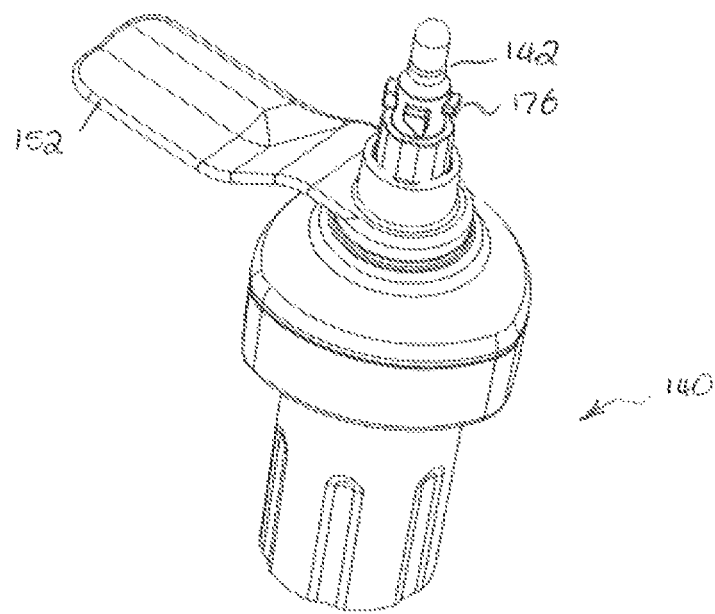
FIGS. 8A, 8B and 8C is a perspective, section view and exploded perspective respectively, of the spindle assembly.
Figure 8B:
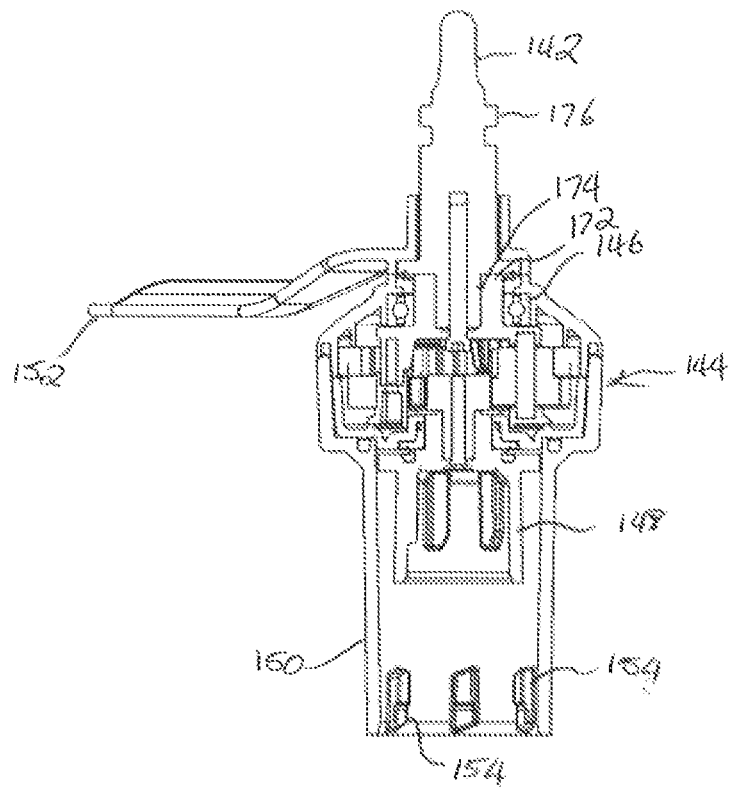
Figure 8C:
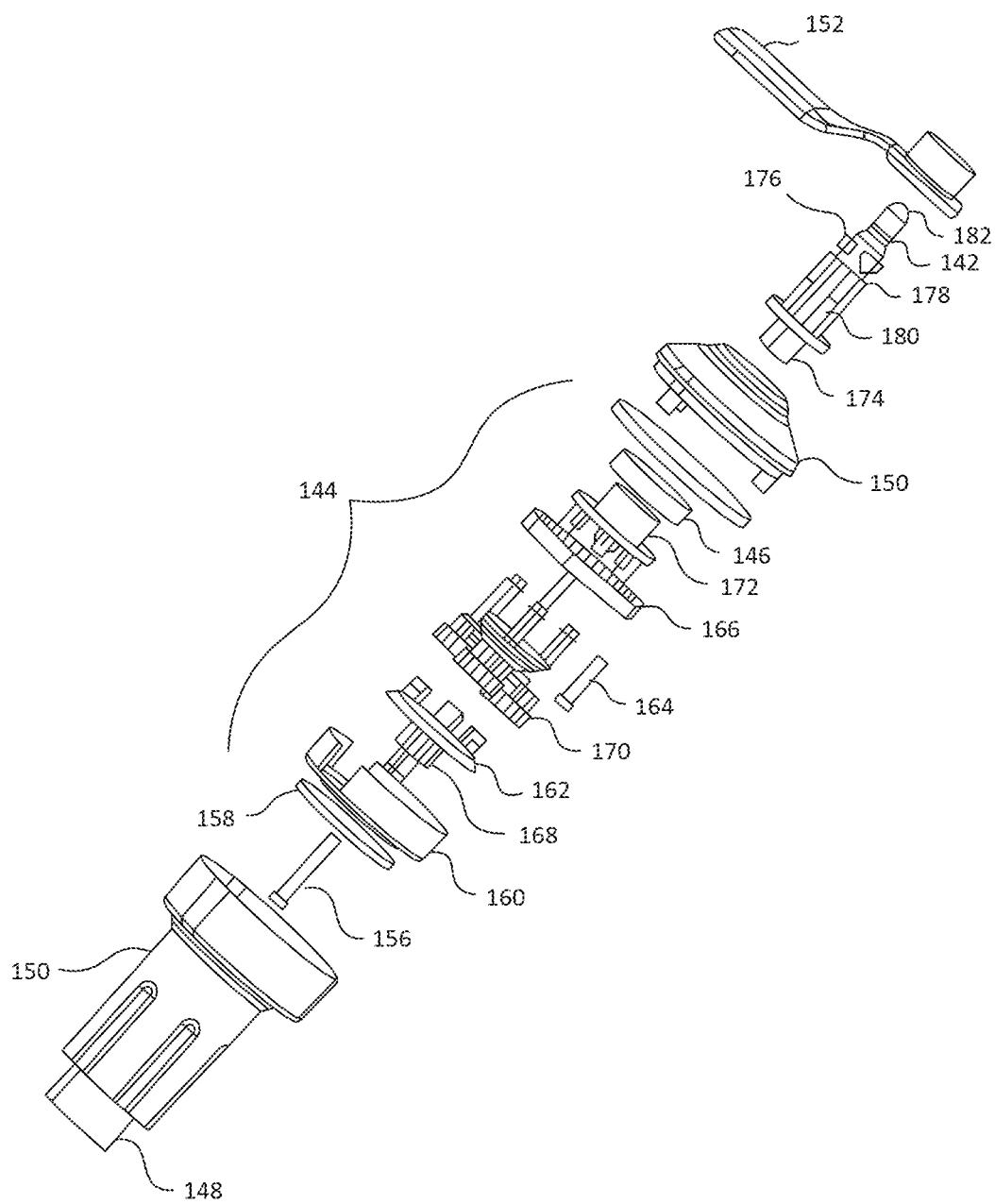
Figure 9A:
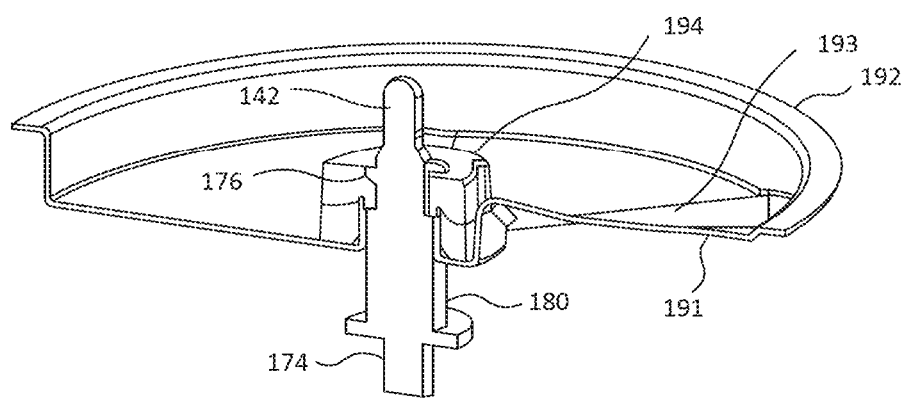
Figure 9B:
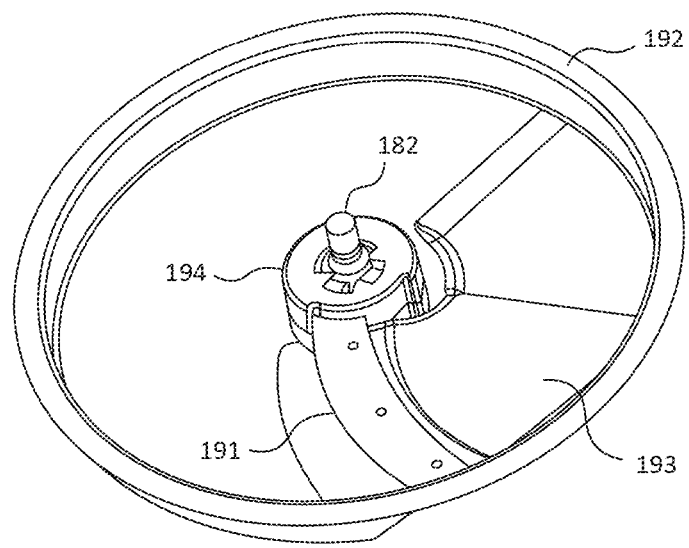
Figure 9C:
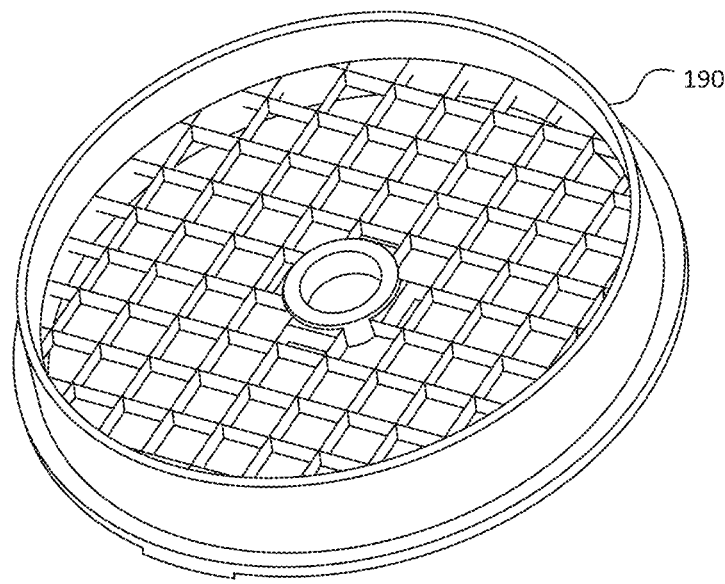
Figure 9D:
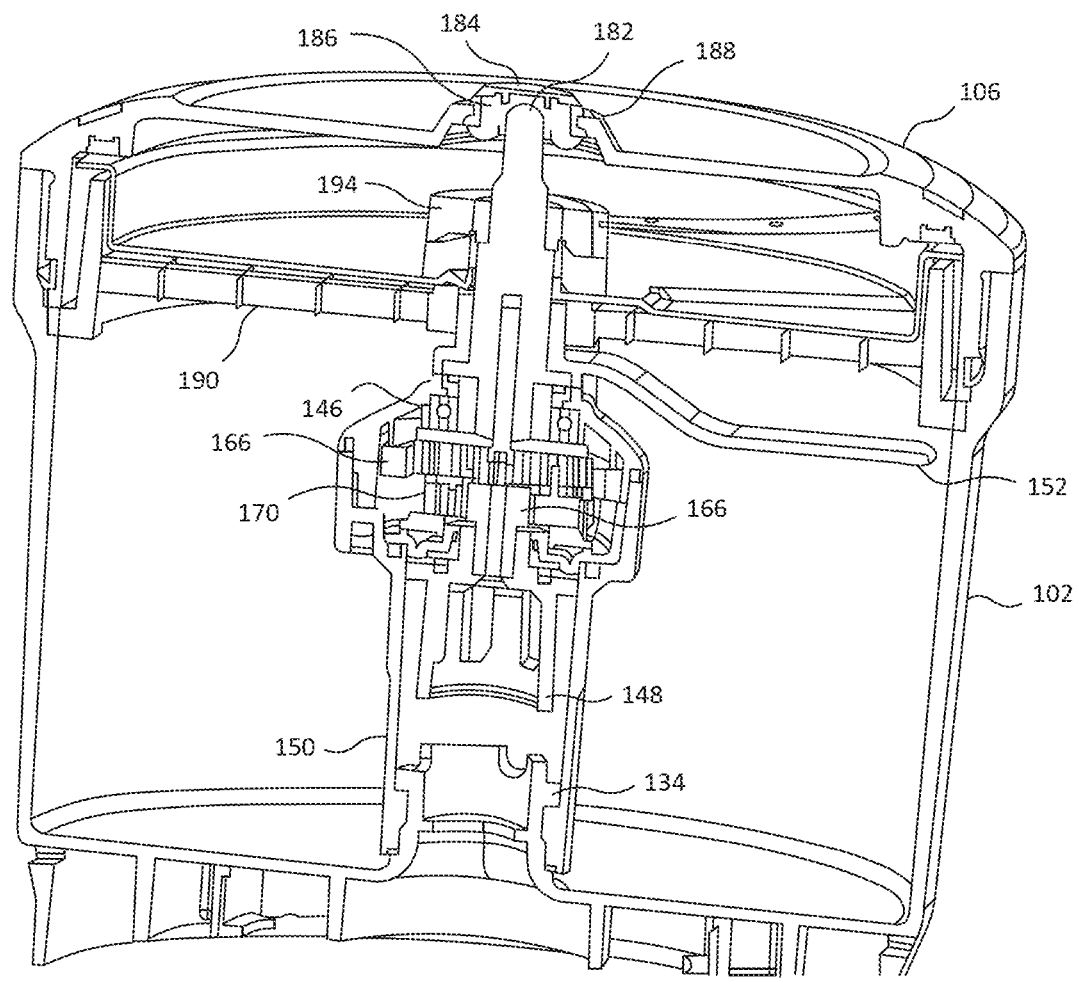
FIG. 9D is a sectioned perspective of the food preparation bowl with the lid, dicing assembly and spindle assembly.

The components of the spindle assembly 140 are shown in FIGS. 8A, 8B and 8C. As described above, the spindle assembly 140 has a spindle housing 150 which detachably engages the bottom of the food preparation bowl 102. Rotatably mounted within the spindle housing 150 is the spindle input socket 148 with internal spine formations for engagement with the spindle spline drive 132 of the drive coupling 130 (as described above).

As best shown in FIGS. 8A and 8B, the spindle input socket 148 drives the sun gear 168 using the fastening pin 156. The reduction gear assembly 144 (see FIG. 8C) uses planetary gears to reduce the speed of the square drive socket 172 while increasing the torque. In the gear assembly shown, the reduction ratio is 6:1, but the particular gear reduction used will ultimately depend on the optimum functioning of the accessory to be driven. Usually a reduction of at least 3:1 is required for the torque increase (and speed decrease) that will enhance some slicers, shredders, mixers or graters.

A gear chassis 160 is seated within the spindle housing 150 on seal 158. The gear chassis 160 holds the planetary gear bracket 162 on which the three planetary gears 170 are rotatably mounted. The larger diameter bottom portion of the planetary gears 170 engages the sun gear 168 while the smaller diameter portions of the planetary gears 170 engage the internal gear 166. The internal gear 166 is rigidly secured to the spindle housing 150 via the three steel fastening pins 164. Rotating on top of the internal gear 166 is the square drive socket 172 fixed to the three axles of the planetary gears 170. The top portion of the spindle housing 150 has an access opening allowing the square drive 174 of the spindle 142 to engage with the square drive socket 172.

The spindle 142 has external leveler splines 180 that mate with the internal splines of the food leveler 152. As previously described, this rotates beneath the accessory to stop processed food from piling too high beneath the chute 108. Above the leveler splines on the spindle 142 is an accessory seal 178 to abut the central hub of the accessory disc 194 (described below). Adjacent the seal 178 are inclined drive faces 176 for abutting engagement with complementary faces 196 formed within the hub 194 of the accessory 192.

At the top of the spindle 142 is a domed tip 182 that is held in a spindle retainer 186 fixed into the central aperture 188 of the lid 106 by the retainer bracket 184. The spindle retainer 186 is a low friction material (e.g. POM plastic) that will not melt when the spindle 142 is rotating at high speeds and/or pressed upwardly against the lid 106.

Figure 10:
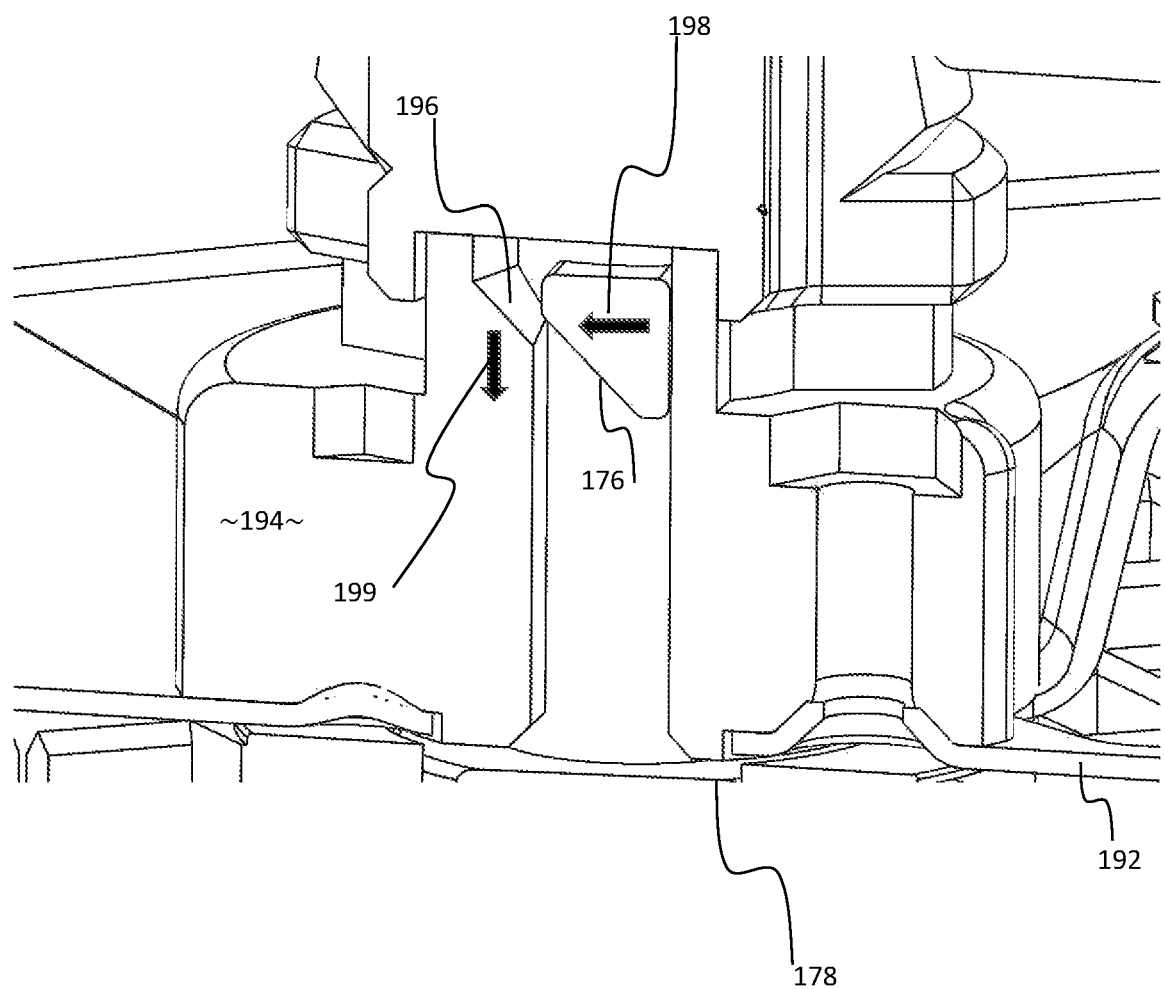
FIG. 10 is an enlarged partially sectioned perspective of the inclined drive faces on the spindle engaging with complementary faces on the dicing accessory.

FIG. 10 shows an enlarged partial section view of the inclined drive faces 176 of the spindle 142 engaging the complementary faces 196 formed within the hub 194 of the accessory 192. During use, the spindle is driven in the direction of arrow 198. The force of the drive faces 176 on the complementary faces 196 not only rotates the accessory but a component 199 of the contact force is directed downward to urge the accessory 192 into engagement with the spindle 142. Specifically, the accessory 192 is urged against the accessory seat 178 of the spindle 142 such that food debris is prevented from getting between the spindle and the accessory hub 194 which would otherwise hold the disc 192 in an incorrect position. In the embodiment shown, the spindle 142 has four diametrically opposed drive faces 176, each of which engage the complementary faces 196 of the accessory 192. The drive faces 176 are inclined to the direction of driven rotation 198 and angled downwards while the complementary faces 196 are inclined to the direction of driven rotation 198 and angled upwards (with respect to their orientation during normal use as shown in FIG. 10). Skilled workers in this field will appreciate that both sets of engaging surfaces on the spindle and the accessory hub need not by inclined to the direction of rotation 198. The downward bias of the accessory 192 onto the accessory seat 178 can be achieved if only the spindle has drive faces inclined to the direction of rotation or the accessory hub has driven faces inclined to the direction of rotation.

Figure 11:
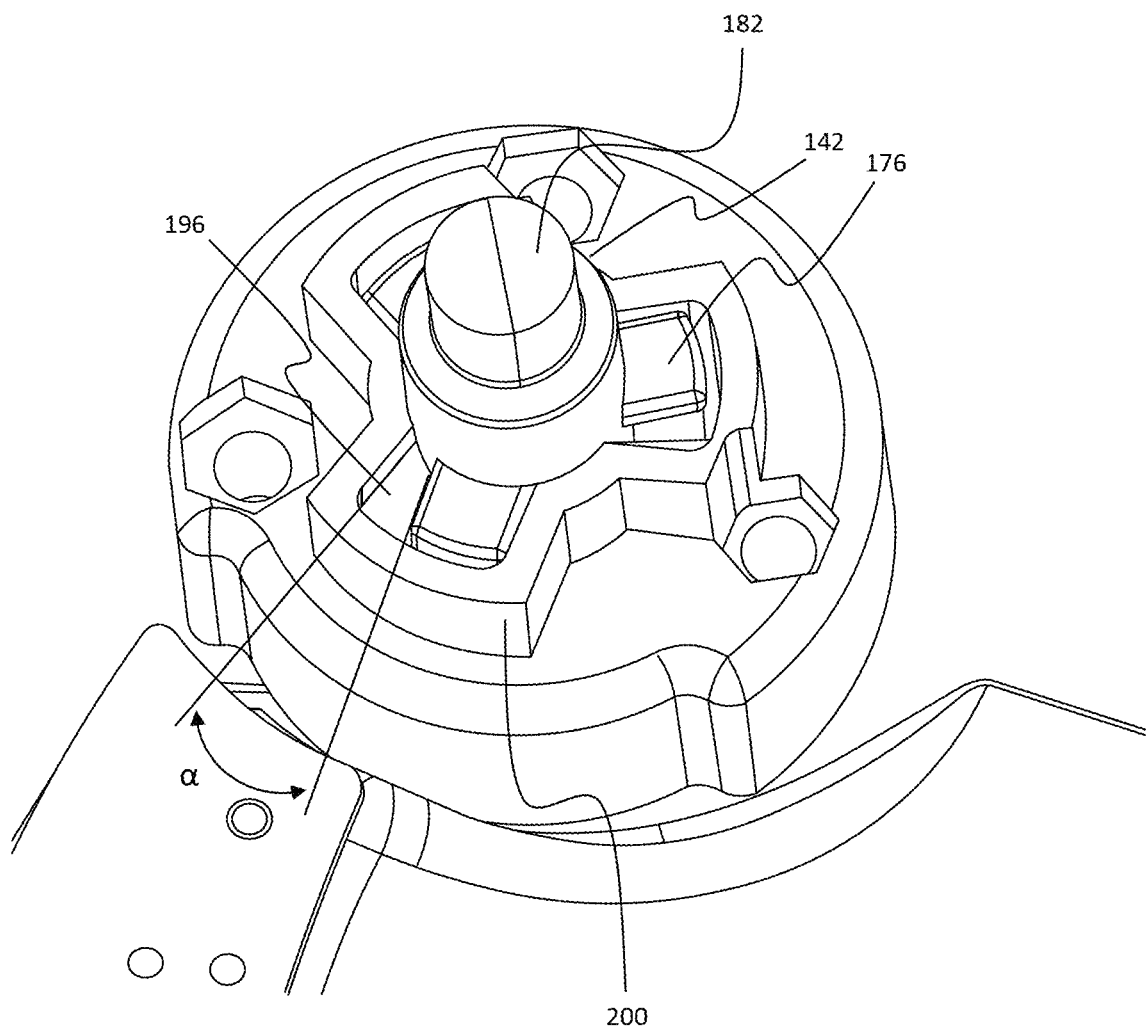
FIG. 11 shows the spindle engaged with the hub of the dicing disc in isolation.
Figure 12:
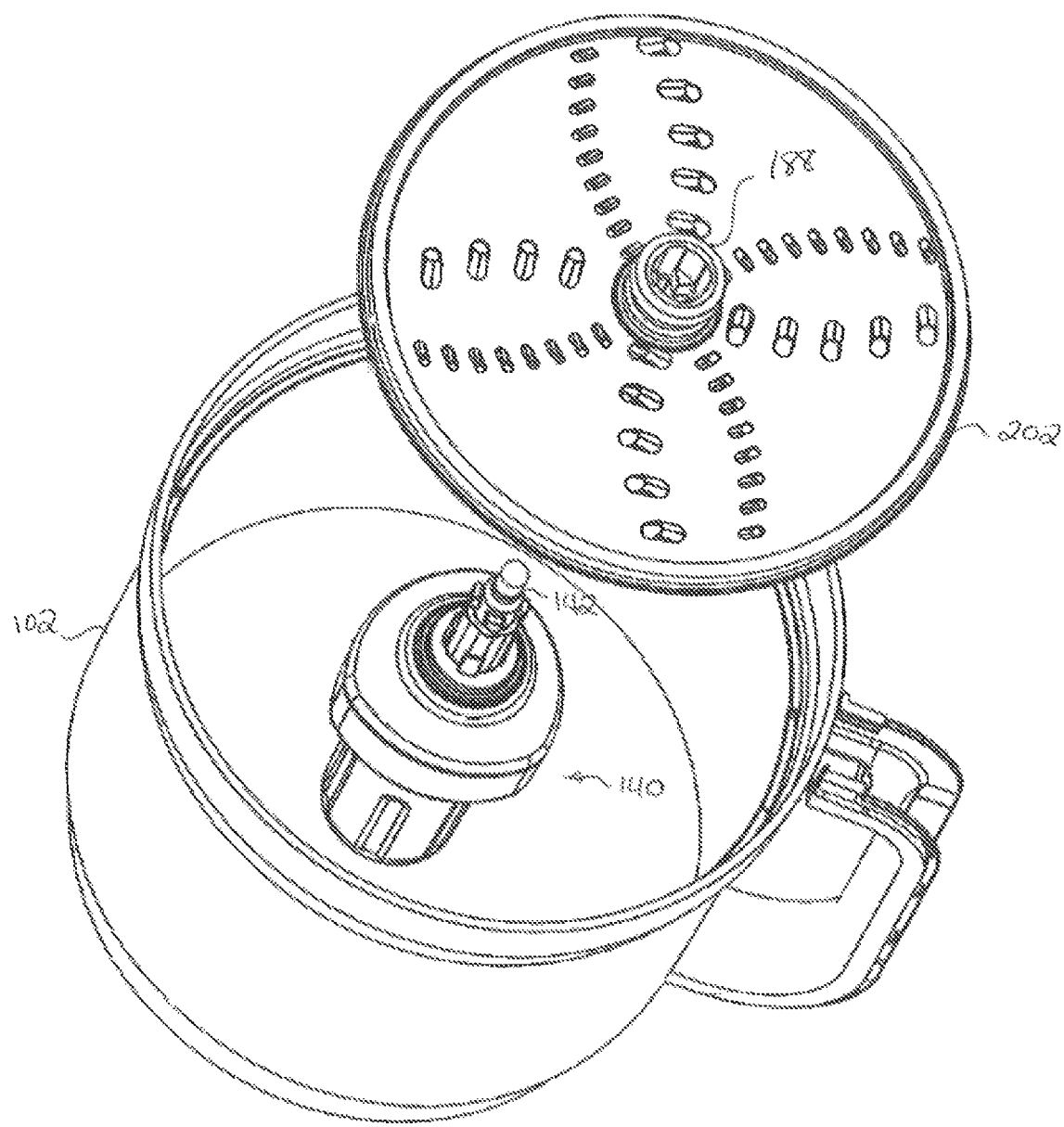
FIG. 12 is an exploded perspective of the food preparation bowl with the spindle assembly and a detached cheese grating/shredding disc.
Figure 13:
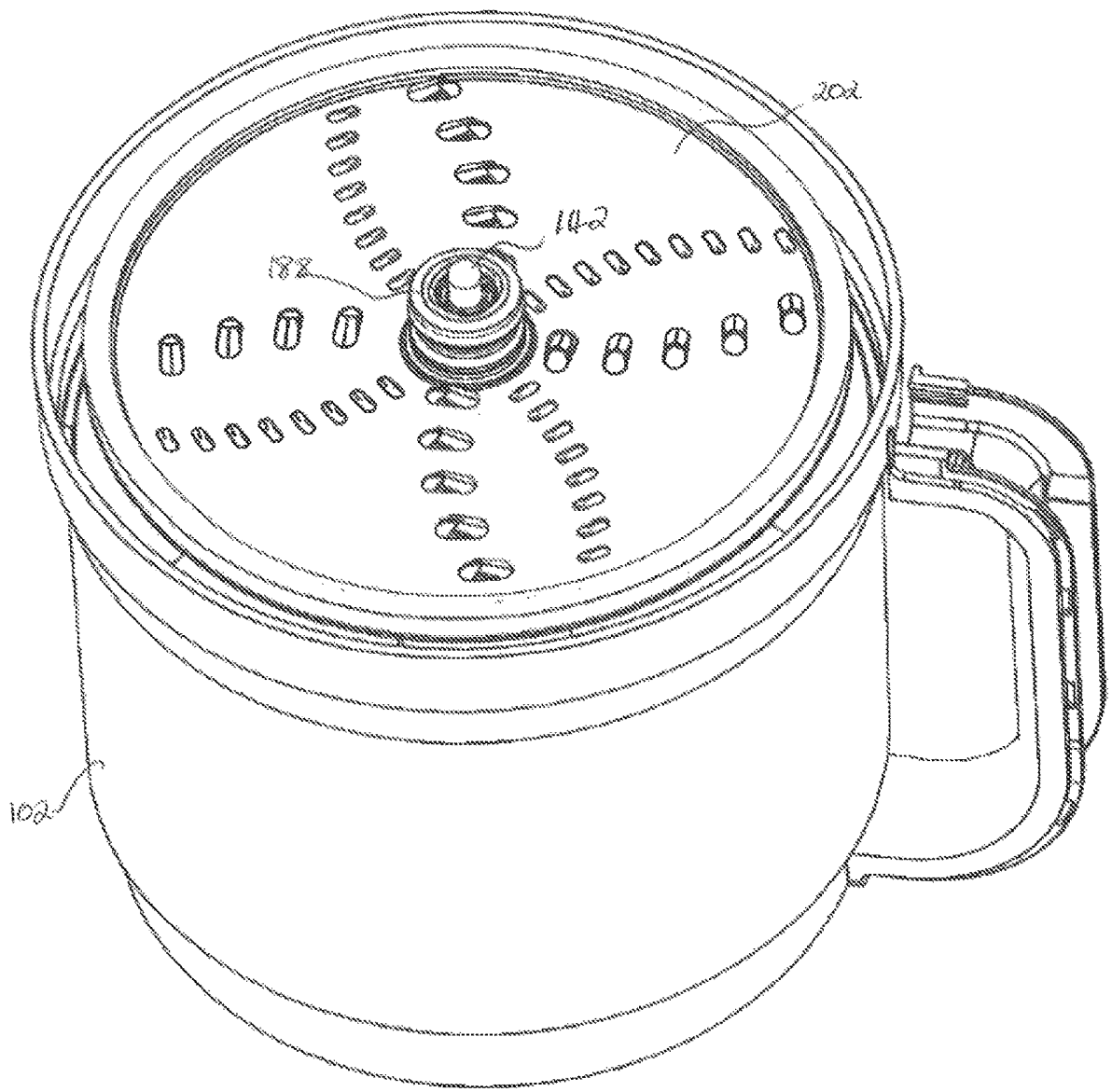
FIG. 13 is a perspective of the cheese grating/shredding disc engaged with the spindle assembly and bowl shown in FIG. 12.
Figure 14:
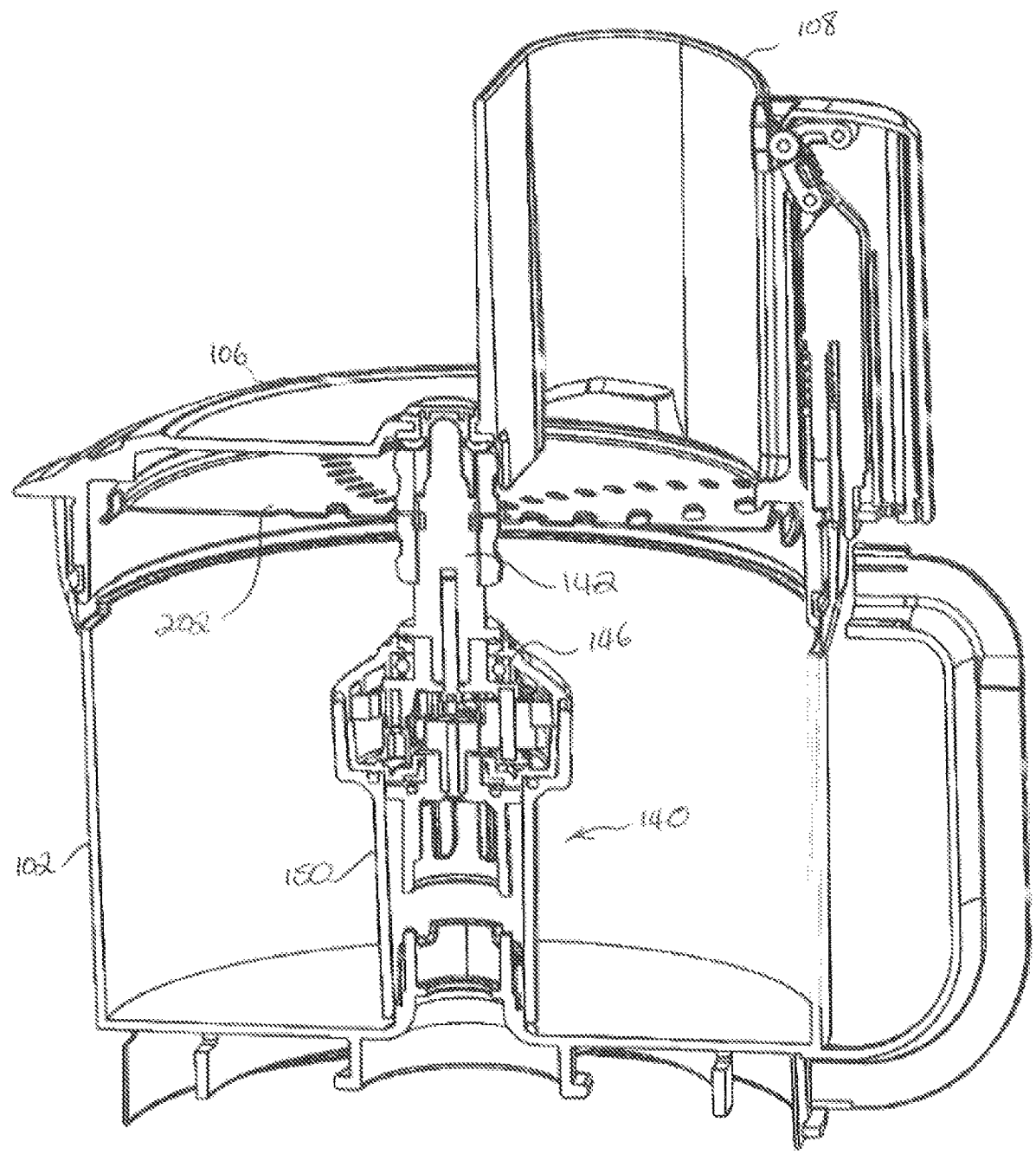
FIG. 14 is a cross section view of the bowl spindle assembly and cheese grater/shredder disc shown in FIG. 12 together with the lid and feed chute.
Figure 15:
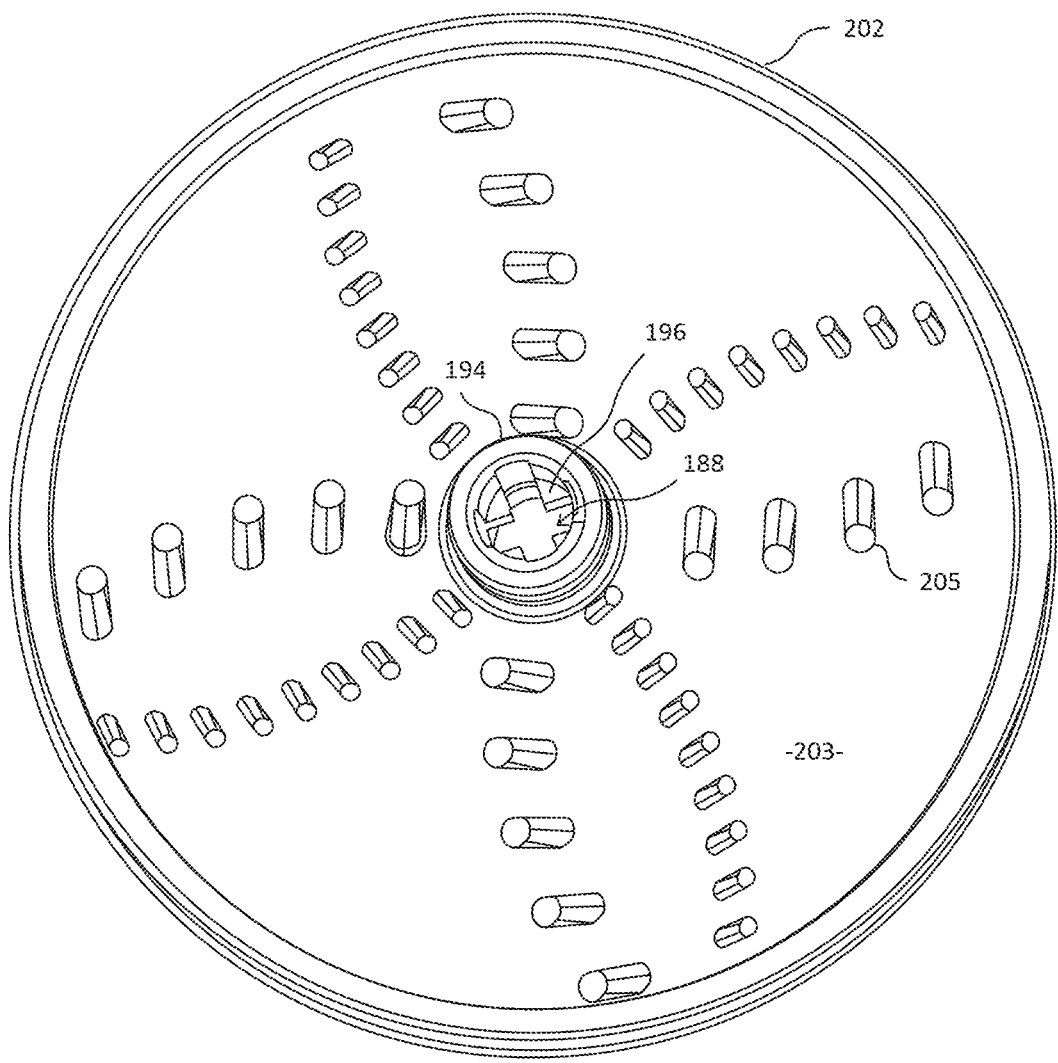
FIG. 15 shows the cheese grater side of the cheese grater/shredder disc shown in FIG. 12.

As shown in FIG. 11, the hub 194 of the accessory 192 is provided with a drive face receiving recess 200 to guides the drive faces 176 on the spindle exterior into engagement with the complementary faces 196 within the accessory hub 194. The drive face receiving recesses 200 allows some relative rotation between the spindle 142 and the accessory 192. Rotating the accessory 192 relative to the spindle 142 through an angle α, completely disengages the spindle from the hub 194 so the accessory 192 can be lifted free of the spindle. This effectively prevents the accessory 192 from getting jammed on the spindle 142 by residual processed food while at the same time ensuring the accessory is firmly biased into engagement with the spindle during operation.

Dicing dense or fibrous foods such as potato, sweet potato and beetroot can benefit from reducing the speed and increasing the torque on the dicing disc 192. Referring back to FIGS. 9A to 9D, the dicing disc 192 has dual functionality. Firstly, the leading edge of the blade 191 rotationally cuts into the food being processed. Secondly a ramped section 193 of the dicing disc 192 behind to the blade, forces the food being processed onto the dicing grid 190 beneath. The dicing grid 190 is a matrix of cutting blades arranged specifically to the size of food required to be processed.

This two-stage process is more efficient for foods such as sweet potato when the dicing disc 192 is driven with a higher torque. On the other hand, if the dicing disc 192 operates at high speeds, there is a greater risk of incomplete processing, particularly of high density fibrous foods, that often results in inconsistent food quality or jamming of the appliance. High speed, high torque processing also increases the potential for motor failure due to a high electrical current draw in order to maintain motor speed under load.

The slower processing speed provided by the spindle assembly 140 improves control and function of the dicing disc 192 and dicing grid 190 as the interaction between the accessory and the food is more accurate and efficient. Incorporating the gear assembly into the spindle assembly, instead of into multiple different accessories that functions better at a lower speed, is more cost effective. Having the gear assembly in the spindle assembly also provides the scope to position the gears towards the top of the bowl, which need not reduce the internal volume at the lower portion of the mixing bowl. Less volume at the lower portion of the bowl can have a negative practical impact during use.

A further embodiment of the food processor will now be described with reference to FIGS. 12 to 20. In this embodiment a cheese grating/shredding disc 202 engages the spindle 142 within the bowl 102 in two different orientations depending on whether grating or shredding is required. When the disc 202 is placed on the spindle with the shredding side 207 upwards, the shredding formations 209 are protruding upwards to engage the food (see FIGS. 16, 17 and 20). On the grating side 203, the grating formations 205 protrude upwardly (see FIGS. 12, 13, 14, 15, 18 and 19).

Figure 16:
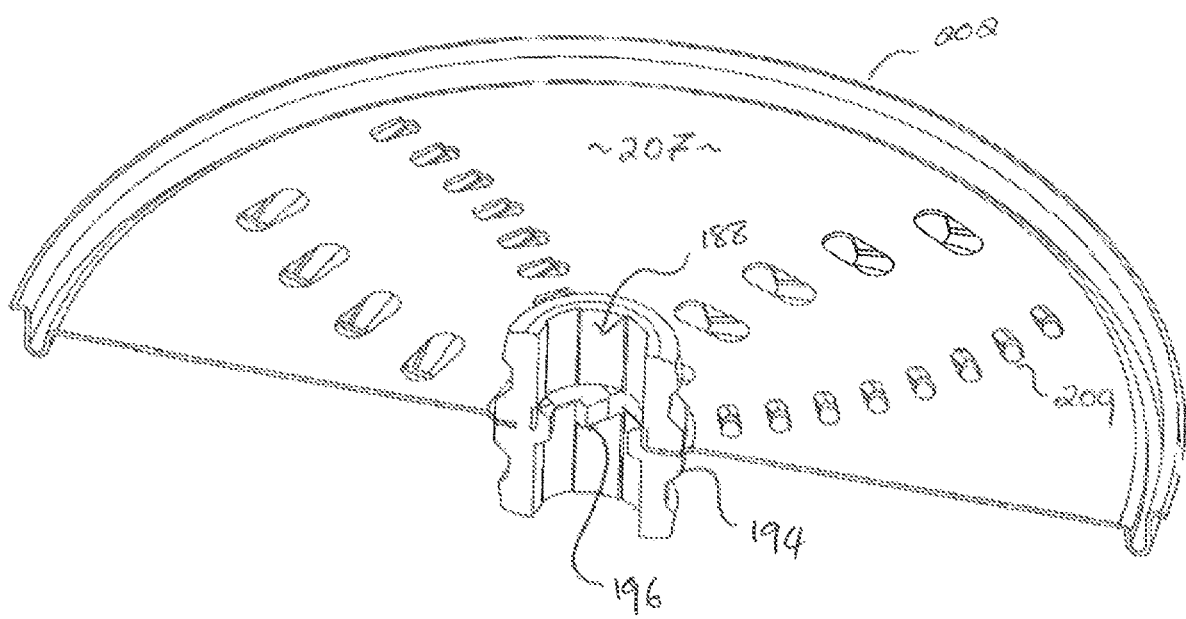
FIG. 16 is a sectioned perspective of the cheese grater/shredder disc with the shredder side up.
Figure 17:
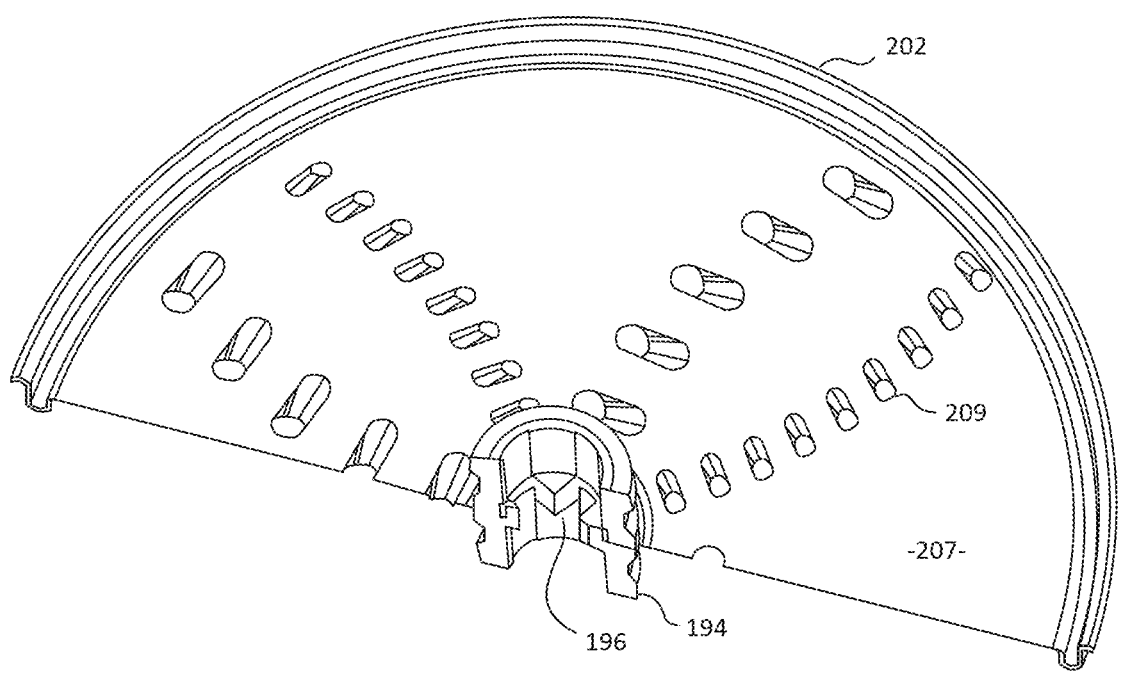
FIG. 17 is an enlarged sectioned perspective of the cheese grater/shredder disc with the shredder side up showing the drive abutments within the accessory hub.
Figure 18:
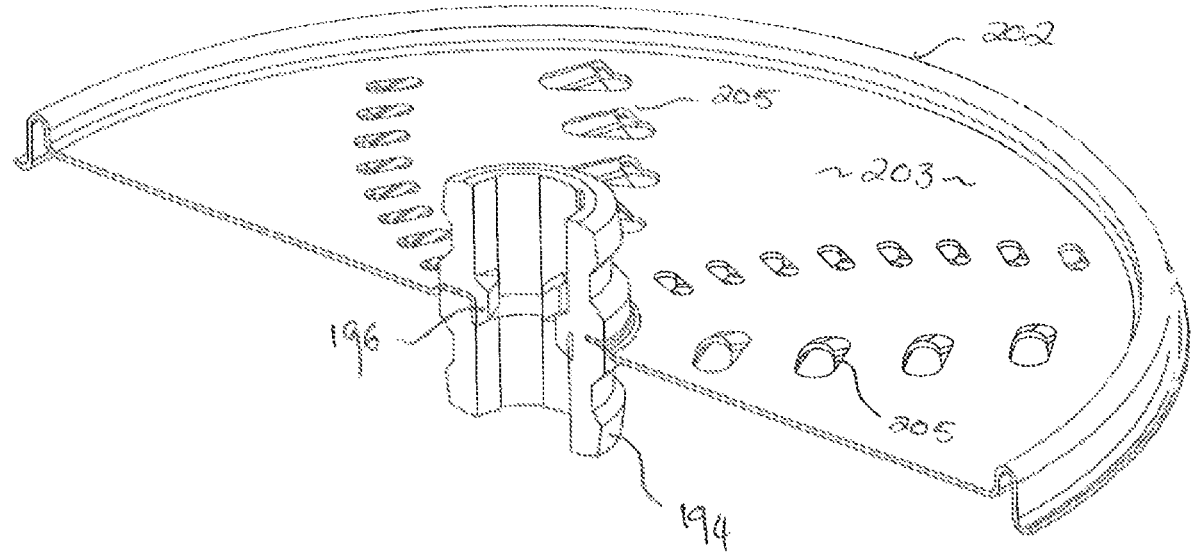
FIG. 18 is an enlarged side perspective view of the cheese grater/shredder disc with the grater side up showing the drive abutments within the accessory hub.
Figure 19:
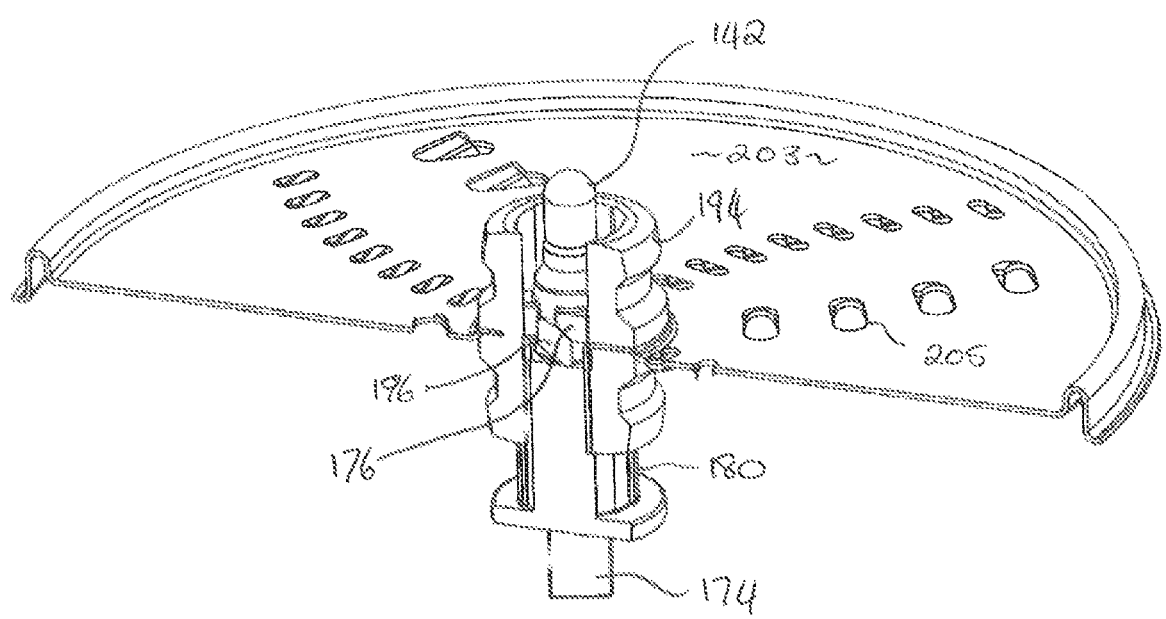
FIG. 19 shows the cheese grater/shredder disc with the grater side up and the drive abutments within the accessory hub engaging the drive faces on the spindle.
Figure 20:
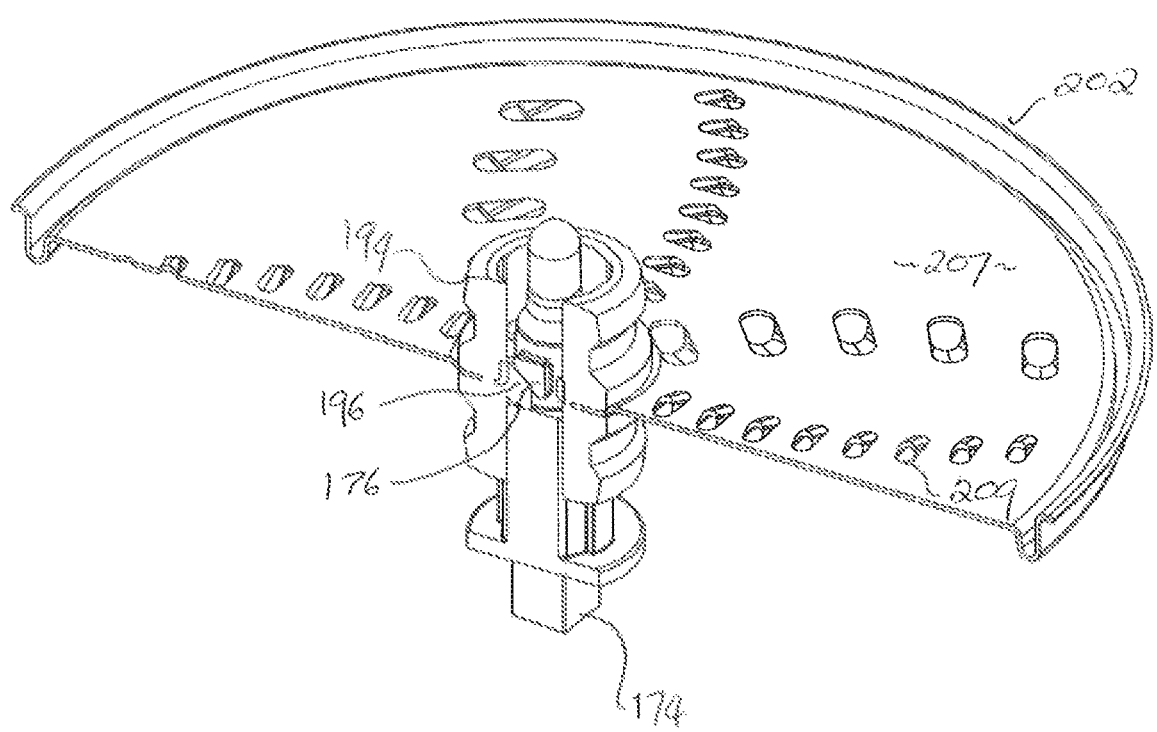
FIG. 20 shows the cheese grater/shredder disc with the shredder side up and the drive abutments within the accessory hub engaging the drive faces on the spindle.

FIGS. 16 and 17 show the shredding side 207 of the grating/shredding disc 202. The hub 194 has the complementary faces 196 configured to engage with the four inclined drive faces 176 of the spindle 142 as shown in FIG. 20. Likewise, in the grating configuration (FIGS. 15, 18 and 19), inserting the spindle 142 from the other side of the hub 194 will allow the four inclined drive faces 176 to engage the complementary faces 196 such that the disc 202 is still biased downwards into engagement with the spindle 142.

The cheese grating/shredding disc 202, like the dicing disc 192, functions more effectively if driven at a slower speed but high torque. Given these accessories are best suited to use with the spindle assembly 140, the interior of the accessory hubs 194 are configured to commit engagement with the inclined drive faces 176 on the spindle 142. Accessories intended for use with the food processor may function better at higher speeds (or even lower speeds) in which case their respective hubs 194 have internal configurations allowing engagement with only the most appropriate spindle assembly.

The food processor and food processing system described here allows the complete range of accessories intended for use with a particular processing device to be operated at the most appropriate speed.

The traditional drawbacks caused by vertical movement of the disc within the food preparation bowl are reduced or avoided by the various interengagements between the accessory, the spindle assembly, the bowl and drive base. In particular, the engagement between the accessory disc and the spindle to biased into engagement during operation, and the engagement between the spindle assembly and the bottom of the bowl which also biases into engagement during normal operation, acts to prevent the disc from lifting upwards and jamming against the lid or potentially removing the lid and endangering the user.

During use, the dicing disc 192 cut dense vegetables such as sweet potato with ease and fed the slices through the dicing grate 190 (see FIG. 9) into the bowl without jamming. This indicates the downward force on the disc hub 194 applied by the inclined drive faces 176 is greater than the resistant shear force of food processing operation. Likewise, the cheese grating disc 202 operating at a reduced speed and higher torque reduces the risk of jamming and clogging within the lid due to a build up of residual cheese from earlier cuts.

With the inclined drive faces 176 used by the present spindle 142 keeps the disc biased downwardly into engagement with the accessory seat 178 on the spindle 142. This results in:

Less scrap food (i.e. processed food in shapes differing from that intended);

Less "ribboning" of food where the higher speed of the cutting operation tends to curl the food rather than adhering to a more uniform and intended shape at a slower speed;

Cutting the food at a lower speed generates and draws less moisture from the food compared to cutting at higher speeds;

Lower speed processing improves the distribution of the food around the bowl whereas high speed processing has a tendency to pile the food directly beneath the feed chute; and The higher torque associated with the geared reduction reduces the potential for the disc jamming particularly when processing.

The interengagement of the spindle assembly 140 and the bottom of the bowl 102 also prevents lifting of the disc 192, 202. With the torsion on the spindle housing 150 generated by the motor biasing the bayonet connection into engagement, the spindle housing 150 is fixed to the bowl 102, and only the spindle 142 rotates.

Using two separate bayonet connections between the bowl 102 and the base 104 strengthens this connection to guard against lifting, or so called 'diaphragming' bowl bottom upwards. The two bayonet connections are oriented at right angles to each other for a more uniformly distributed load.

Figure 21:
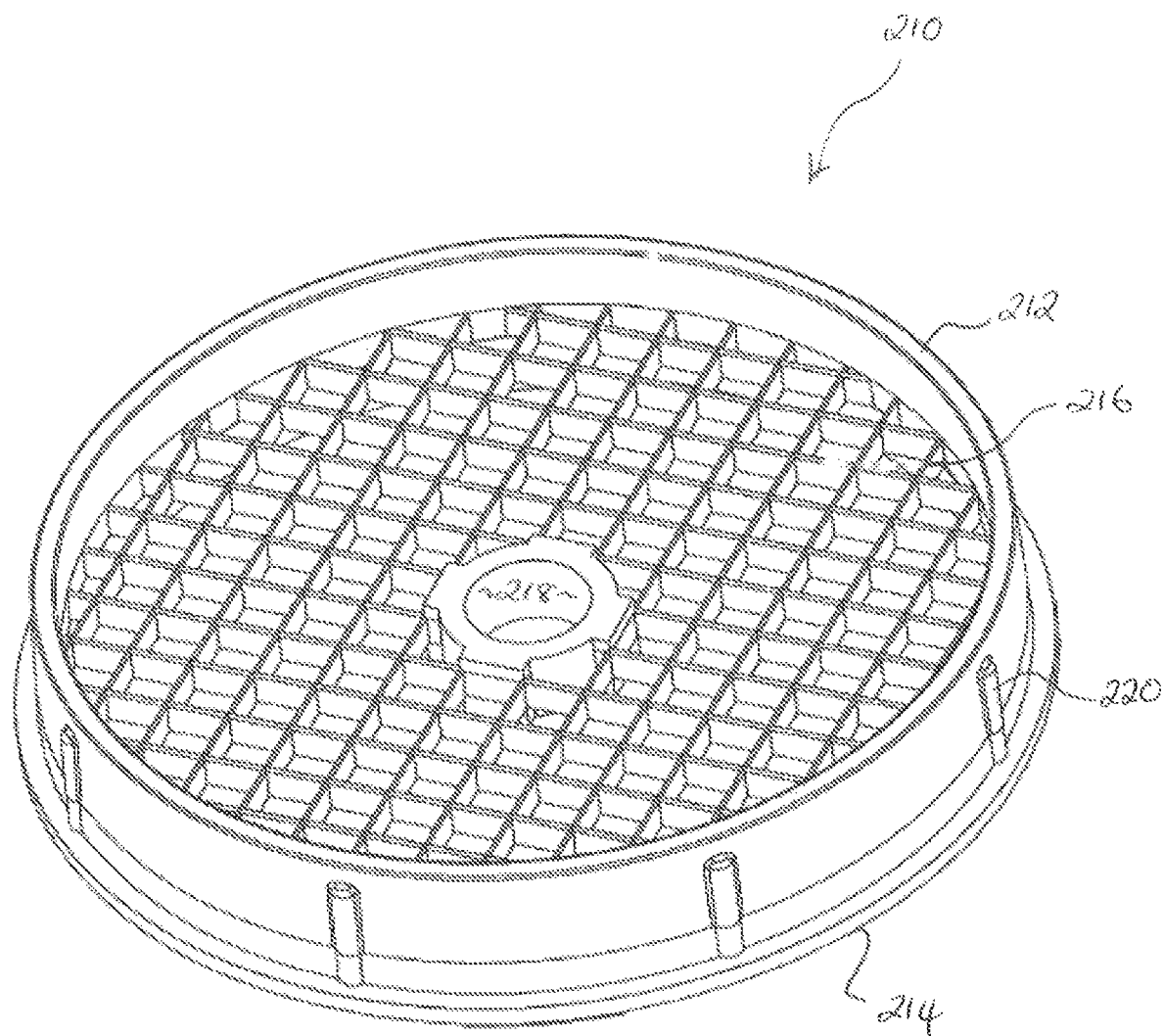
FIGS. 21 to 25 show another embodiment of the dicing disc for use with a food processor according to the present invention.
Figure 22:
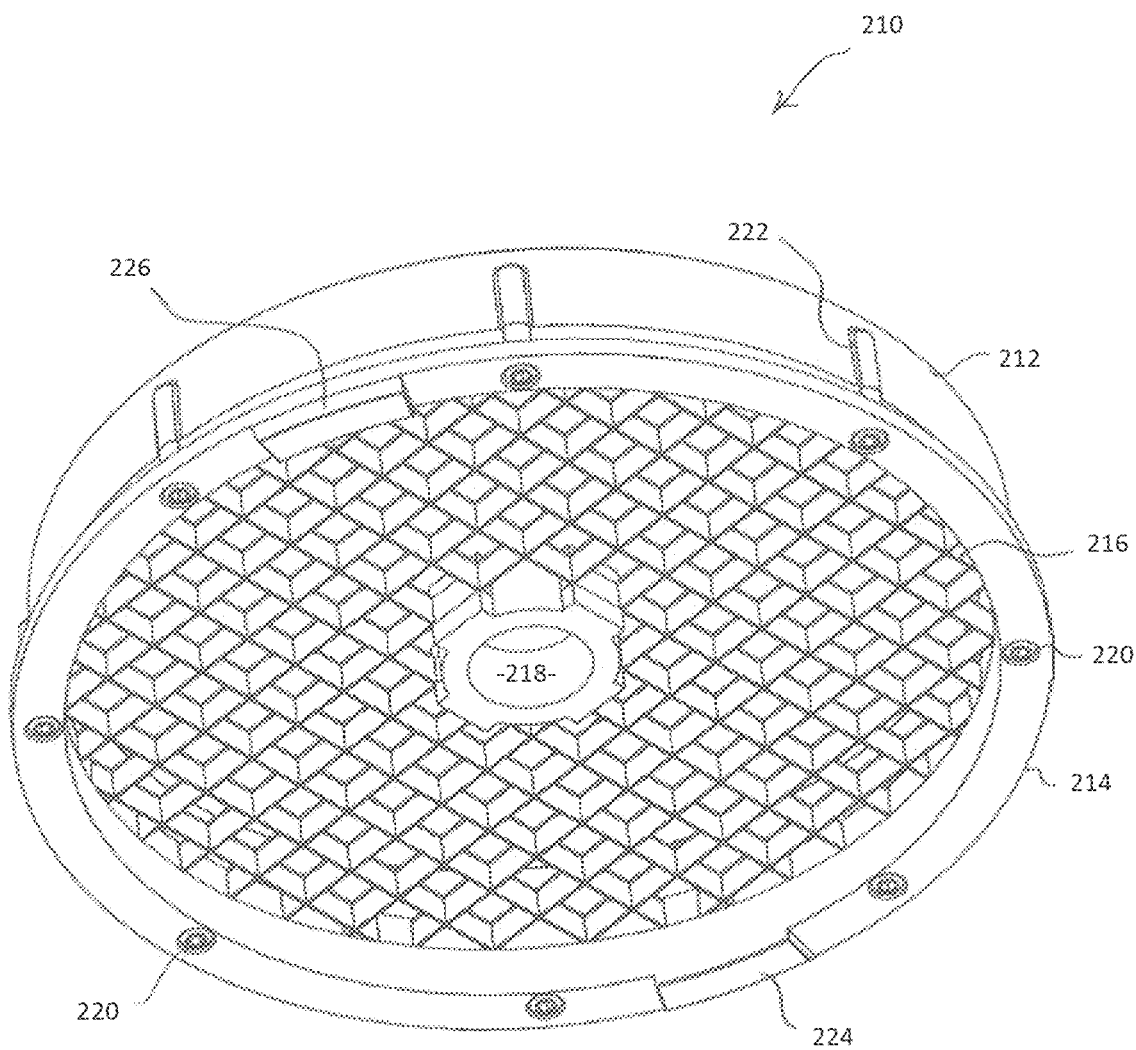
Figure 23:
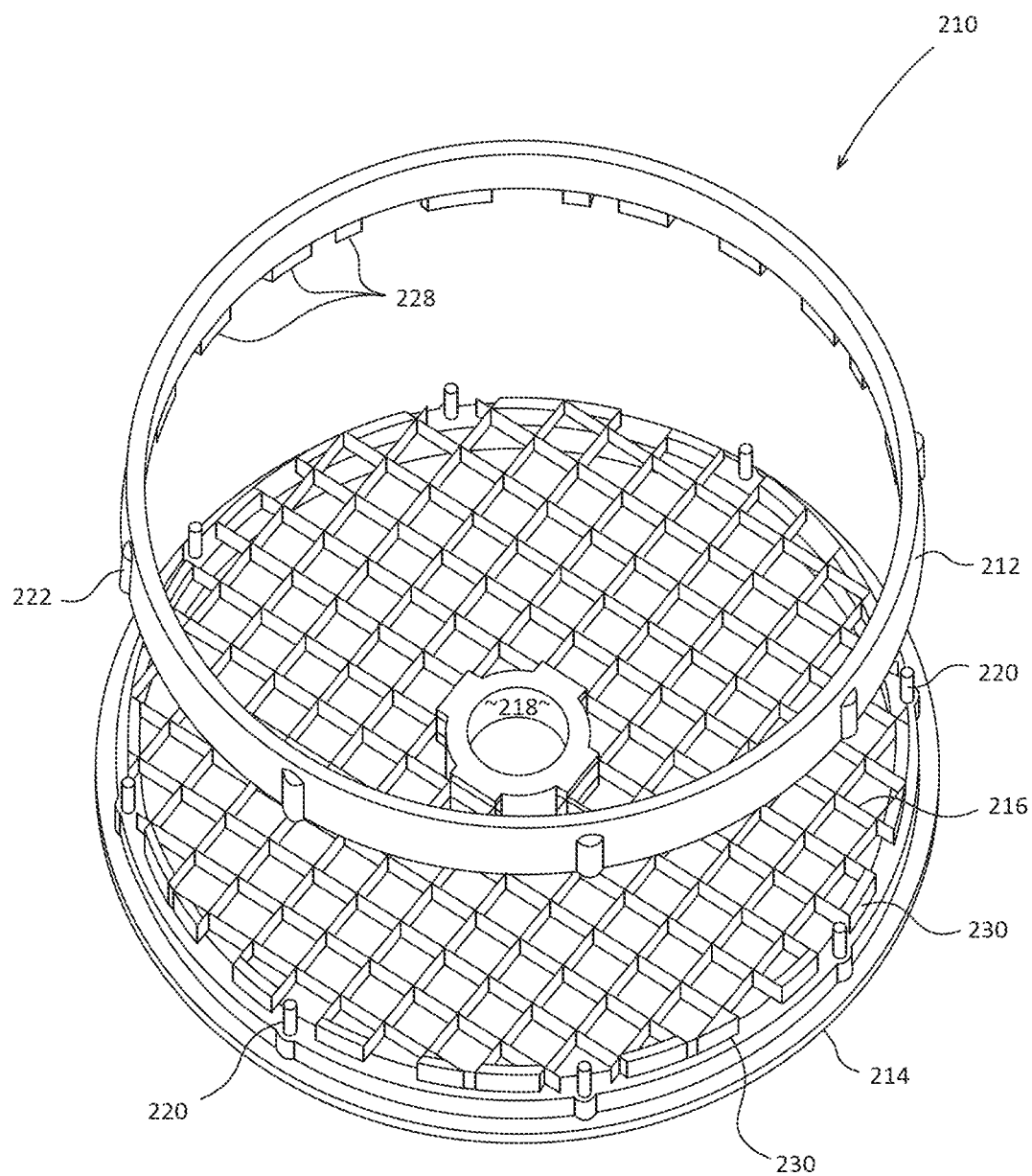
Figure 24:
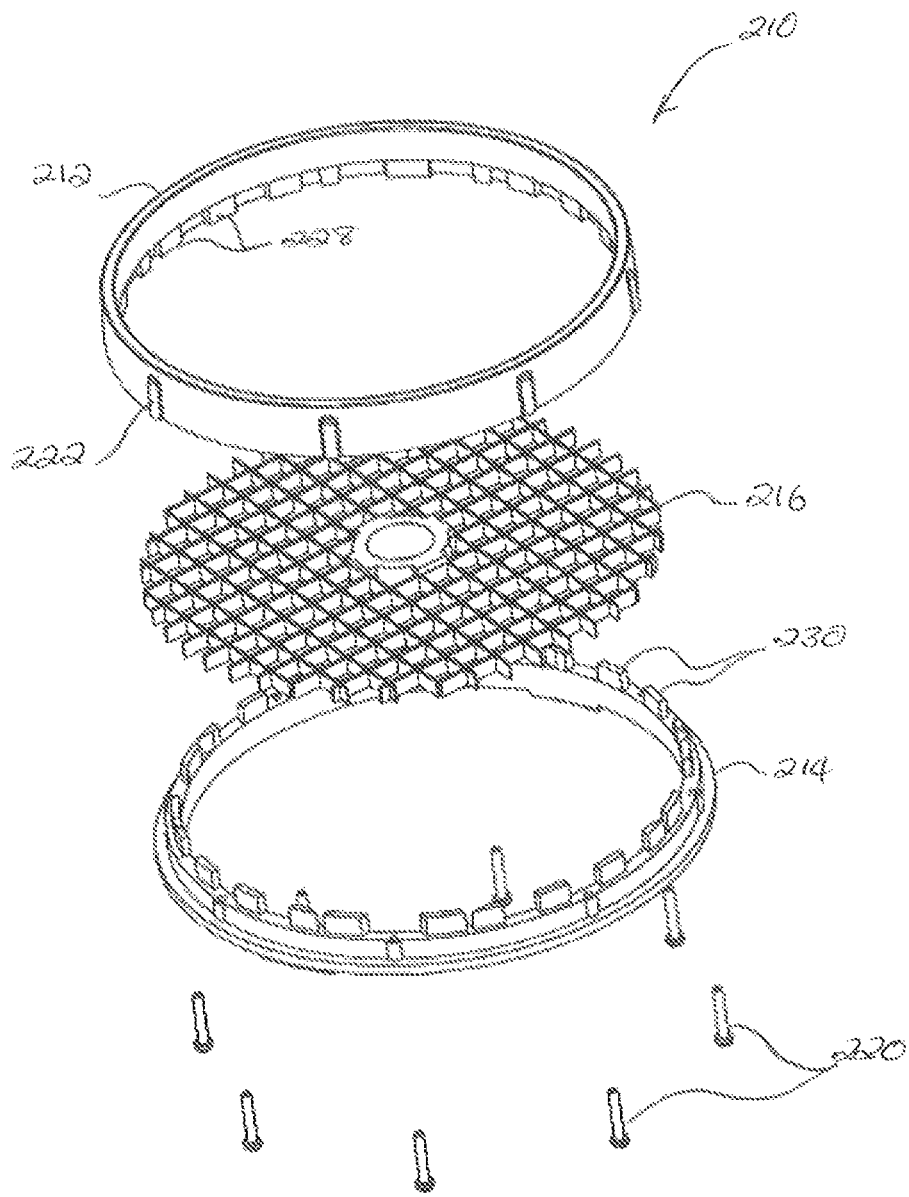
Figure 25:
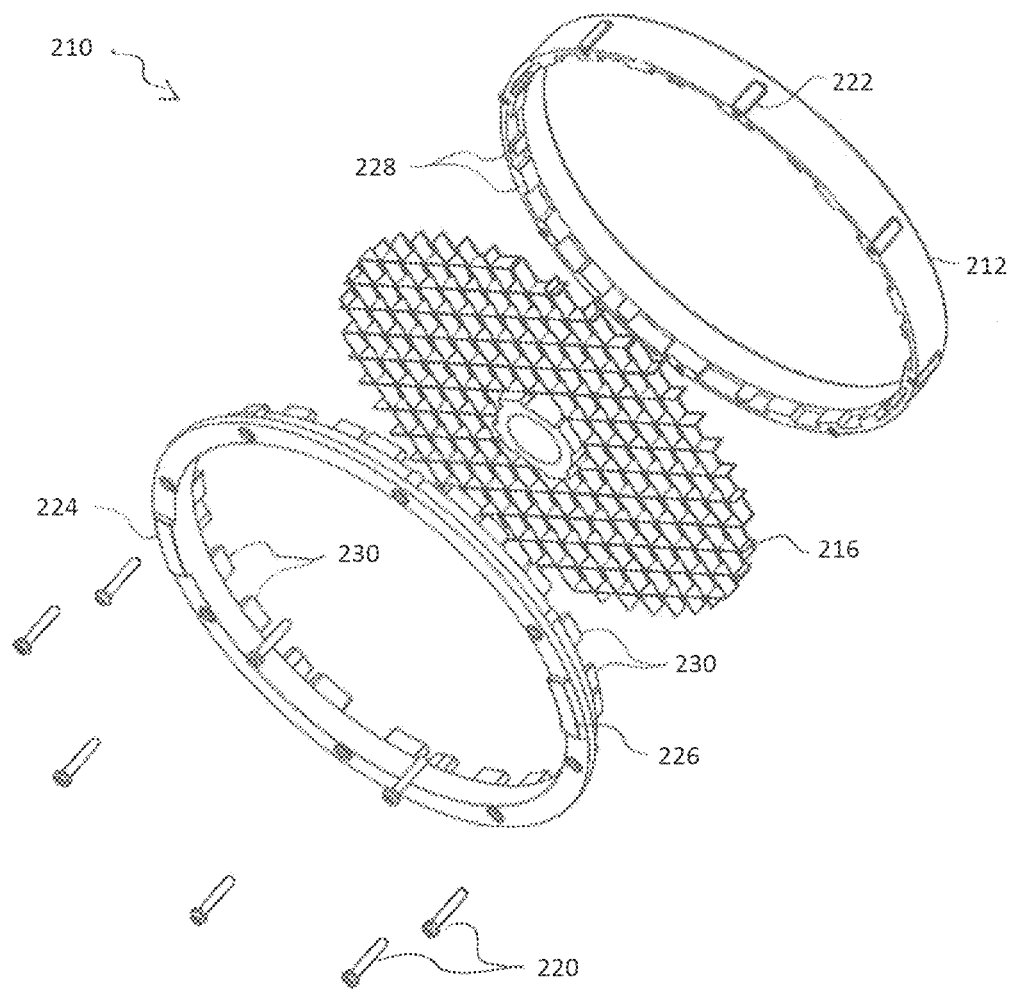

FIGS. 21 to 25 show an alternative form of the dicing grid 210. FIG. 21 shows a top perspective of the dicing grid 210 (referring to its orientation when mounted on the spindle assembly). FIG. 22 is the perspective of the underside of the dicing grid 210 while FIGS. 23, 24 and 25 are exploded perspectives showing the individual components from different points of view.

The dicing grid 210 is made up of three main components; the metal grid 216 sandwiched between a top ring 212 and a base ring 214. In the center of the metal grid 216 is an aperture for the hub 218 configured for engagement with the spindle assembly (not shown). The central hub 218 is over molded into the middle of the metal grid 216. The top ring 212 and the base ring 214 are secured together via a ring of threaded fasteners 220 engaging the internally threaded bores 222. However skilled workers in this field will readily appreciate that the top ring and the base ring may be joined by welding, such as ultrasonic spot welding, or adhesive such as silicone.

The internal periphery of the top ring 212 has blocks 228 of various size to fit between the peripheral ends of the metal blades making up the grid 216. The base ring 214 has a set of complementary blocks 230 that extend upwardly into the gaps between the peripheral ends of the grid blades, not already filled by the blocks 228 on the top ring 212. By interleaving the blocks 228 and 230 about the periphery of the metal grid 216 ensures that forces transferred through the grid to the top ring 212 and base ring 216 is more evenly distributed between both rings.

At the bottom of the base ring 214 are diametrically opposed orientation features 224 and 226. These features seat into complementary features within the food preparation vessel (not shown) to correctly position the dicing grid 210 during use.

Using this structure, the dicing grid 210 is produced cost effectively while not compromising the overall strength and robust construction of the accessory.

FIG. 1A shows a food processor 100 having a food preparation vessel in the form of a bowl 102 engaged with a base 104 housing a drive motor 111 (see FIG. 4). User controls 204 on the base 104 control the operation of the motor. The top of the preparation bowl 102 is closed with a lid 106 including a food chute 108 for safely inserting food into the bowl 102.

Figure 26:
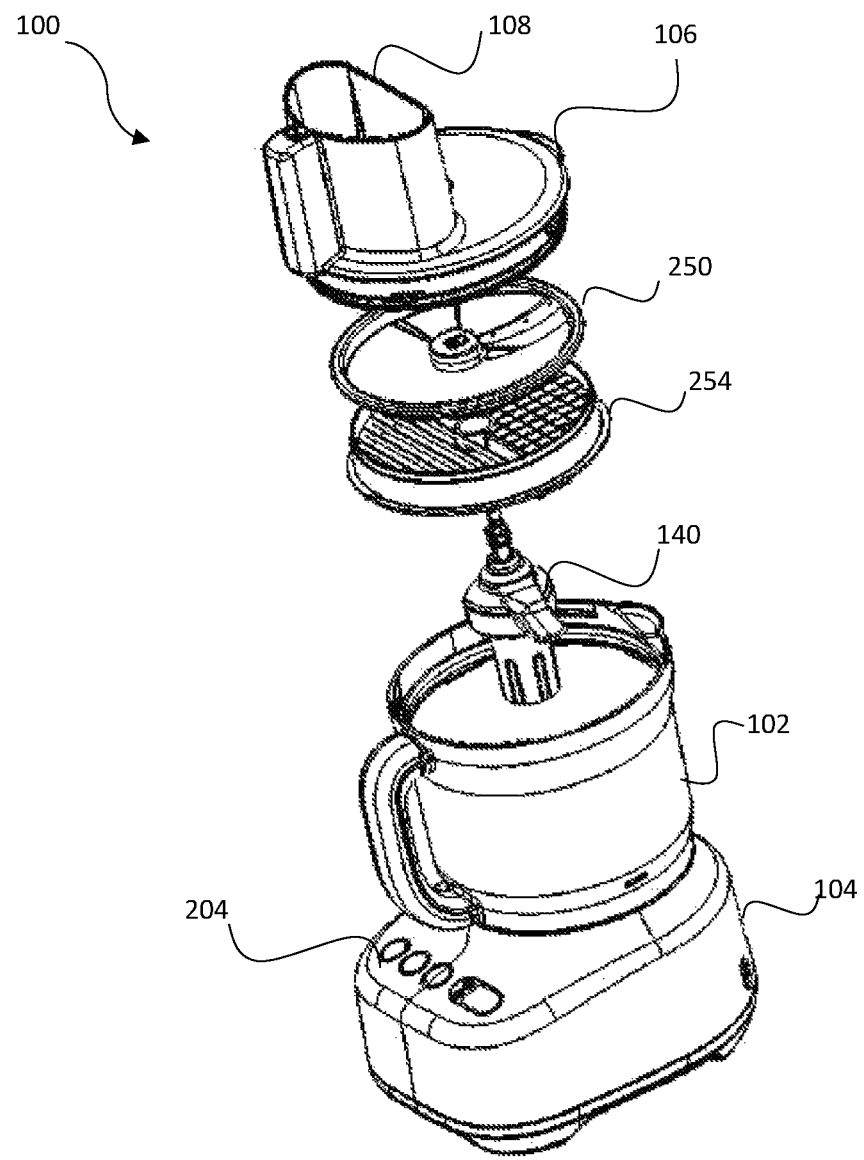
FIG. 26 is a front and right side exploded perspective of the food processor shown in FIG. 1 showing the accessory with the present invention within the food preparation bowl.
Figure 27:
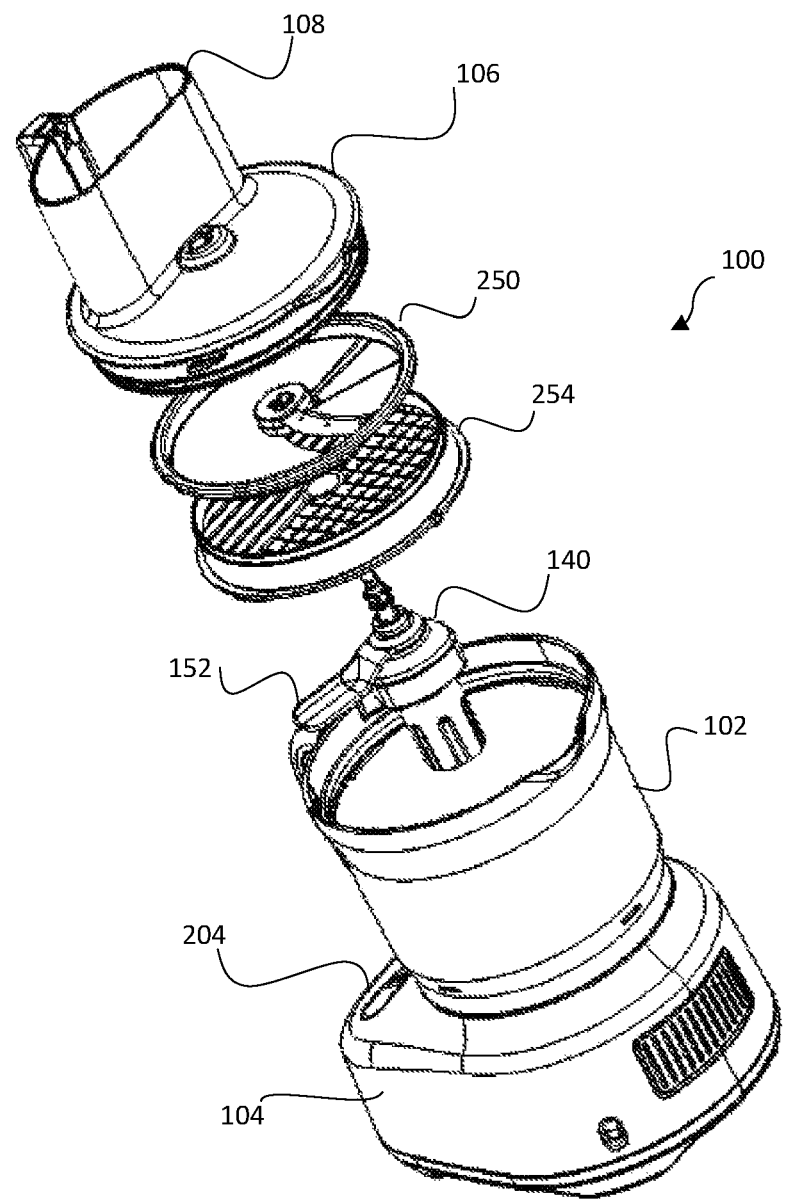
FIG. 27 is a rear and right side exploded perspective of the food processor shown in FIG. 1A.

FIGS. 26 and 27 are exploded perspectives of the food processor 100 showing a cutting disc 250 and a dicing/chipping accessory 254 lifted from the food preparation bowl 102. The dicing/chipping accessory 254 combines the function of dicing and "chipping" (i.e. making chips) depending on its orientation when placed in the bowl 102. With the intersecting blades of the dicing grid beneath the feed chute 108, relatively dense vegetables (e.g. potatoes and sweet potatoes) are diced, and with the parallel chip blades beneath the feed chute 108, the food is cut into thick strips, or "chips".

Figure 28:
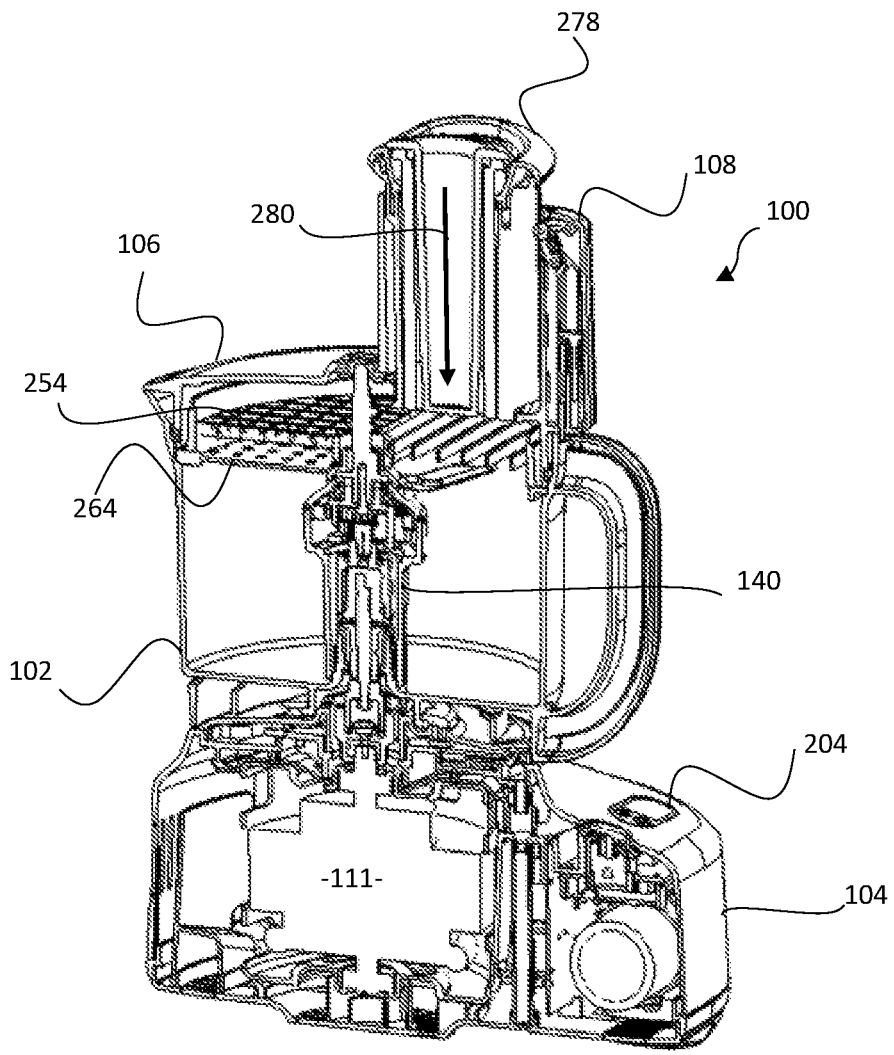
FIG. 28 is a vertical cross-section through the spindle axis of the food processor shown in FIG. 1A.

As shown in FIG. 28, cutting disc 250 is positioned between the feed chute 108 and the dicing/chipping accessory 254. The spindle 140 engages the hub of the cutting disc 250 for rotation at a cutting speed suitable for the food being cut. As described above, the spindle assembly 140 has a gear train for gearing the motor output to the required cutting speed and torque.

The spindle assembly 140 detachably connects to the base of the food preparation bowl 102. By connecting with the base of the food preparation bowl 102, the spindle assembly 140 engages the drive coupling 130 which provides a drive train to the motor 111 housed in the base 104.

A food leveler 152 (see FIG. 27) extends from the spindle assembly 140 to sweep away any build-up of food dices or chips beneath the feed chute 108. Skilled workers will understand an uneven build-up of processed food can impede the processing of further food.

Figure 30A:
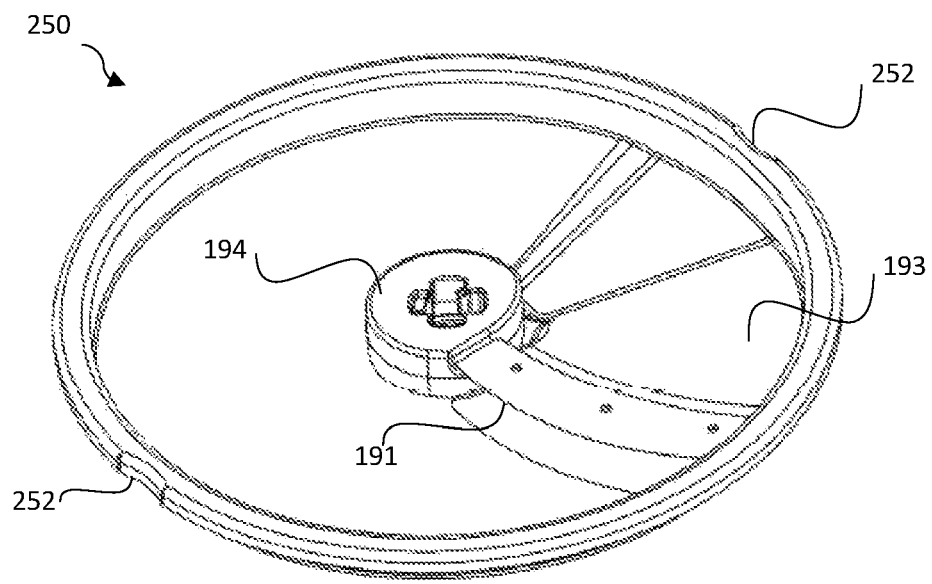
FIGS. 30A and 30B are respective top and bottom perspectives of the cutting disc.
Figure 30B:
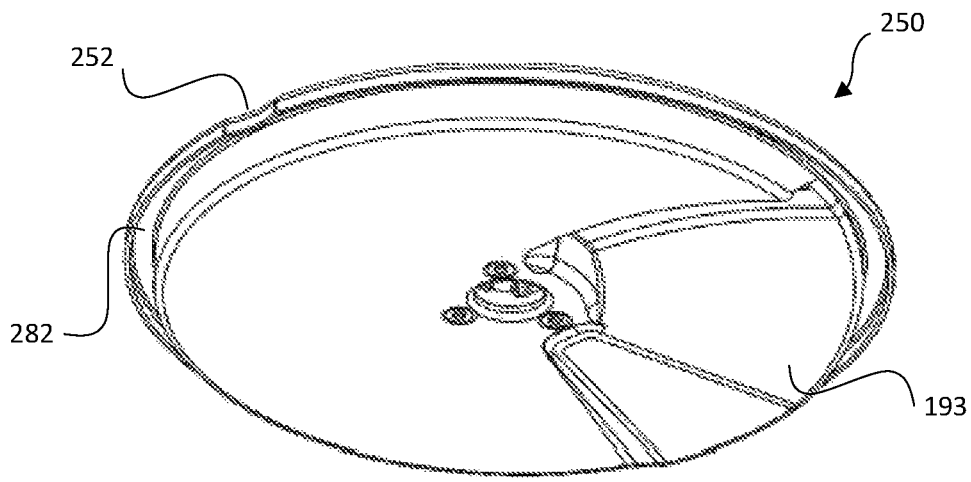

FIGS. 30A and 30B are top and bottom perspectives of the cutting disc 250. The spindle assembly 140 has drive faces 176 (see FIG. 27) to engage complementary faces within the hub 194 of the cutting disc 250. The drive faces 176 are inclined such that the cutting disc 250 is simultaneously rotated and biased downwards into engagement with the spindle assembly 140 when driven by the motor 111. The central hub 194 extends from the upper side of the cutting disc 250. The cutting blade 191 extends from the top of the central hub 194 to define an opening between the top surface of the disc and the underside of the blade 191. An inclined surface 193 extends from the trailing edge of the blade 191 down to the plane of the disc 250. A sector-shaped aperture in the disc 250 directly beneath the blade 191 and the inclined surface 193 provides a passage from the feed chute 108 to the dicing/chipping accessory 254.

Dense food such as potato and sweet potato are manually feed down the feed chute 108 in the feed direction 280. A plunger 278 (see FIG. 28) is used to push the food and protect the user's fingers from injury. The food is pressed against the top of the cutting disc 250 as it rotates within the food preparation bowl 102. The blade 191 cuts into the food at a known height above the top surface of the disc 250. This cuts a slice of known thickness which is immediately urged downwards by the inclined surface 193 following the blade 191. The slice of food is pushed through the dicing grid or the parallel blades of the dicing/chipping accessory 254. The dicing grid 268 cuts food into pieces with a cross-sectional shape corresponding to the openings defined by the blades of the dicing grid. The parallel blades of the chipper cuts the food into wide strips defined by the spacing between the parallel blades. This keeps the dimensions of the processed food consistent. Consistently sized pieces of food cook more uniformly and provide better end results.

Figure 29:
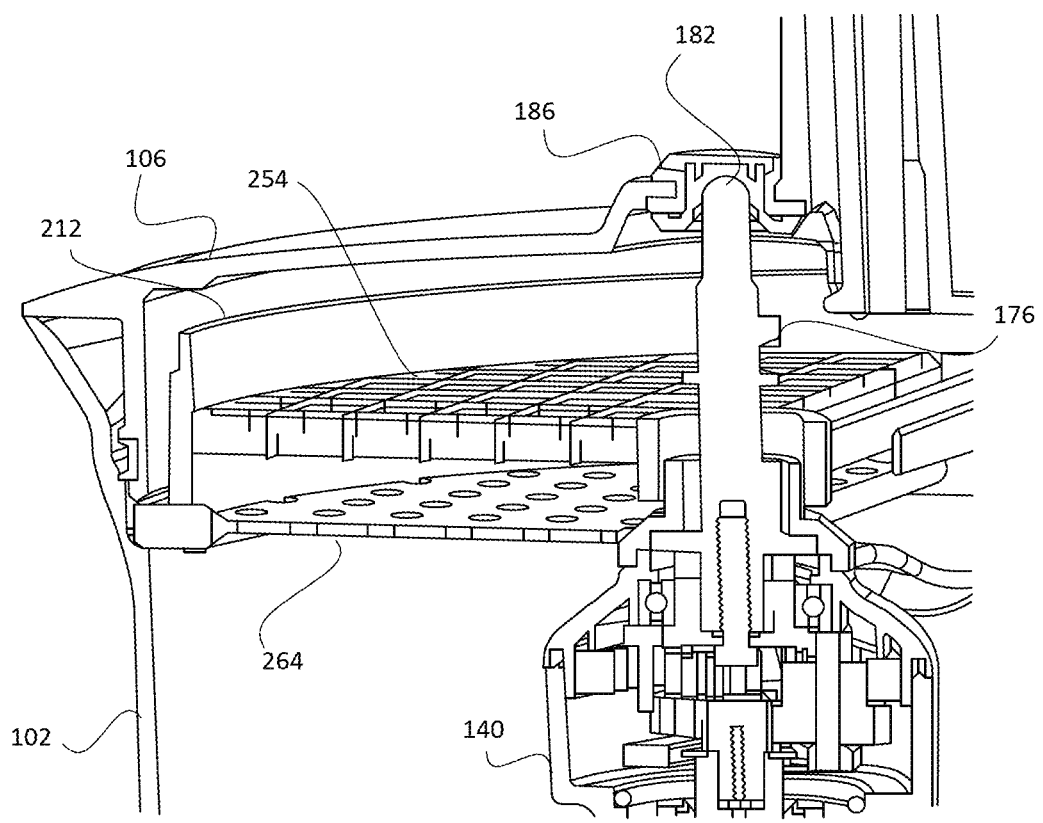
FIG. 29 shows an enlarged partial cross-section through the spindle axis which omits the cutting disc in the interest of clearly depicting the accessory according to the present invention.

The peripheral rim of the cutting disc 250 includes diametrically opposed detents 252 that allow the user to lift the cutting disc out of the open top of the preparation bowl 102. As best shown in FIG. 30B, the periphery of the cutting disc 250 extends upwardly to define an inverted channel immediately adjacent the peripheral rim. The dicing/chipping accessory 254 has a top ring 212 (see FIGS. 29 and 31) which extends at least partially towards or into the inverted peripheral channel 282 of the cutting disc 250. If food is pressed hard against the cutting disc 250 by the feed chute plunger 278, the periphery of the cutting disc 250 may flex into contact with the top of the top ring 212. Any contact will be low friction sliding contact to avoid significant loss of cutting speed.

As best shown in FIGS. 29, 31, 32 and 33, the top ring 212 of the dicing/chipping accessory 254 provides a peripheral side wall securing the dicing grid 268 and the parallel blade array 256. The bottom ring 214 provides a supporting flange for the diametrically opposed orientation features 224 and 226, as well as the chipping side and dicing side holding slots 258 and 260 respectively. In the middle of the dicing/chipping accessory 254 is a ring shaped central hub 284 through which the upper end of the spindle assembly 140 extends (as shown in FIG. 4).

Figure 34:
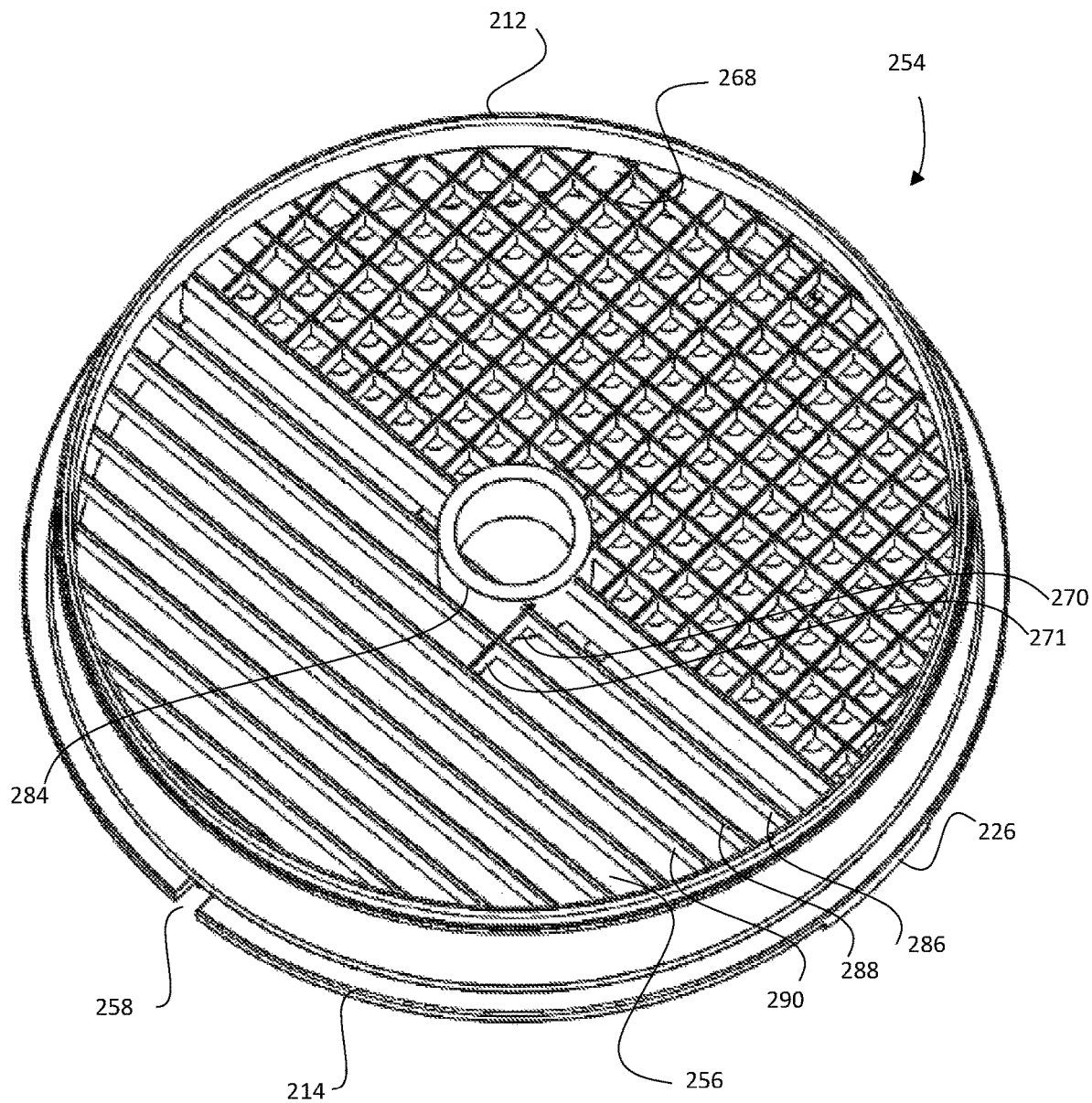
FIG. 34 shows a top perspective of the dicing/chipping accessory with a reinforcing bridge extending between the first, second and third parallel blades.

As shown in FIG. 34, most of the blades in the parallel blade array 256 are only supported at their opposite ends. However, the blade 286 closest to the middle of the top ring 212 may also be supported at the central hub 284. For convenience, the Applicant refers to this as the first blade 286 and the adjacent blades as the second blade 288, third blade 290 and so on. The first blade 286 is shown as connected to the central hub 284 but other forms of the blade array 256 have a first blade that does not contact the hub. This is dependent on the hub diameter and the spacing between the first blade 286 and the centre of the disc. If the first blade 286 does not contact the hub 284, it is the longest blade. Likewise, the second and third blades 288 and 290 are longer than the other blades further from the central hub 284 and hence prone to a greater degree of deflection under the pressure of food forced downwards by the cutting disc 250. This relatively large deflection towards the middle of the parallel blades can lead to inconsistent thicknesses in the chips which can be detrimental during the cooking stages. To address this, dicing/chipping accessory 254 includes one or more bridges 270, 271 connecting to an intermediate position along the deflection prone blades (such as second blade 288 and third blade 290) to provide greater structural rigidity. As the parallel blades get progressively shorter, the skilled worker will appreciate there is less chance of significant deflection in the blades and reinforcing bridges 270 and 271 are not necessary.

The Applicant's work in developing the dicing/chipping accessory 254 has found that the depth of the parallel cutting blades 256 in the feed direction 280 should be less and/or equal to the width of the spacing between each of the blades in order to avoid the food jamming and causing an obstruction. In other words, the depth of the parallel blades in the feed direction defines the minimum spacing between adjacent blades. For consistent chip thicknesses, the parallel blades should have a uniform depth and spacing.

Likewise, the Applicant has found that any bridges 270, 271 between parallel blades 256 should also have a depth in the feed direction equal to that of the blades. Similarly, the bridges 270, 271 should preferably extend perpendicular to the parallel blades. This minimises the length of the bridges 270, 271 and therefore maximises the structural rigidity of the parallel blade array 256.

Figure 35:
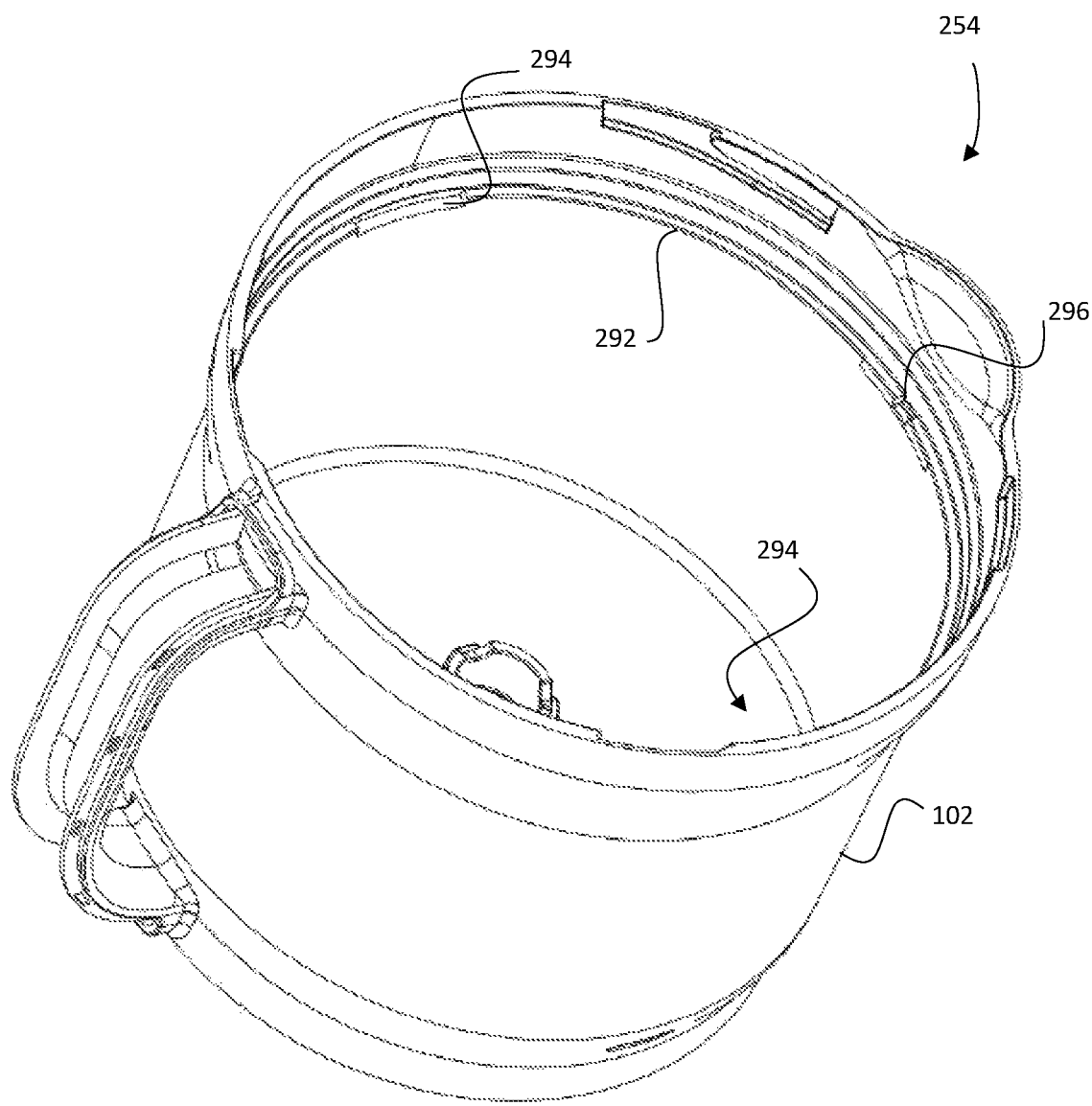
FIG. 35 is a perspective of the food preparation bowl in isolation indicating the formations within the open top for locating the dicing/chipping accessory in the correct orientation.

FIG. 35 shows the open top of the preparation bowl 102. The interior surface of the bowl defines an inward step 292 for supporting the dicing/chipping accessory 254 (see FIGS. 31-33) during operation. On diametrically opposed sides of the step 292 are orientation feature recesses 294. At 90° to each of recesses 294 is a single catcher holding recess 296. The orientation feature recesses 294 are configured to receive either of the diametrically opposed orientation features 224 or 226 protruding from the bottom of the dicing/chipping accessory 254 (see FIG. 31). However, there is only a single catcher holding tab recess 296 provided in the inward step 292 so the dicing/chipping accessory 254 will only sit flat on the interior step 292 if the catcher 264 is covering the non-operating blade array. This forces the user to have the dicing/chipping accessory 254 in the correct orientation when positioning it in the preparation bowl 102.

Figure 36:
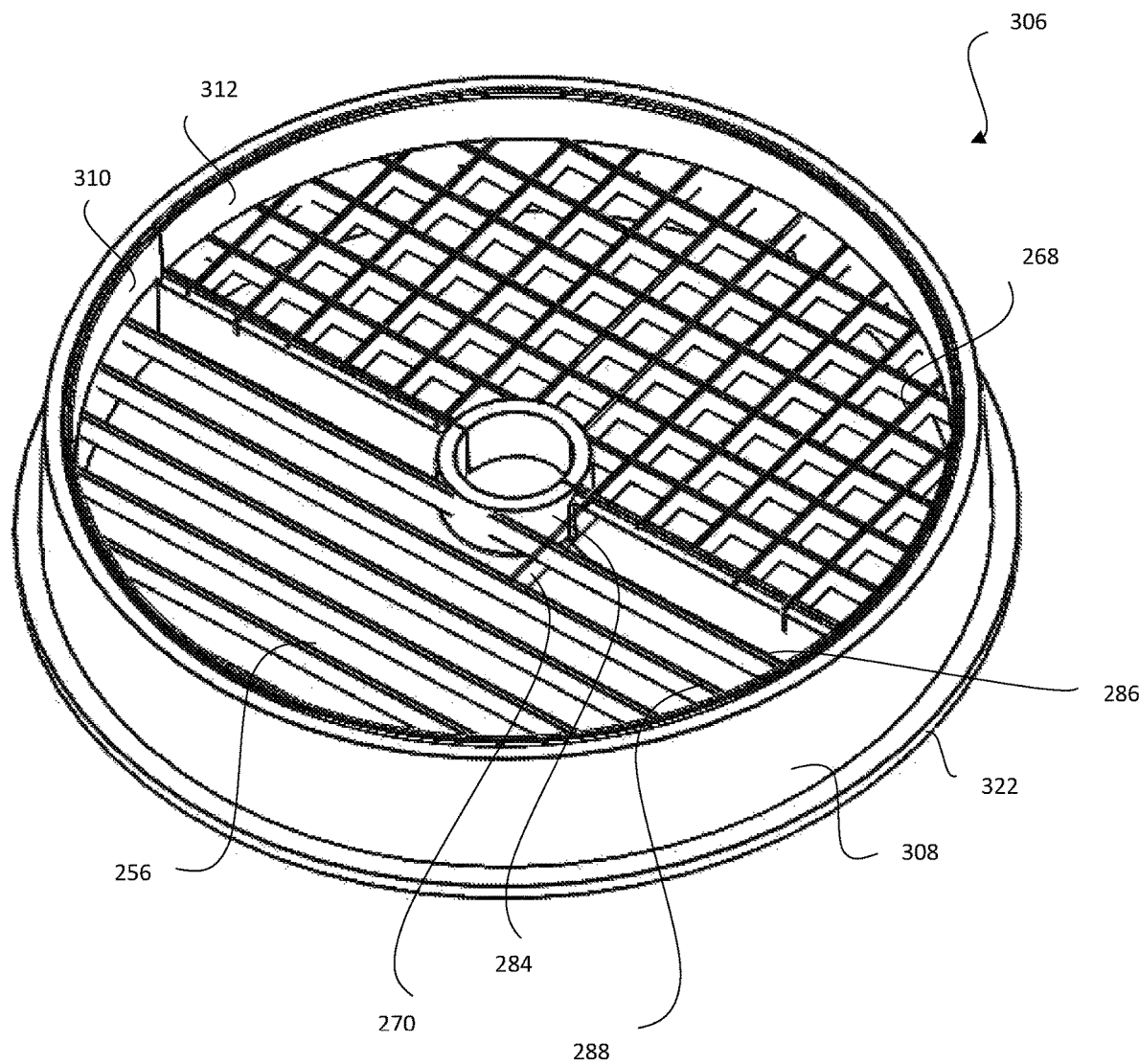
FIG. 36 is a perspective of another embodiment of the dicing/chipping accessory in which the parallel blades for chipping and the dicing grid are provided as separate modules that are individually detachable from the remainder of the disc.
Figure 37:
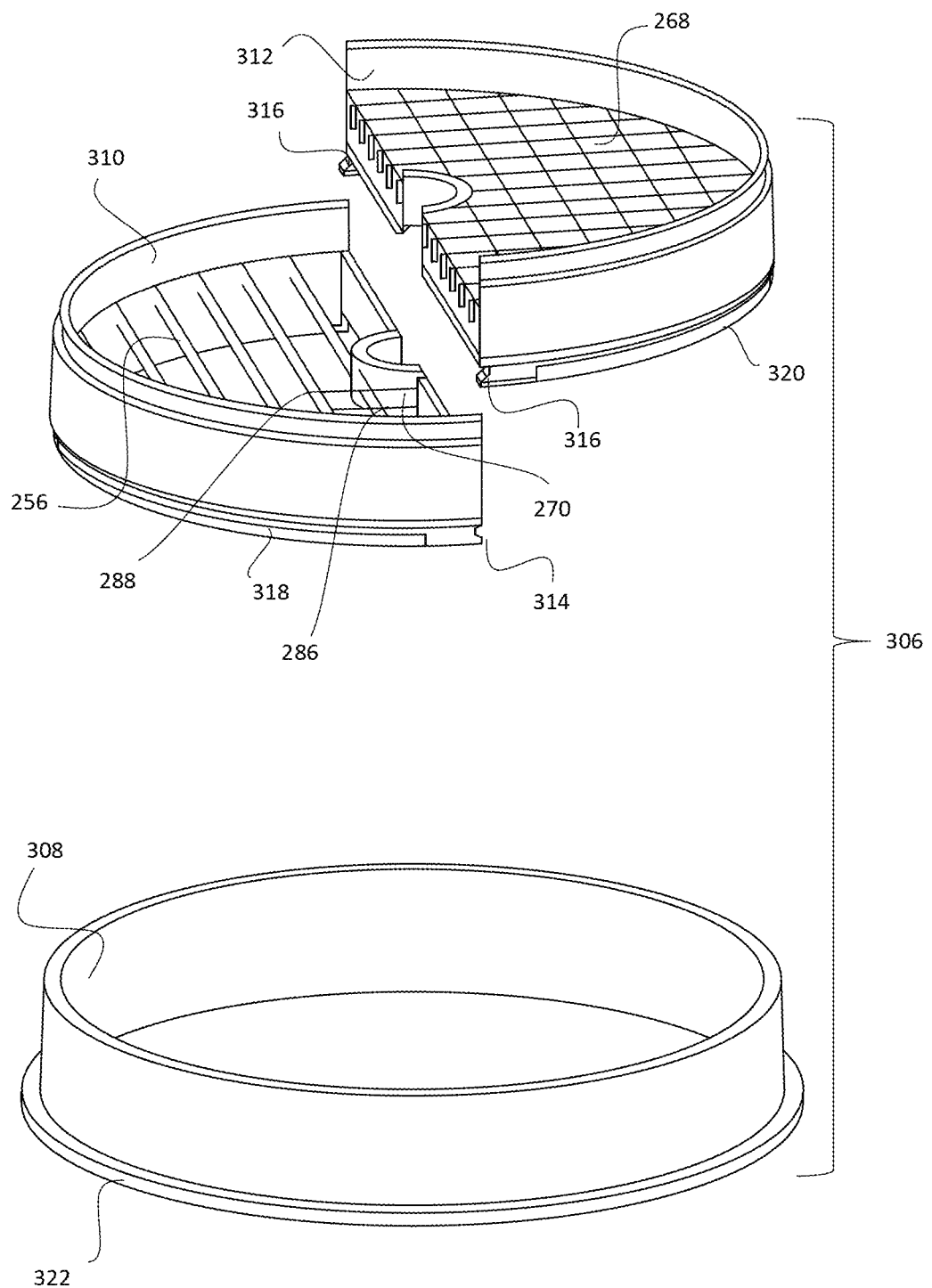
FIG. 37 is an exploded perspective of the dicing/chipping accessory of FIG. 36 showing the chipping module and dicing module removed from the peripheral ring of the accessory.
Figure 38:
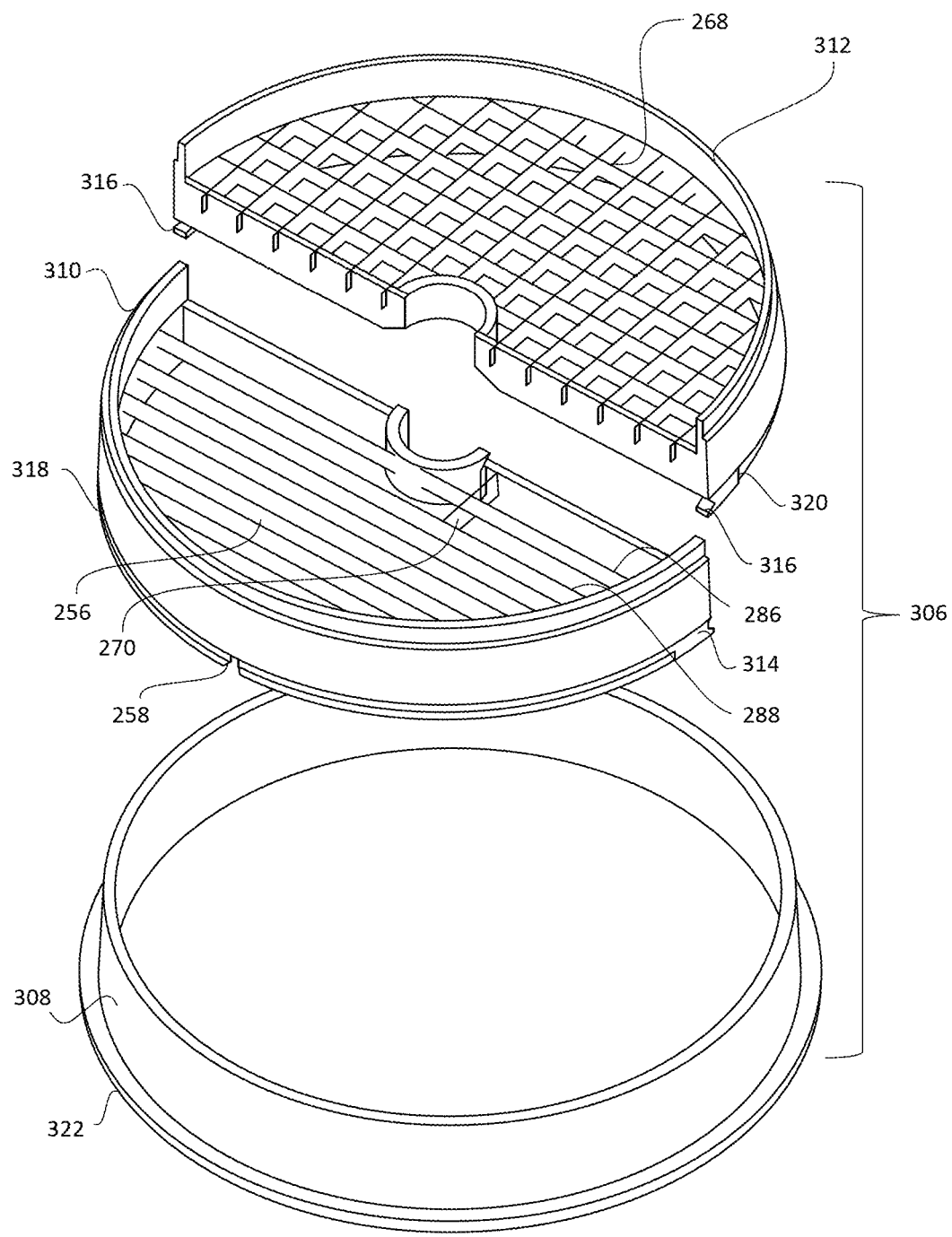
FIG. 38 is another exploded perspective showing the detachable engagement features on the chipping module and dicing module as well as the external channel for rotatably holding another embodiment of the catcher.

The embodiment shown in FIGS. 36, 37 and 38 is a modular dicing/chipping disc 306. In contrast to the integrally formed dicing/chipping disc 254 shown in FIGS. 31 to 33, the modular disc 306 has individually removable blade structure modules 310 and 312. The blade structure modules shown are a chip cutting module 310 having the parallel blade array 256 and the dicing module 312 with a dicing grid 268. With both of the modules 310 and 312 having a semicircular shape, the user can 'mix and match' modules depending on the required food processing operations. Other embodiments (not shown) will have more than two modules, each having a sector-shape which combine to form the complete disc.

Figure 31:
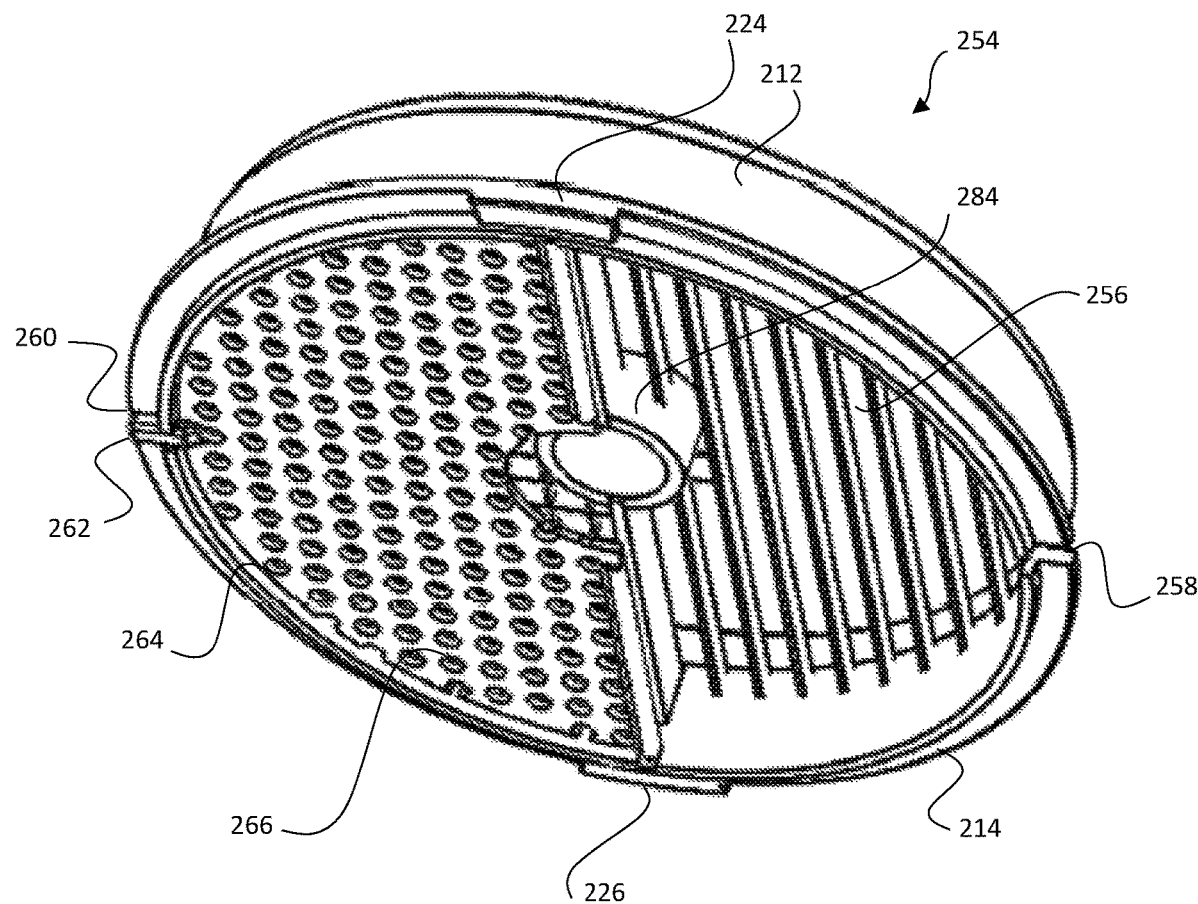
FIG. 31 is a bottom perspective of the dicing/chipping accessory with the catcher covering the dicing grid and the parallel blades for chipping visible.
Figure 32:
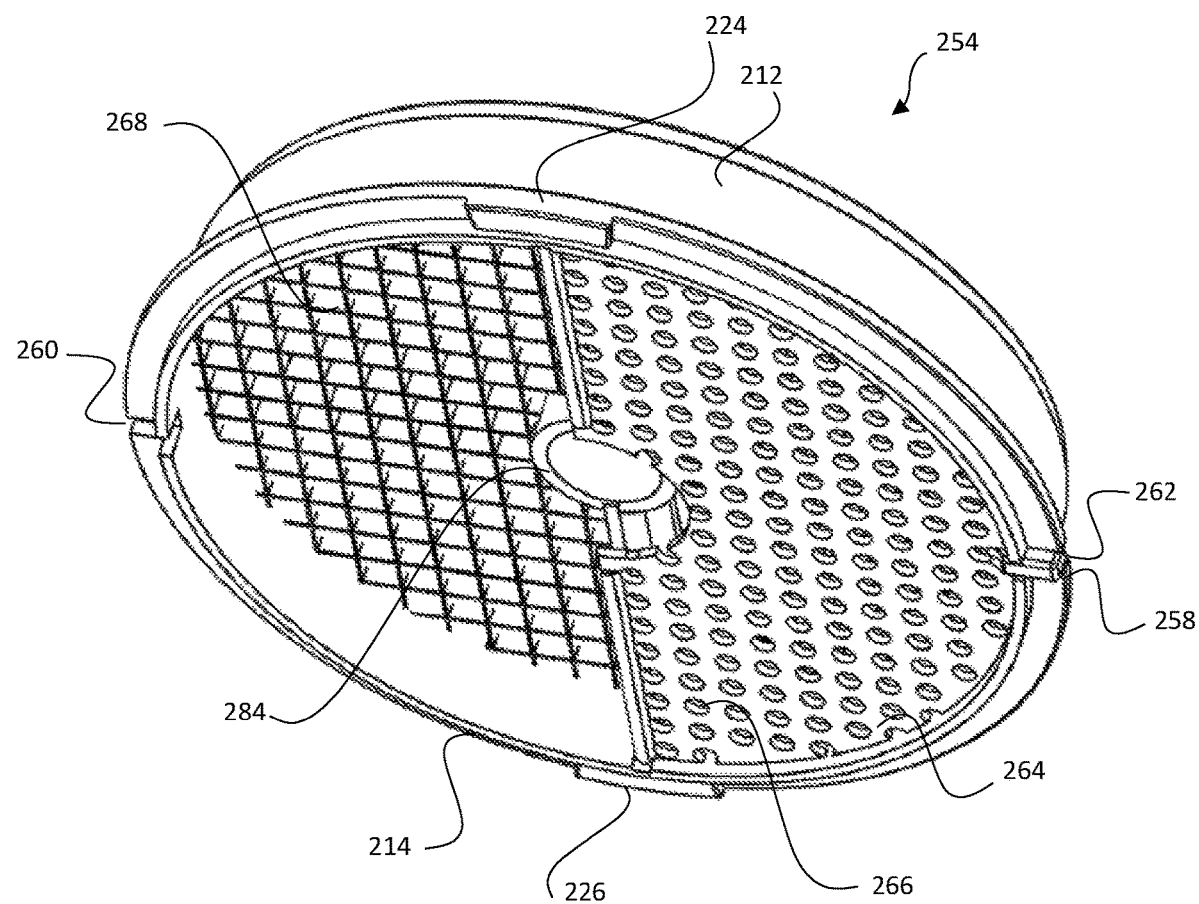
FIG. 32 is a bottom perspective of the dicing/chipping accessory with the catcher covering the parallel blades and the dicing grid revealed.
Figure 33:
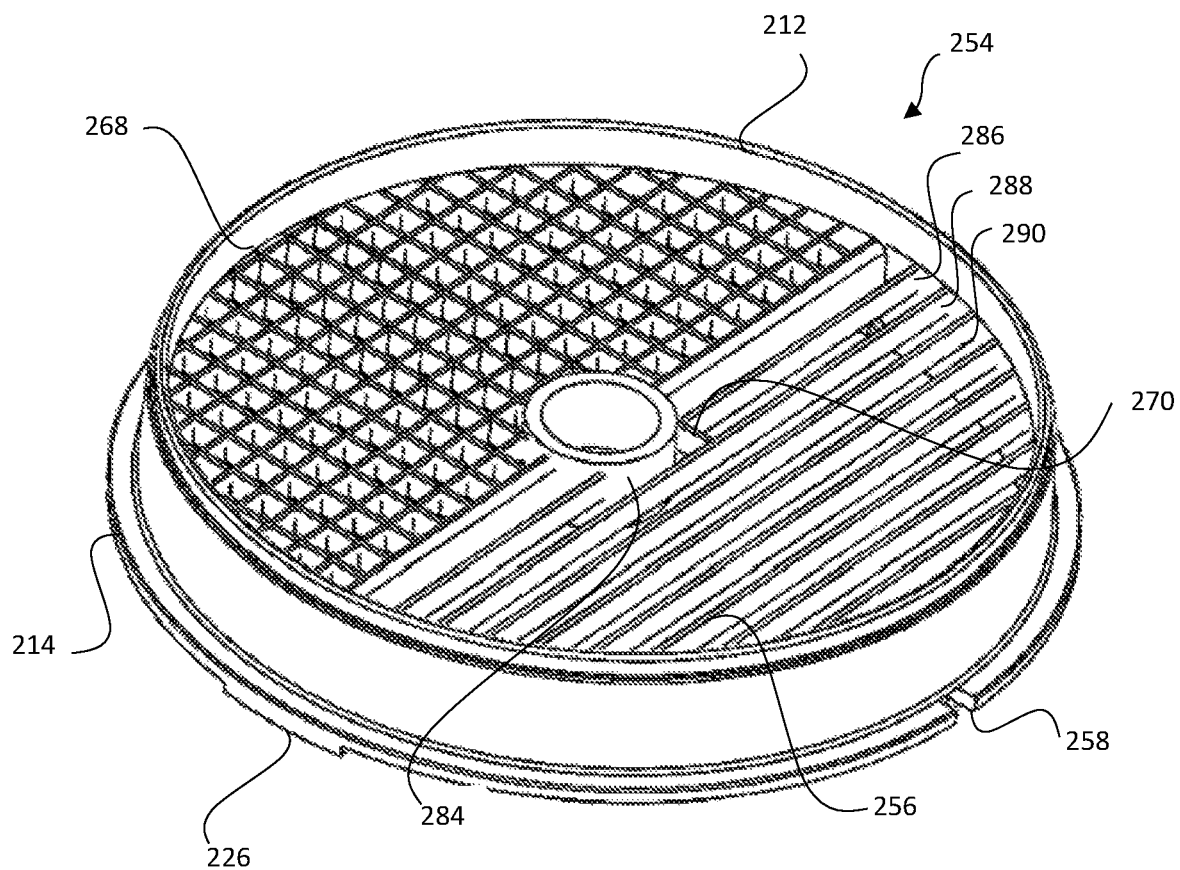
FIG. 33 is a top perspective of the dicing/chipping accessory showing the dicing grid adjacent the parallel blades for chipping enclosed within the peripheral ring.

Like the parallel blade array 256 in the chipping/dicing disc 254 of FIGS. 31 to 33, the parallel blade module 310 has a bridge 270 between the first and second blades 286 and 288 for structural rigidity and reduced blade deflection during use. In other embodiments (not shown), the structure of the parallel blade module 310 may be rigid enough and hence not have any bridges between the blades. Likewise, further embodiments (not shown) will have parallel blade modules 310 with two or more bridges 270 between two or more blades to ensure blade deflection is within acceptable limits.

The chip cutting module 310 and the dicing module 312 have complementary detachable engagement features 314 and 316 respectively. These allow the modules to detachably interengage such that a range of different blade structure modules (not shown) can be used in the accessory disc 306. The chip cutting module 310 and the dicing module 312 are held in the frame provided by the peripheral ring 308. The internal surface of the peripheral ring 308 may have a slight taper to match a complementary taper on the external surfaces of the modules 310 and 312. In this way the modules 310 and 312 tend to wedge into the peripheral ring for secure engagement therewith. There may also be features on the modules and the peripheral ring 308 that key the modules to the ring.

The modular dicing/chipping disc 306 is configured for use with an alternative embodiment of the catcher (not shown in the Figures). Rather than hinging the semicircular plate of the catcher to the bottom ring 214, peripheral features on the catcher semicircle slide within the external channel 318 on the chip module 310 and the external channel 320 on the dicing module 312. By rotating the catcher semicircle within these channels 310 and 320, the chip cutting module 310 or the dicing grid 268 may be selectively covered.

Figure 39:
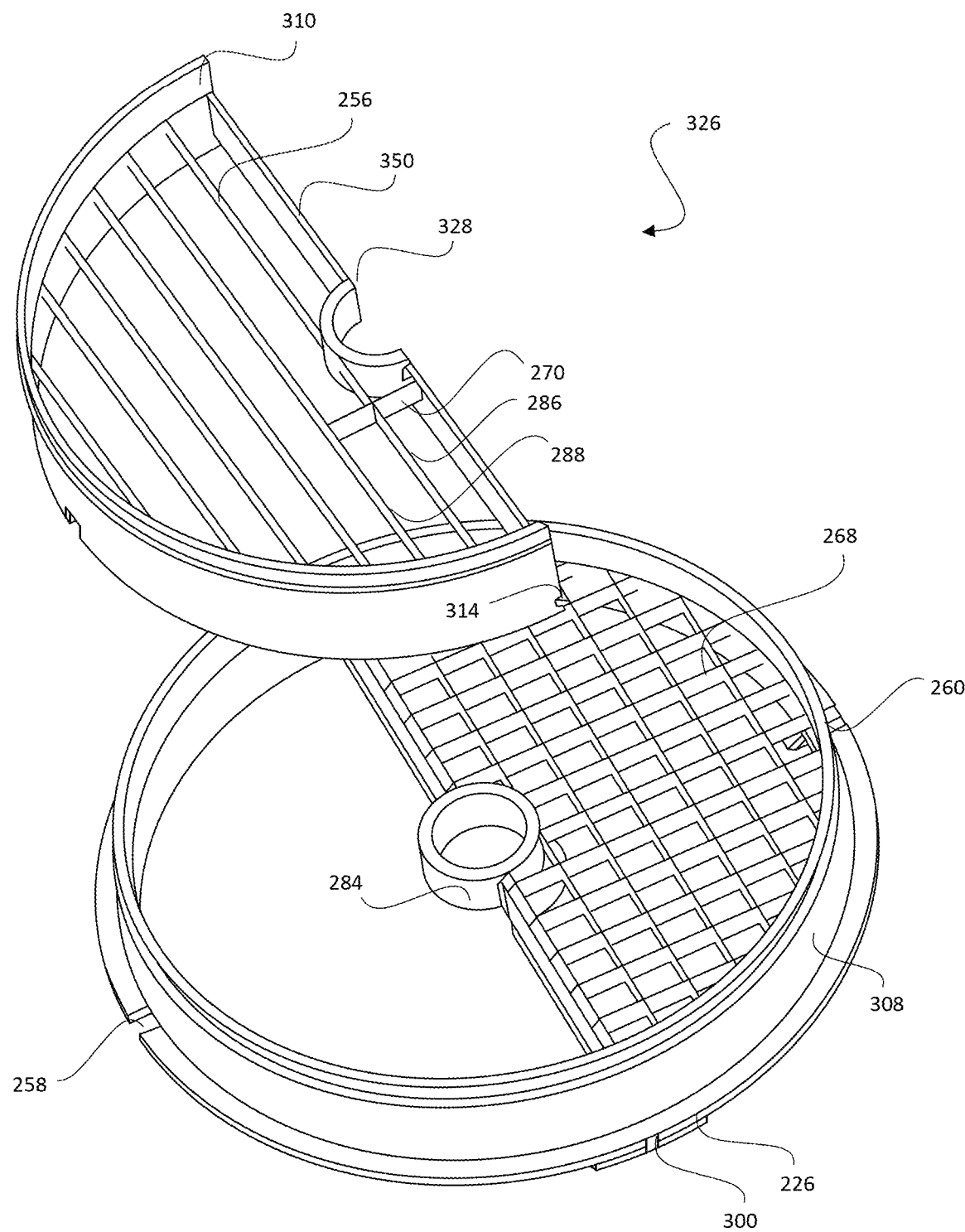
FIG. 39 is a perspective of another embodiment of the dicing/chipping accessory in which the parallel blades for chipping is provided as separate module that is individually detachable, while the dicing grid remains fixed within the disc.

The embodiment shown in FIG. 39 is a semi-modular disc 326 with a fixed dicing grid 268 like the integrally formed dicing/chipping disc 254 shown in FIGS. 31 to 33, and a removable parallel blade module 310 like the modular disc 306 of FIGS. 36 to 38. Alternatively, the parallel blade array may be fixed, and the dicing grid is a detachable module. Similarly, there may be (i) multiple individually removable blade structure modules in combination with a fixed blade structure, (ii) multiple fixed blade structures in combination with a removable blade structure module, or (iii) multiple removable blade structure modules in combination with multiple fixed blade structures. In this way, the semi-modular disc 326 also provides the ability to 'mix and match' blade structure combinations depending on the required food processing operations for particular recipes.

The parallel blade module 310 shown in FIG. 39 has a module centre wall 350 defining the boundary with the dicing grid 268 fixed in the peripheral ring 308. The centre wall 350 is divided by the module hub 328 which fits about on side of the disc hub 284 mounted to the dicing grid 268. Like the parallel blade module 310 of the modular disc 306 shown in FIGS. 36 to 38, the parallel blade module 310 of the semi-modular disc 326 has a bridge 270 between the first and second blades 286 and 288 for structural rigidity and reduced blade deflection during use. In other embodiments (not shown), the structure of the parallel blade module 310 may be rigid enough and hence not have any bridges between the blades. Likewise, further embodiments (not shown) will have parallel blade modules 310 with two or more bridges 270 between two or more blades to ensure blade deflection is within acceptable limits.

Figure 41:
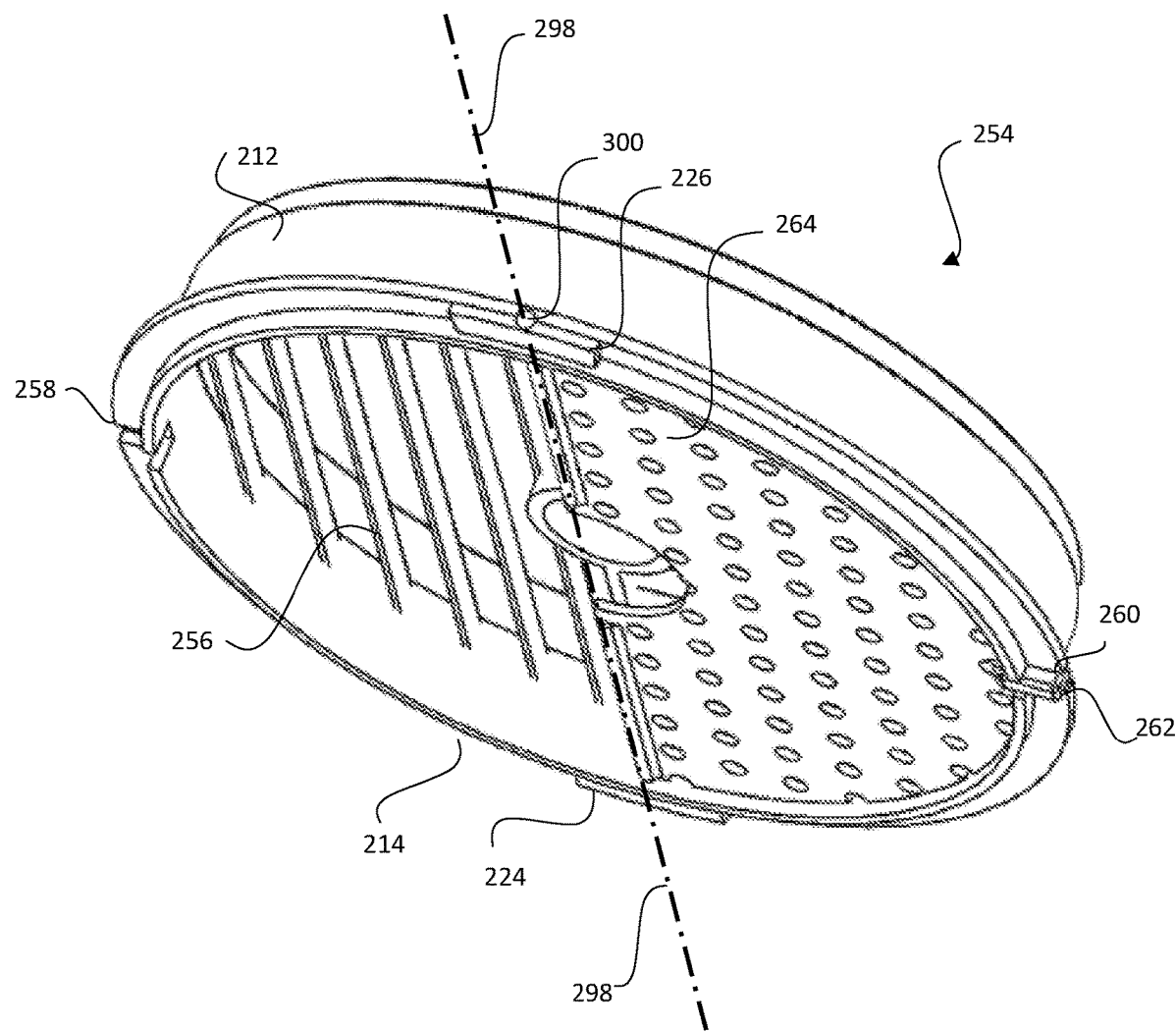
FIG. 41 is a bottom perspective of the dicing/chipping accessory with the catcher covering the dicing grid.
Figure 42:
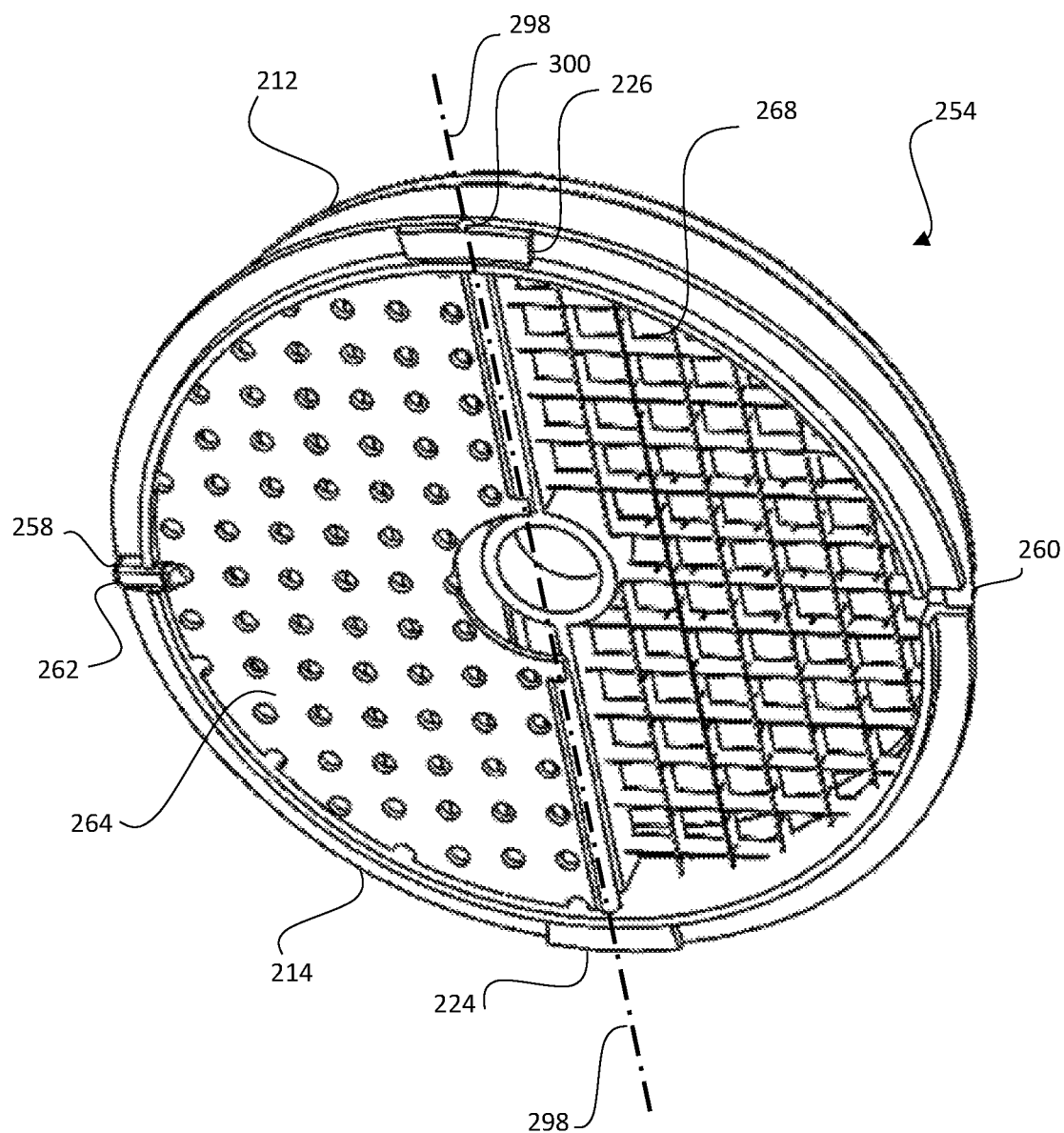
FIG. 42 is a perspective of the dicing/chipping accessory with the catcher covering the parallel blades for chipping.
Figure 43:
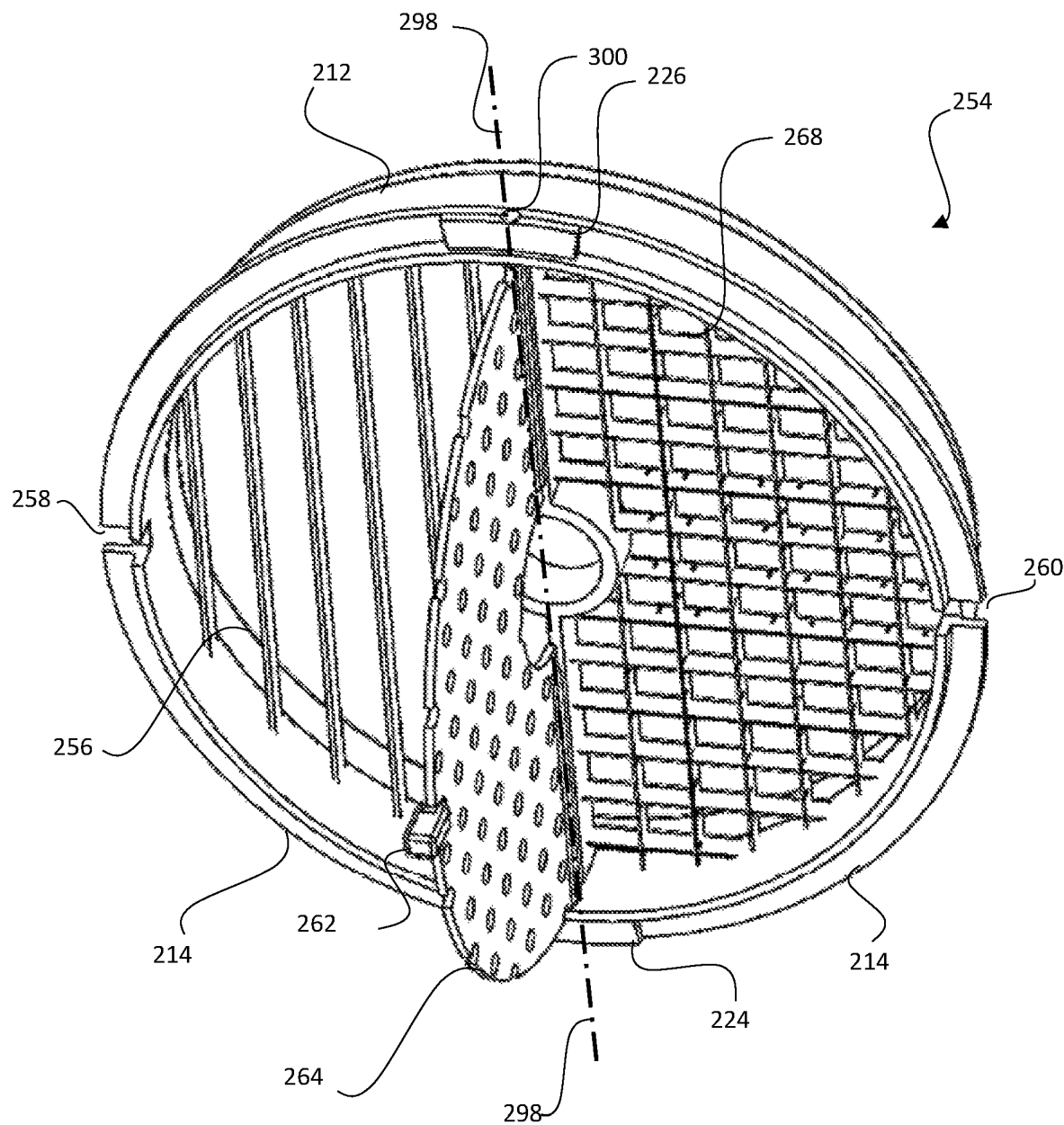
FIG. 43 is a perspective of the dicing/chipping accessory with the catcher rotated about a diametric axis part way between the parallel blades and the dicing grid.

As best shown in FIGS. 41, 42 and 43, the catcher is mounted to the bottom ring 214 for rotation about a hinge axis 298 extending along a diameter of the dicing/chipping accessory 254. Preferably, the catcher 264 is at least partially formed from an elastic material such as silicone such that it is expandable to hold more food than a more rigid catcher.

In FIG. 41 the catcher 264 is shown in one position covering the dicing grid 268 such that the parallel blade array 256 is exposed for making chips. In FIG. 42, the catcher is in a second position covering the parallel blade array 256 while the dicing grid 268 is exposed. FIG. 43 shows the catcher 264 midway between the chipping side and the dicing side. The catcher 264 has a semicircular plate with apertures 266. At the diameter of the semicircle, are protrusions to form a hinge joints 300 in the bottom ring 214 directly above the orientation features 224 and 226. It will be appreciated that the hinge joints 300 may also be below, or through the orientation features 224 and 226, as long as the catcher 264 is able to rotate about a suitable hinge axis. A locking assembly 324 selectively retains the catcher 264 in position on the chipping side or the dicing side of the accessory 254.

A catcher holding tab 262 extends from the semi-circular plate normal to the hinge axis 298. To cover the dicing grid 268, the holding tab 262 is received in the dicing side holding slot 260 and to cover the parallel blade array 256 the holding tab 262 is retained in the chipping side holding slot 258.

Figure 44:
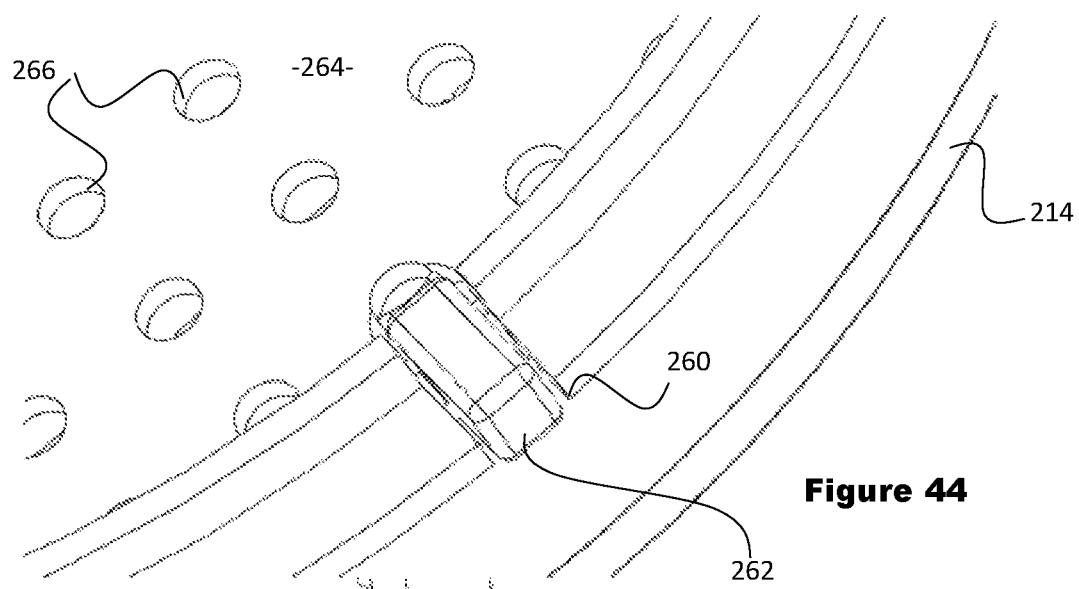
FIG. 44 is an enlarged partial perspective showing the catcher holding tab shown in FIG. 41 extending into the dicing side holding slot of the dicing/chipping accessory.
Figure 45:
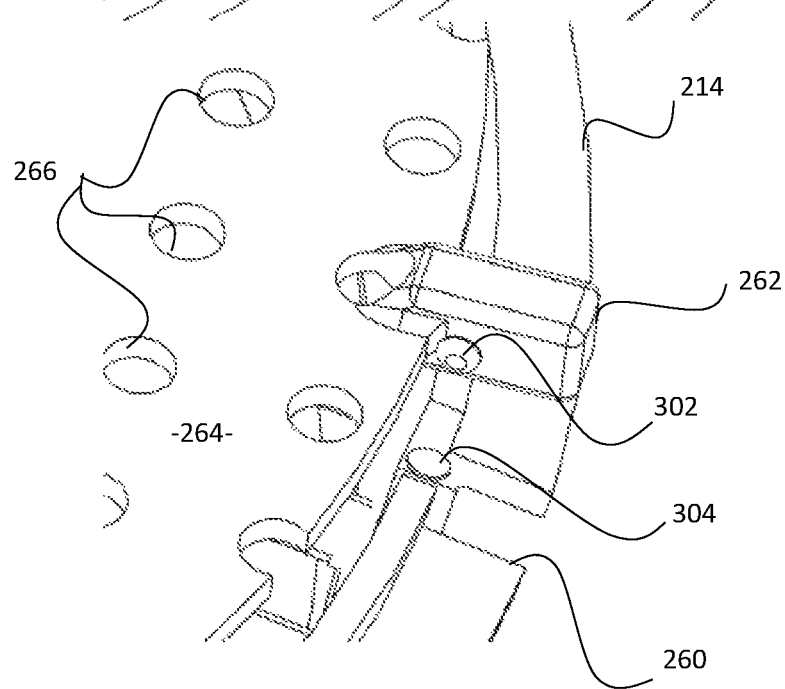
FIG. 45 is an enlarged partial perspective of the catcher holding tab shown in FIG. 41 disengaged from the dicing side holding slot.
Figure 46:
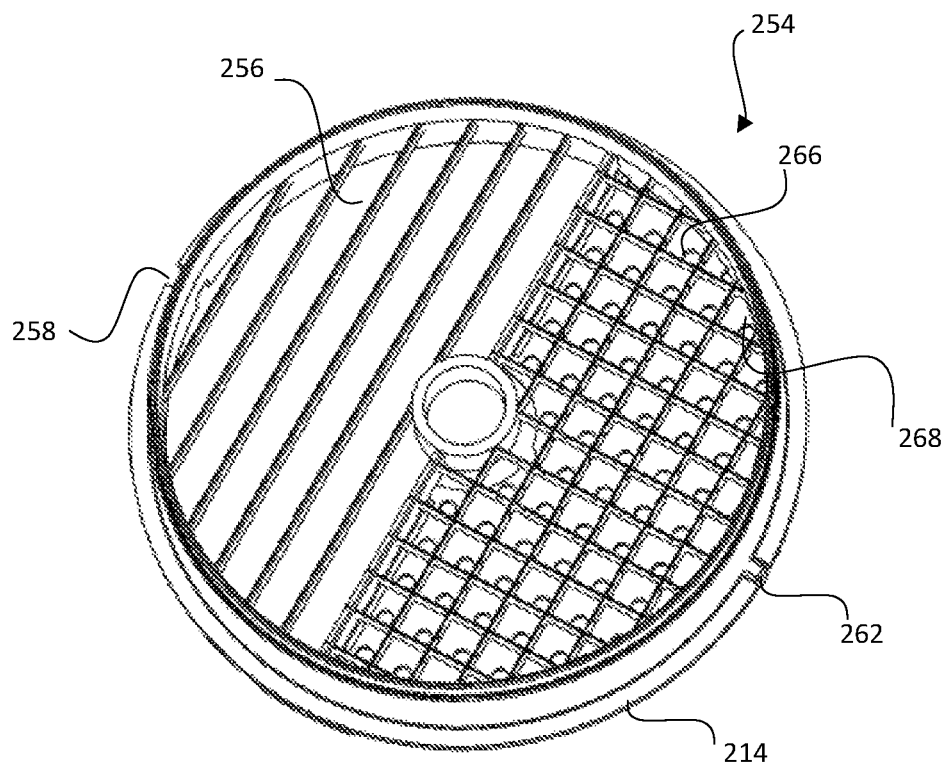
FIG. 46 is a top perspective of the dicing/chipping accessory with the catcher covering the underside of the dicing grid such that the apertures in the catcher are in registration with the openings defined within the dicing grid.

As best shown in FIGS. 44 and 45, the catcher holding tab 262 includes a retractable pin 302 with a rounded head sized to resiliently seat in the pair of retaining apertures 304 on opposite side walls of the retaining slots 258 and 260. Note that the figures do not show both ends of the retractable pins 302 or both of the inwardly facing retaining apertures 304, however the skilled worker will appreciate that the pin 302 resiliently retracts into the holding tab 262 as the user pushes into the holding slots 258 and 260 until the retaining apertures are engaged. Likewise, an interference fit between the pin 302 and the slots 258/260 and/or the retaining apertures 304 can be used to hold the catcher in place. The locking assembly 324 may take many other forms that would be suitable for selectively retaining the catcher 264 on the chipping side of the dicing side during a food processing operation.

The catcher 264 collects any small amounts of food that may slip from the outlet of the feed chute 108 over to the non-operating side of the dicing/chipping accessory 254. These pieces of food will not have been processed through the chipping or dicing blades and are retained by the catcher to preserve the consistency of the food in the preparation vessel 102.

Any juice or other liquids that splash from the feed chute side to the non-operating side drain through the array of apertures 266 in the catcher 264. However, all but the smallest pieces of unprocessed food are retained by the catcher 264 and removed when the dicing/chipping accessory 254 is cleaned.

Figure 40:
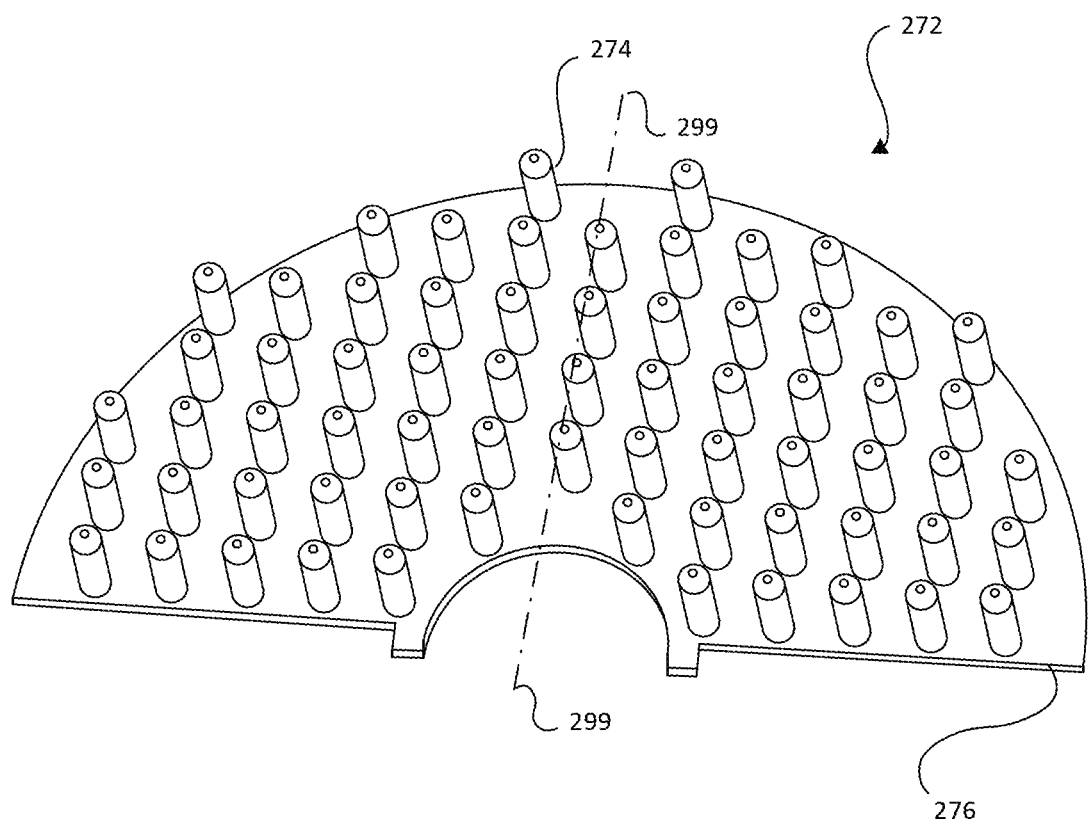
FIG. 40 is a perspective of the cleaning tool with projections for extending into the dicing/chipping accessory.

FIG. 40 shows a cleaning tool 272 with protrusions for removing food residues from the apertures of the catcher 264. FIGS. 47 to 50 show the cleaning tool 272 being used to clean the array of apertures 266 in the catcher 264. The cleaning tool has a base 276 in the form of a flat semicircle dimensioned to correspond with the semi-circular plate of the catcher 264. Projections 274 extend from one side of the flat base 276 and are positioned in registration with the apertures 266 in the catcher 264. The cleaning tool 272 can engage the apertures 266 of the catcher 264 regardless of whether the catcher is covering the dicing grid or the parallel blades on the chipping side. In order for the protrusions to be in register with the apertures 266, regardless of the orientation 264, the array of apertures 266 is preferably symmetrical about an axis of symmetry 299 (see FIG. 40) extending normal to the hinge axis 298 of the catcher 264.

Figure 47:
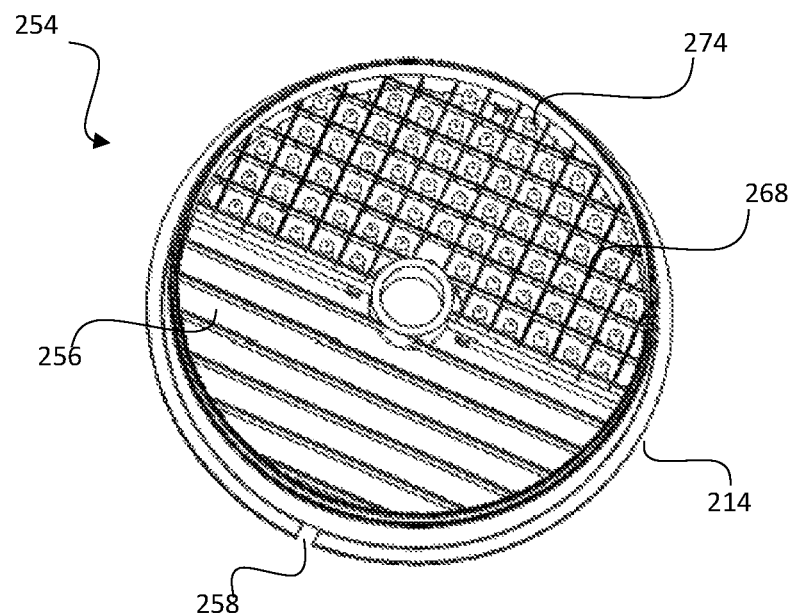
FIG. 47 is a top perspective of the dicing/chipping accessory shown in FIG. 41 with the cleaning tool applied to the underside of the catcher such that the projections extend through the catcher apertures and into the openings defined by the dicing grid.
Figure 48:
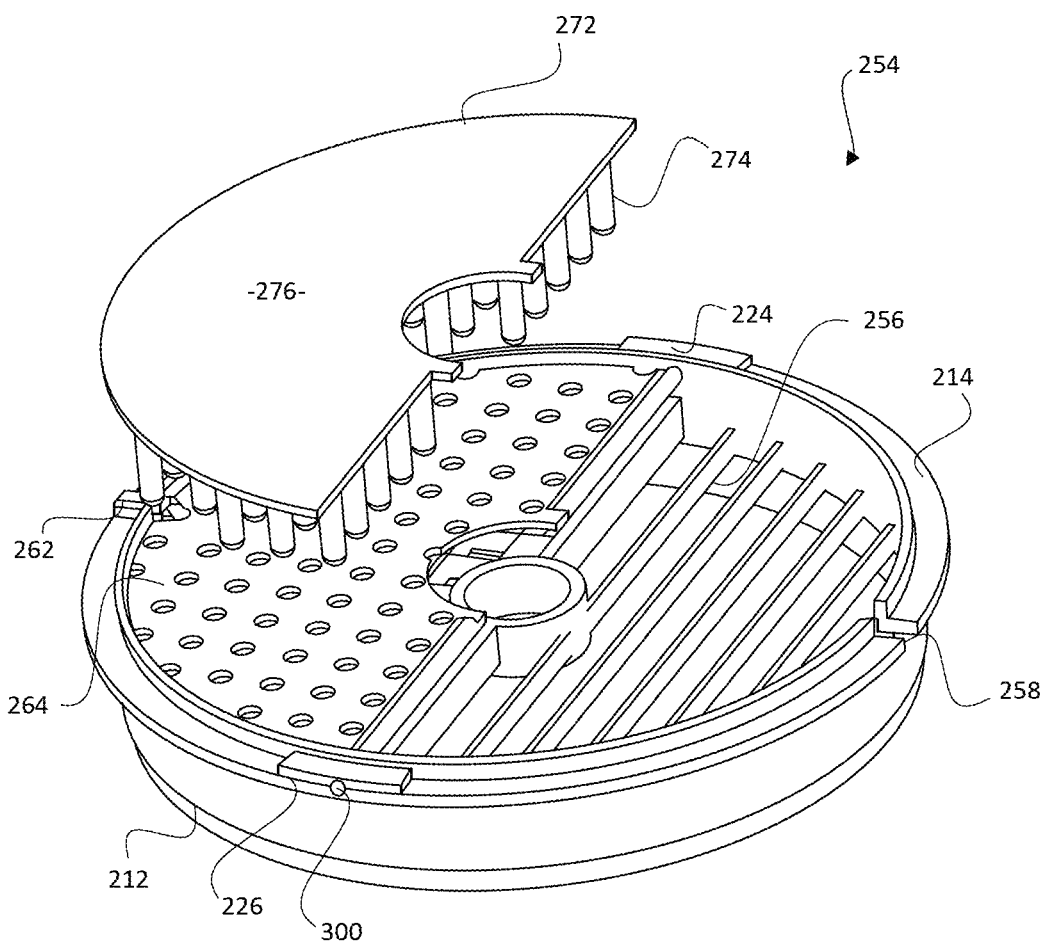
FIG. 48 is an exploded bottom perspective of the dicing/chipping accessory with the cleaning tool disengaged from the apertures of the catcher.
Figure 49:
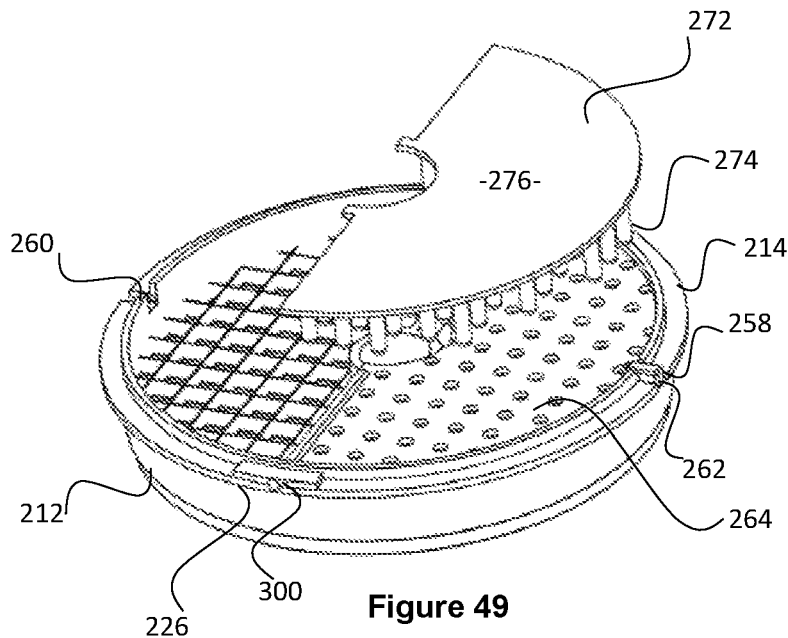
FIG. 49 is an exploded bottom perspective of the dicing/chipping accessory with the catcher covering the parallel blades used for chipping and the cleaning tool disengaged from the apertures of the catcher.
Figure 50:
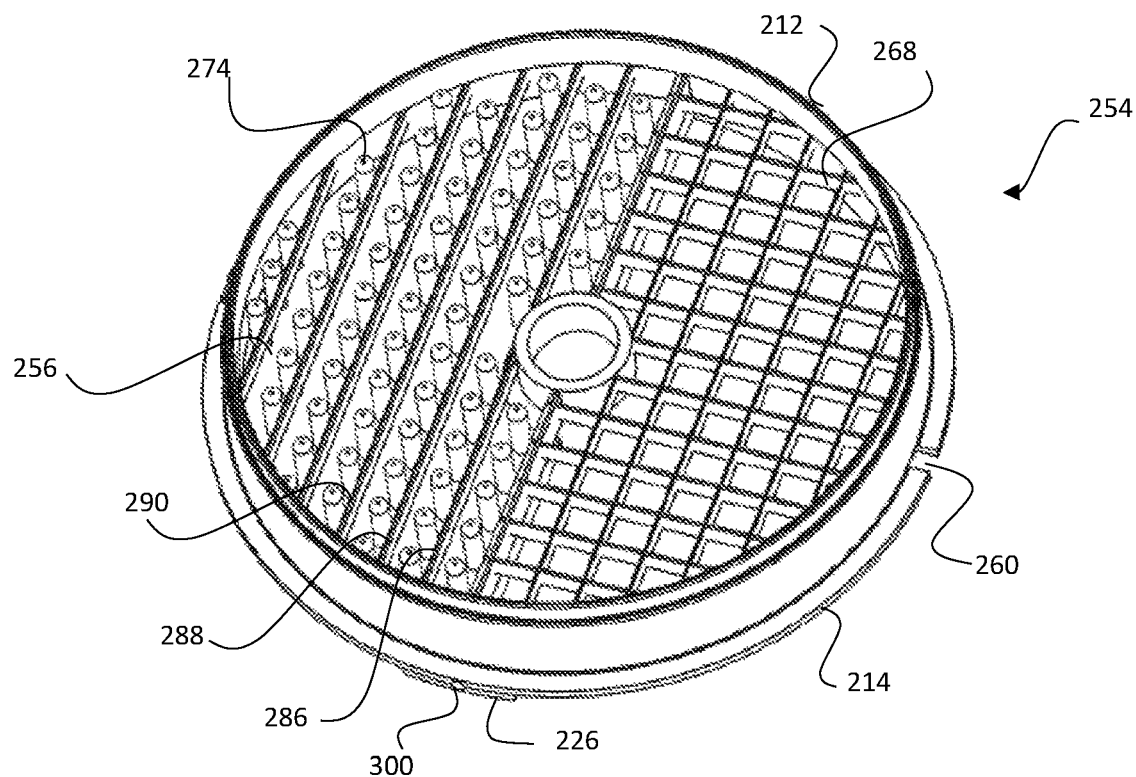
FIG. 50 is a top perspective of the dicing/chipping accessory with the projections of the cleaning tool extending into the gaps between each of the parallel blades.

Likewise, the openings or gaps between the blades in the dicing grid 268 and the parallel blade array 256 need to be configured to accommodate the projections 274 when engaged with the catcher 264. As shown in FIG. 47, each of the projections 274 extends into an individual opening defined by the blades of the dicing grid 268. This also requires the apertures 266 in the catcher 264 to be positioned in registration with one of the openings defined in the dicing grid. Similarly, the channels formed between the parallel blades 286, 288, 290 and so on are positioned so they accommodate rows of the projections 274 when the cleaning tool 272 engages the catcher 264 while covering the chipping side of the accessory 254.

In some embodiments, the cross-section of the projections 274 may be square or another non-circular shape. The shape of the apertures 266 may correspond to that of the projections or there may be a degree of difference to promote cleaning contact between the two. Furthermore, configuring the cleaning tool 272 such that the projections 274 are able to extend between the blades of the accessory reduces the space required to store the accessories for the food processor together with the associated cleaning tool. In other embodiments, the cleaning tool is formed to be integral with the accessory 254. In this embodiment, it may be convenient that the catcher 264 does not have any apertures 266 but the protrusions 274 extend from either side of the semi-circular plate. However, it is preferable that the cleaning tool 272 with suitably dimensioned projections 274 are provided for the user to safely clean between the blades of the chipping side and the dicing side.

Conveniently the cleaning tool is formed from relatively compliant polymers such as acrylonitrile butadiene styrene (ABS), polypropylene, or other suitable thermoplastic.

While some embodiments described herein include some but not other features included in other embodiments, combinations of features of different embodiments are within the scope of the invention, and form different embodiments as would be understood by those skilled in the art. For example, in the following claims, any of the claimed embodiments can be used in any combination the skilled addressee would readily understand to be suitable in particular circumstances.

The present invention has been described herein by way of example only. Skilled workers in this field will readily appreciate many variations and modifications which do not depart from the spirit and scope of the broad inventive concept.

The invention claimed is:

1. A food processor including: a food preparation vessel; a spindle assembly for engaging an accessory for rotation in the food preparation vessel; wherein, the spindle assembly and the food preparation vessel are configured for detachable engagement, such that torsion from driving the accessory biases the spindle assembly into engagement with the food preparation vessel.

2. The food processor according to claim 1 wherein, the spindle assembly has a spindle configured for engaging the accessory, and a spindle housing for detachable engagement with the food preparation vessel, such that the spindle is rotatable relative to the spindle housing.

3. The food processor according to claim 2 wherein, the spindle assembly has a thrust bearing within the spindle housing for rotatably mounting the spindle.

4. The food processor according to claim 1 wherein, the detachable engagement between the spindle assembly and the food preparation vessel is a bayonet connection configured for relative rotation of the spindle assembly and the food preparation vessel.

5. The food processor according to claim 1 further including a base for detachable engagement with the food preparation vessel, the base housing a drive motor for rotating the spindle.

6. The food processor according to claim 5 wherein, the food processor further includes a drive coupling for coupling the drive motor and the spindle assembly.

7. The food processor according to claim 6 wherein, the spindle assembly has a gear assembly such that the accessory rotates at a speed less than the speed of the drive motor.

8. The food processor according to claim 7, wherein the gear assembly is a reduction gear assembly such that the accessory rotates at a speed less than the speed of the drive motor.

9. The food processor according to claim 8, wherein the reduction gear assembly provides a reduction ratio of more than three to one, such that a speed of the spindle is less than one third the speed of the drive motor.

10. The food processor according to claim 1 wherein, the spindle and the accessory detachably engage via abutting faces including at least one inclined face configured to urge the accessory into engagement with the spindle accessory when rotating in a driven direction.

11. The food processor according to claim 10, wherein the reduction ratio is six to one, such that a speed of the spindle is one sixth the speed of the drive motor.

\* \* \* \* \*